United States Patent [19]

Hamill, III et al.

[11] 4,135,238

[45] Jan. 16, 1979

[54] NUMERICALLY CONTROLLED MACHINE TOOL SYSTEM

[75] Inventors: Samuel M. Hamill, III, Scituate; James C. Kilbane, Belmont, both of Mass.

[73] Assignee: Hamill Company, Inc., Norwell, Mass.

[21] Appl. No.: 652,143

[22] Filed: Jan. 26, 1976

[51] Int. Cl.² .................................. G06F 15/46
[52] U.S. Cl. ......................... 364/107; 318/569; 318/574; 364/474
[58] Field of Search ................ 318/568, 571-574, 318/569; 364/107, 117, 120, 474, 200, 900

[56] References Cited

U.S. PATENT DOCUMENTS

| | | | |
|---|---|---|---|
| 3,543,910 | 12/1970 | Devol et al. | 364/120 |
| 3,634,662 | 1/1972 | Slawson | 364/107 |
| 3,689,892 | 9/1972 | Glenn et al. | 318/568 |
| 3,766,369 | 10/1973 | Watanabe et al. | 364/474 |
| 3,783,253 | 1/1974 | Anderson et al. | 364/117 |
| 3,816,723 | 6/1974 | Slawson | 364/107 |
| 3,878,983 | 4/1975 | Hamill et al. | 364/107 |
| 3,904,858 | 9/1975 | Rosshirt | 364/118 |
| 3,920,972 | 11/1975 | Corwin, Jr. et al. | 364/107 |
| 3,970,830 | 7/1976 | White et al. | 364/474 |

*Primary Examiner*—Felix D. Gruber
*Attorney, Agent, or Firm*—Kenway & Jenney

[57] ABSTRACT

A system in which a machine tool is controlled by a digital computer and an operator to perform a succession of machining operations. The system includes means for operator-controlled programming of a succession of machining operations, including single sequence programming of repetitive drilling operations, and programming of helical path operations. In the programming mode, the operator may direct the automatic selection of the first unprogrammed sequence. The operator may also direct the automatic plane or axis switching for the programmed sequences, rapid feedrate runthrough, and absolute and incremental data entry operations.

21 Claims, 10 Drawing Figures

NUMERICALLY CONTROLLED MACHINE TOOL SYSTEM

REFERENCE TO RELATED PATENT

The subject matter of the present application is related to the subject matter of the U.S. Pat. No. 3,878,983, issued on Apr. 22, 1975 to the present applicants and assigned to the same assignee as is the present application, and that patent is incorporated by reference in the present application.

SUMMARY OF THE INVENTION

According to one aspect of the present invention, an AUTOMATIC FIRST UNPROGRAMMED SEQUENCE SELECT control provides an aid for the operator in programming the ordered succession of SEQUENCES to be stored in the computer memory. More particularly, for an embodiment of the present invention which includes the embodiment described in the above-referenced U.S. Pat. No. 3,878,983, in the PROGRAM-EDIT mode, the operator may activate an AUTOMATIC FIRST UNPROGRAMMED SEQUENCE SELECT control followed by activation of the appropriate controls to enter a desired SEQUENCE in the normal manner. In response thereto, the computer automatically assigns the first previously unassigned SEQUENCE number (and corresponding position in the stored ordered succession) to the entered SEQUENCE. Accordingly, with this aspect of the present invention, it is not incumbent upon the operator to know the number of the last programmed SEQUENCE and select that SEQUENCE as a current SEQUENCE before adding a new SEQUENCE.

A further aspect of the present invention includes means to further facilitate operator controlled procedures for establishing sets of machining operations in a plurality of planes. As described in U.S. Pat. No. 3,878,983, the operator may generate a succession of one coordinate Z SEQUENCES and two coordinate X-Y SEQUENCES wherein the one coordinate SEQUENCES direct cutting element motion in the direction of the Z axis, and the two coordinate SEQUENCES direct cutting element motion in a plane parallel to the plane formed by the X and Y axes.

In accordance with the present invention, means is provided whereby the operator may selectively generate one coordinate SEQUENCES for directing cutting element motion along any one of the machine tool axes, and two coordinate SEQUENCES for directing cutting element motion in any two coordinate plane. The present invention further includes a SEQUENCE transformation means which is adapted for operation in the RUN mode to identify a current SEQUENCE as a one coordinate SEQUENCE and produce a corresponding series of one coordinate axis drive signals which are applied to an axis drive means to drive the cutting element in the direction of the associated one coordinate axis. Similarly, in the RUN mode, the transformation means is adapted to identify a current SEQUENCE as a two coordinate SEQUENCE and produce a corresponding series of two coordinate axis drive signals in the same manner as that described in the referenced patent (i.e. a one coordinate major moves and two coordinate minor moves in accordance with the best straight line algorithm defined therein). These signals are applied to drive means adapted to drive the cutting element along the best straight line in a plane parallel to the plane formed by the two coordinate axes associated with the two coordinate SEQUENCE. Thus, for example, with a machine tool having four axes (e.g. X, Y, Z and A), the operator may selectively generate X, Y, Z or A SEQUENCES, and X-Y, X-Z, Y-Z, X-A (and others) SEQUENCES. Of course, where one of the axes is a rotational axis, such as the A axis, the consequent cutting element motion in the RUN mode from an X-A SEQUENCE, while a best straight line in the abstract X-A plane, is along a helical path with respect to the X, Y and Z axes coordinate system.

In addition, means is provided whereby any of the two coordinate SEQUENCES may alternatively be programmed as a two coordinate CIRCULAR INTERPOLATION SEQUENCE. The transformation means is adapted for operation in the RUN mode to identify a current SEQUENCE as a two coordinate CIRCULAR INTERPOLATION SEQUENCE and produce a corresponding series of two coordinate circular interpolation axis drive signals in the same manner as that described in the referenced patent. These signals are applied to drive means which are responsive to drive the cutting element along a circular path in a plane parallel to the plane formed by the two coordinate axes associated with the two coordinate CIRCULAR INTERPOLATION SEQUENCE.

According to another aspect of the present invention, the operator may readily direct the performance of a succession of identical drilling operations, each at a specified location on the workpiece, using only a single SEQUENCE for each location, following the generation and storage of the defining drilling SEQUENCE set corresponding to the drilling operation at the first location.

More particularly, in the embodiment described in the above-referenced U.S. Pat. No. 3,878,983, a single drilling operation may be established, for example, by the generation of an X-Y SEQUENCE and a PECK CYCLE Z SEQUENCE pair or by an X-Y SEQUENCE and a pair of successive, non-PECK CYCLE Z SEQUENCES. It will be understood that the first SEQUENCE in a PECK CYCLE pair establishes a repetitive up and down motion (i.e. with fixed X and Y coordinates) wherein the cutting element is alternatively moved in increasing increments toward the Z coordinate stored in association with the first SEQUENCE and returned to a reference Z coordinate, with the cutting element motion ultimately terminating at the Z coordinate stored with the first SEQUENCE. The second SEQUENCE in the pair directs motion to the Z coordinate stored in association therewith with the X,Y coordinates remaining fixed. That is, the first SEQUENCE directs the cutting element to drill the hole, and the second SEQUENCE directs withdrawal of the cutting element. In order to perform the same drilling operation at one or more different locations with the system of U.S. Pat. No. 3,878,983, the operator must program for each desired location a new X-Y sequence and, in addition, the same PECK CYCLE SEQUENCE pair or pair of non-PECK CYCLE Z SEQUENCES must be entered by the operator.

In accordance with an embodiment of the present invention which includes the embodiment described in U.S. Pat. No. 3,878,983, the operator may direct a plurality of drilling operations by entering a single drilling directive (including an X-Y SEQUENCE and either a PECK CYCLE Z SEQUENCE pair or non-PECK CYCLE Z SEQUENCE pair) for the first location and then only a single X-Y AUTODRILL SEQUENCE with an identifying tag for each additional X,Y location at which an identical drilling operation is desired. In the RUN mode, the computer identifies each AUTODRILL SEQUENCE, controls the cutting element relative position to the X and Y coordinates associated with the X-Y SEQUENCE and then directs relative movement in the Z direction in accordance with the last previous PECK CYCLE Z SEQUENCE pair or non-PECK CYCLE Z SEQUENCE pair in the succession of SEQUENCES stored in the computer memory.

Still another aspect of the present invention provides a further aid to the operator controlled programming of a succession of machining operations by providing the operator with means to direct the cutting element to a succession of spatial points displaced from the thus far programmed points by a predetermined distance, but otherwise identical thereto.

According to this aspect in an embodiment which includes the embodiment described in U.S. Pat. No. 3,878,983, the operator may in the RUN mode activate a RUNTHROUGH control for a selected succession of SEQUENCES. In response thereto, the computer directs the cutting element to successively pass through the succession of points characterized by a predetermined Z coordinate and the X,Y coordinates respectively associated with the selected succession of SEQUENCES. In addition, this runthrough operation may be accompanied by operator-activation of a RUNTHROUGH SPEED control, in response to which the relative velocity of the cutting element is controlled to be a predetermined constant. Thus, in accordance with this aspect of the present invention, the operator may, for example, at any time during the entry of SEQUENCES in the PROGRAM-EDIT mode, switch to the RUN mode and direct a rapid rate runthrough of the SEQUENCES so far programmed whereby the cutting element is offset from the workpiece but otherwise directed through the succession of spatial points. The offset distance may be estabished by manually displacing the workpiece with respect to the cutting element, or, in other embodiments, may be established automatically by the computer in response to activation of the RUNTHROUGH control.

Yet another aspect of the present invention provides a further aid for the operator in programming the ordered succession of SEQUENCES to be stored in the computer memory, whereby a helical relative path for the cutting element with respect to an axis may be established through the entry of a HELICAL SEQUENCE pair.

More particularly, for an embodiment of the present invention which includes the embodiment described in the above-referenced U.S. Pat. No. 3,878,983, and which further includes an A-axis degree of freedom corresponding to rotation about the Z axis, the operator may enter a HELICAL SEQUENCE pair in the PROGRAM-EDIT mode. The first HELICAL SEQUENCE of the pair specifies the initial Z coordinate $Z_o$, distance from the Z axis, $R_o$, initial angular displacement $\theta_o$ (about the Z axis) of the starting point of the desired helical path, and further specifies the speed (or feedrate) at which the cutting element is to approach this initial point. The second HELICAL SEQUENCE of the pair specifies the final point of the helix in terms of the length coordinate L (represented by the distance of the final point from the origin along the helix axis), and the angular displacement coordinate D (represented by the product of the helix density (or number of revolutions per unit length) along the helix axis times 360 degrees times the length coordinate L), and the helix direction from the origin (clockwise, +, or counterclockwise, −). In response thereto, in the RUN mode, the computer first identifies the first HELICAL SEQUENCE of the pair and then generates appropriate axis motion signals to direct the cutting element relative position along the defined helical path as defined by the pair.

This aspect of the present invention may be incorporated in embodiments such as that disclosed in the above-referenced patent for a milling or grinding machine tool, or alternatively, in a lathe embodiment suitably interconnected in accordance with the invention described in the above-referenced patent.

According to another aspect of the present invention, in a multiple axis machine tool system, the coordinate data stored in association with each SEQUENCE is in absolute form, representative of the coordinate values of the associated spatial point, so that any of the programmed SEQUENCES may be selected by the operator in the RUN mode as a current SEQUENCE. Means is provided so that in response to the selection of any SEQUENCE, in or out of order, the cutting element is directed to the same spatial point as it would have been if the current SEQUENCE had been selected through the ordered stepping through the succession of SEQUENCES. For example, for a machine having X, Y and Z axes, such as that described in U.S. Pat. No. 3,878,983, when a two coordinate (e.g. X-Y) SEQUENCE is selected as current, the cutting element is directed first to a reference coordinate along the Z axis, and then to the two coordinates (X and Y) stored in association with the current SEQUENCE, and finally to the one coordinate (Z) stored in association with the next previous one coordinate (e.g. Z) SEQUENCE in the succession of SEQUENCES stored in the computer memory. When a one coordinate SEQUENCE is selected as current, the cutting element is directed first to a reference coordinate along the one coordinate axis, then to the two coordinates associated with the next previous two coordinate SEQUENCE in the succession, and finally to the single one coordinate stored in association with the current SEQUENCE.

The present invention also includes a further aid for the operator in entering the ordered succession of SEQUENCES to be stored in a computer memory. More particularly, for an embodiment of the present invention which includes the embodiment described in the above-referenced U.S. Pat. No. 3,878,983, the operator may selectively activate in the PROGRAM-EDIT mode a data entry control to be either in ABSOLUTE or INCREMENTAL position. When in the ABSOLUTE position, the operator may enter data for SEQUENCE storage in absolute form. The data is then stored in that form in the computer memory. When the data entry control is in the INCREMENTAL position, the operator may enter the data for SEQUENCE generation in incremental format. In response to the entry of such data in the incremental format, the computer transforms that data to absolute data before storing the latter in the data computer memory.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
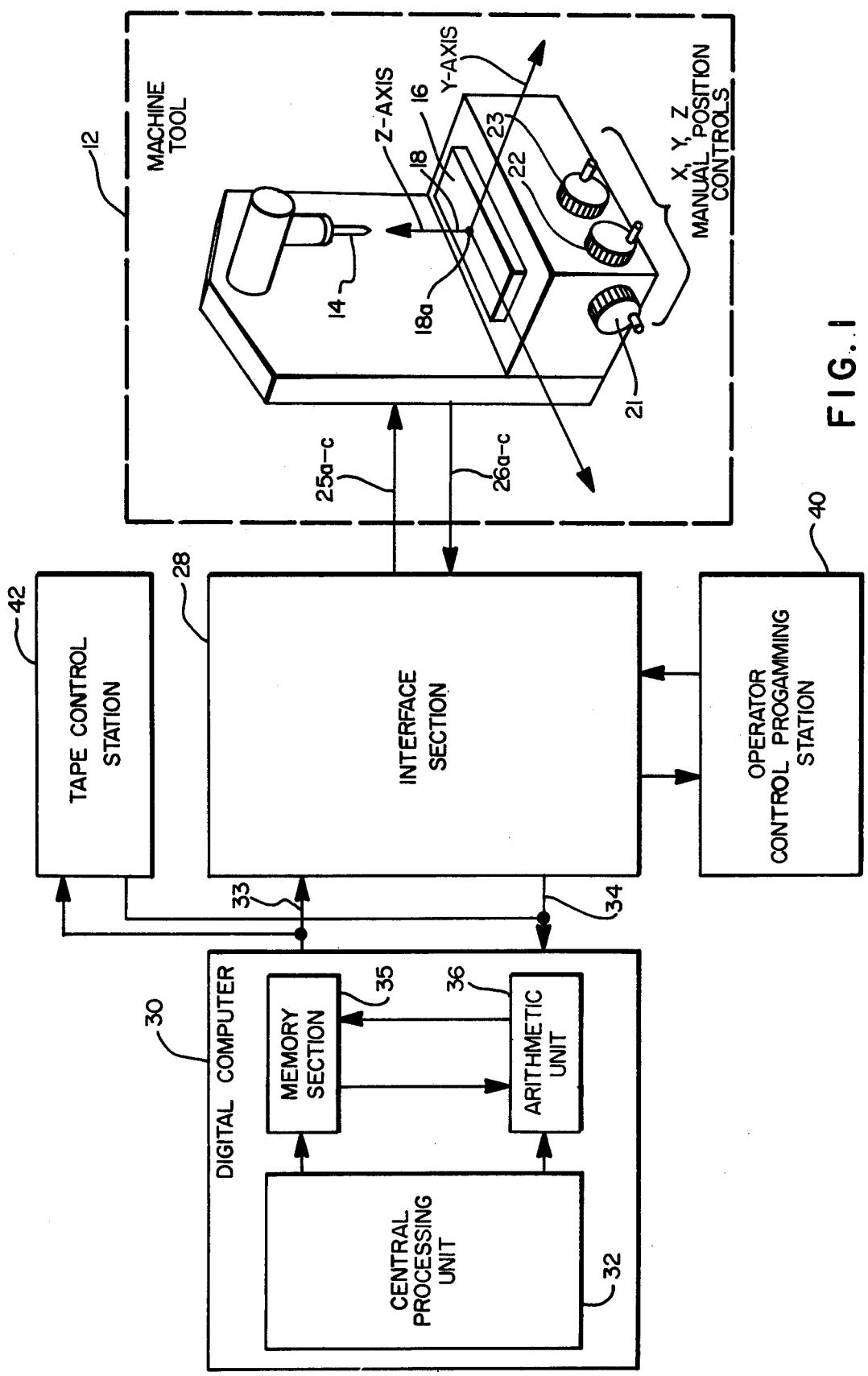
FIG. 1 shows in block diagram form, a numerically controlled machine tool system in accordance with the present invention.

The presently-described embodiment includes the system described in the above-referenced U.S. Pat. No. 3,878,983, incorporated by reference herein. Accordingly, FIGS. 1-3 from that patent are also used herein to depict an embodiment of the present invention. Reference numerals used for identifying various components of the referenced patent are used herein to identify corresponding components of the present embodiment.

Figure 4:
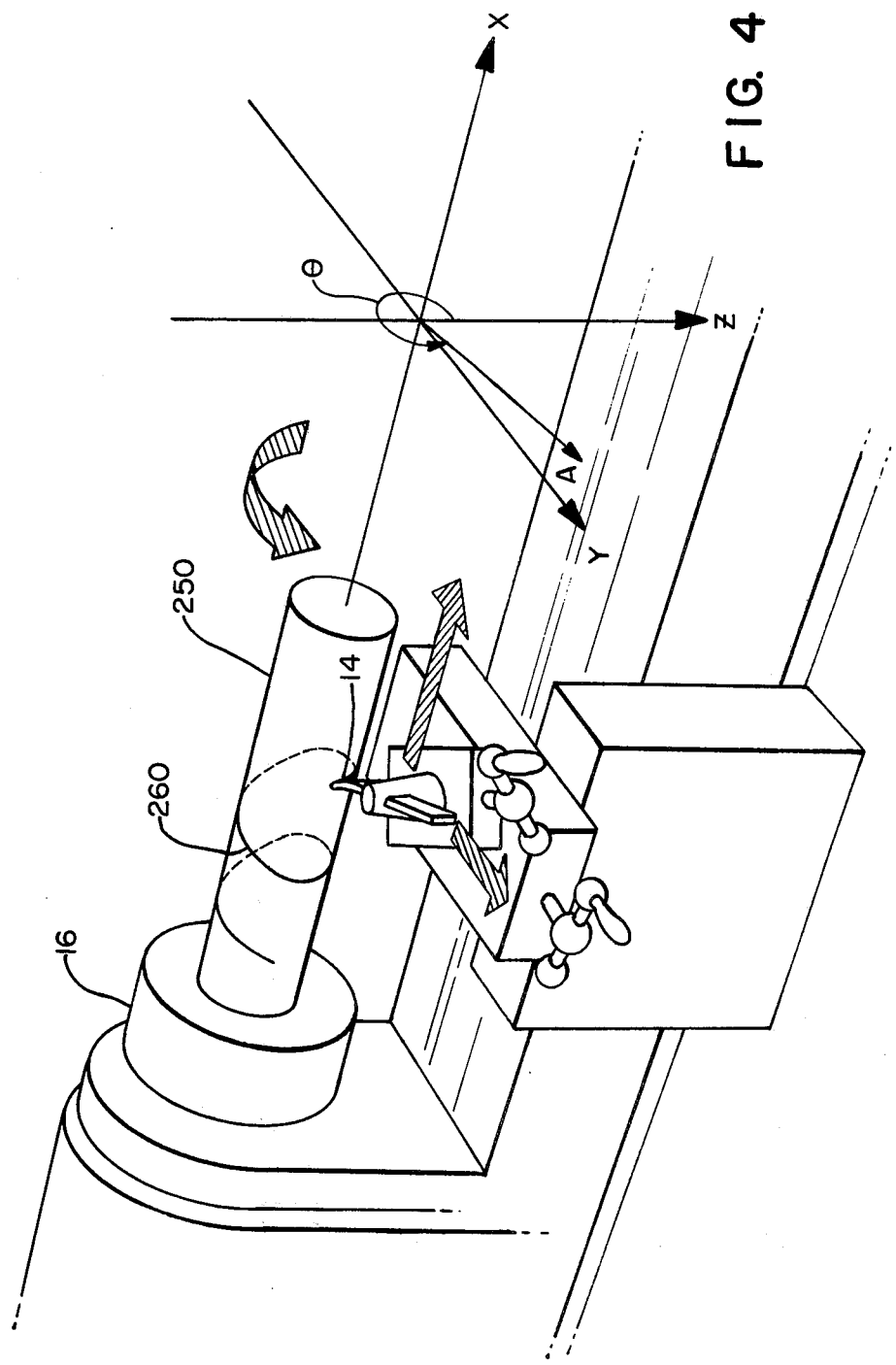
FIG. 4 shows an alternative embodiment of the present invention.

The embodiment illustrated in FIG. 1 is that of a milling or a grinding machine tool as connected to the control means of the present invention. In this particular embodiment, the workpiece positioning table 16 may be translated in the horizontal X-Y plane, while the cutting element 14 is arranged to rotate about a vertical axis perpendicular to that X-Y plane and to reciprocate along that vertical axis in the Z direction. In addition, the table 16 may be rotated about the Z axis. In other embodiments, the table 16 may be configured to be rotated about the X or Y axes. Of course, as noted in the incorporated reference, still other machine tools may be embodied in accordance both with the prior invention and with the present invention. More particularly, a lathe embodiment may be utilized wherein the workpiece is supported along and rotated about an axis in a first direction while a cutting element is suitably controlled to be positioned both in a plane perpendicular to that axis and along that axis relative to the workpiece. For example, as shown in FIG. 4, the workpiece 250 and its supporting table 16 may be rotated about the X axis (denoted as the A axis degree of freedom) while the cutting element is moved in the X-Y plane. The angular displacement of the A axis about the X axis with respect to a reference axis in the Y-Z plane is denoted by $\theta$. Of course, other numerically controlled machine tool configurations may also be utilized in accordance with the principles of both the present invention and referenced patent.

The present embodiment of FIG. 4 utilizes stepping motors for controlling X, Y and Z axes motion as described in the above-referenced application, (using a series of major, and minor moves to accommodate the programmed feed rates and paths) and further utilizes a constant speed motor for controlling rotation about the X axis (A axis motion). In this configuration, for X-A SEQUENCES (e.g. helical SEQUENCES), A axis motion is directed continuously while a series of X major moves are directed at appropriate times to achieve the programmed feed rate and path. Of course, in other embodiments, similar configurations may readily be implemented for other axes.

Figure 2:
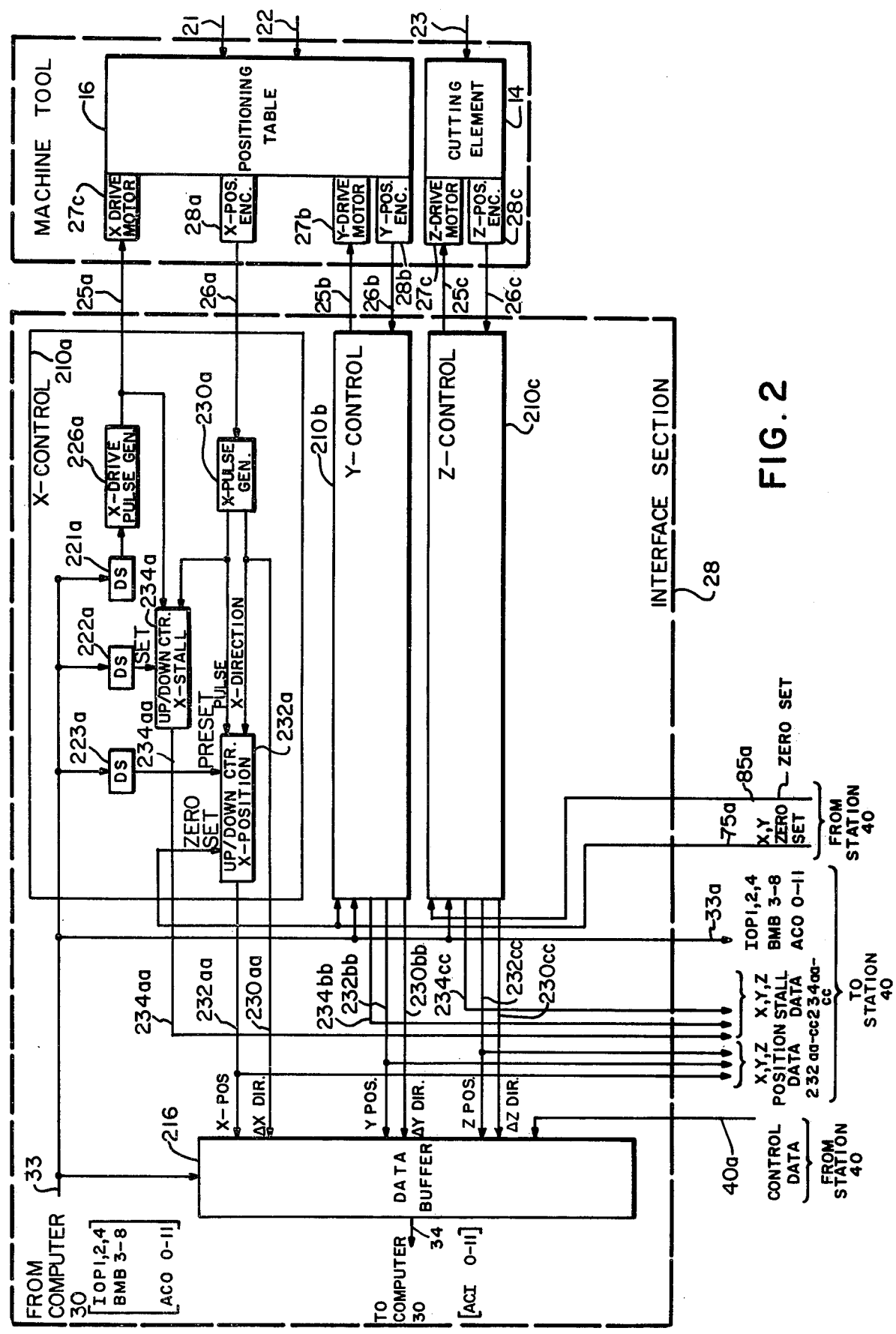
FIG. 2 shows in block diagram form a machine tool and interface section of FIG. 1.
Figure 3:
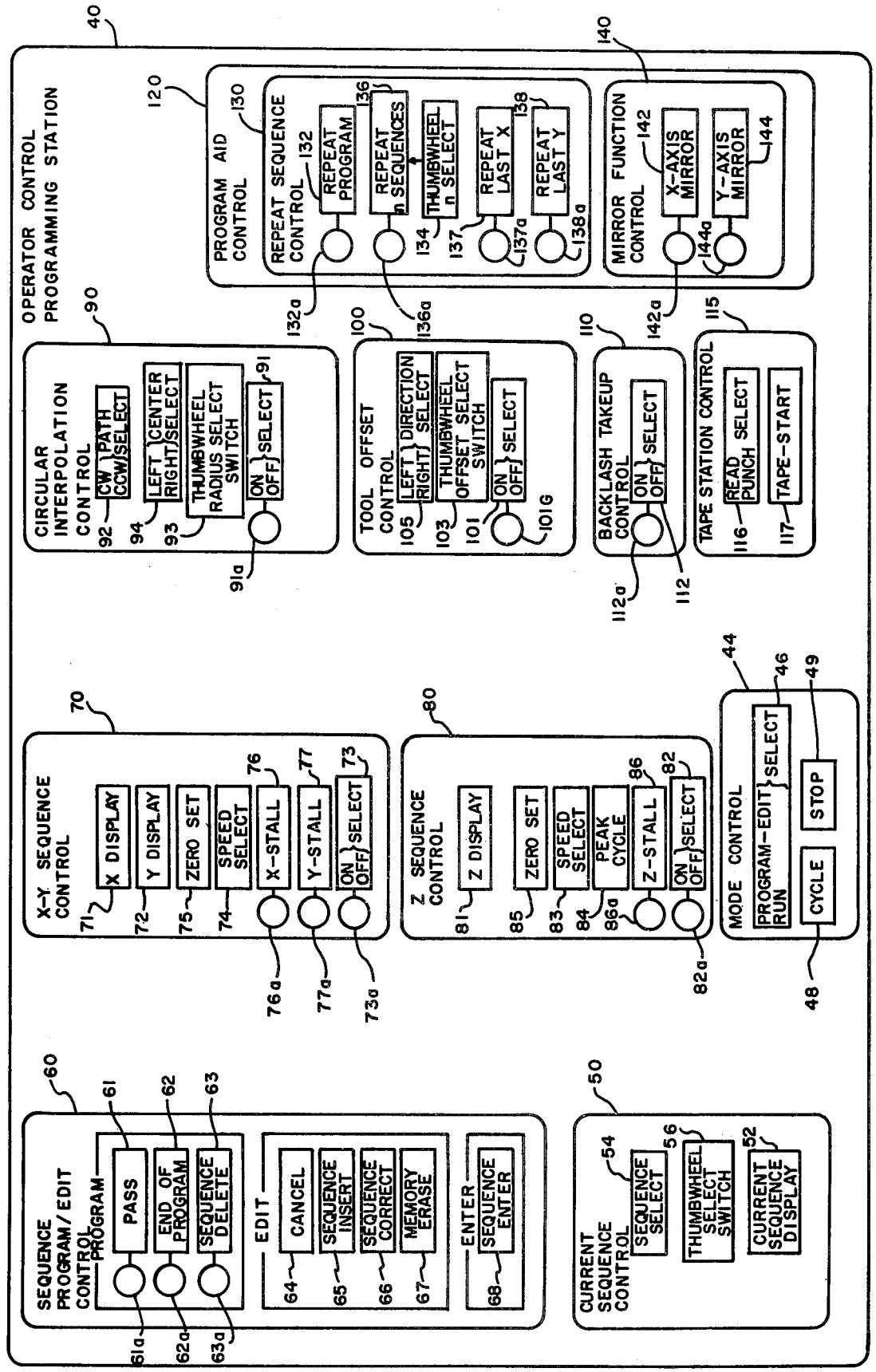
FIG. 3 shows a plan view of a portion of the operator control panel for use with the operator control/programming station of FIG. 1.

In the present embodiments, all the components of the embodiment of FIGS. 1-3 may be the same as those in the incorporated reference, with the exception that the X-Y SEQUENCE select 73 and speed select 74 include independent switches for each of the X and Y axes. With respect to FIG. 5, it will be understood that the electronic circuitry included in each block of that figure is comprised of well-known circuit elements including: integrated circuits (flip-flops, shift registers, counters and logic gates), resistors, capacitors, push button and thumb wheel switches, indicator lamps and display devices. These devices are configured in a well-known manner to perform the hereafter-described functional operations. More particularly, as with the embodiment of the referenced patent, interface circuits associated with computer 30 are configured in accordance with the well-known interface techniques described in the Digital Equipment Corporation's PDP-8/L User's Handbook.

Figure 5:
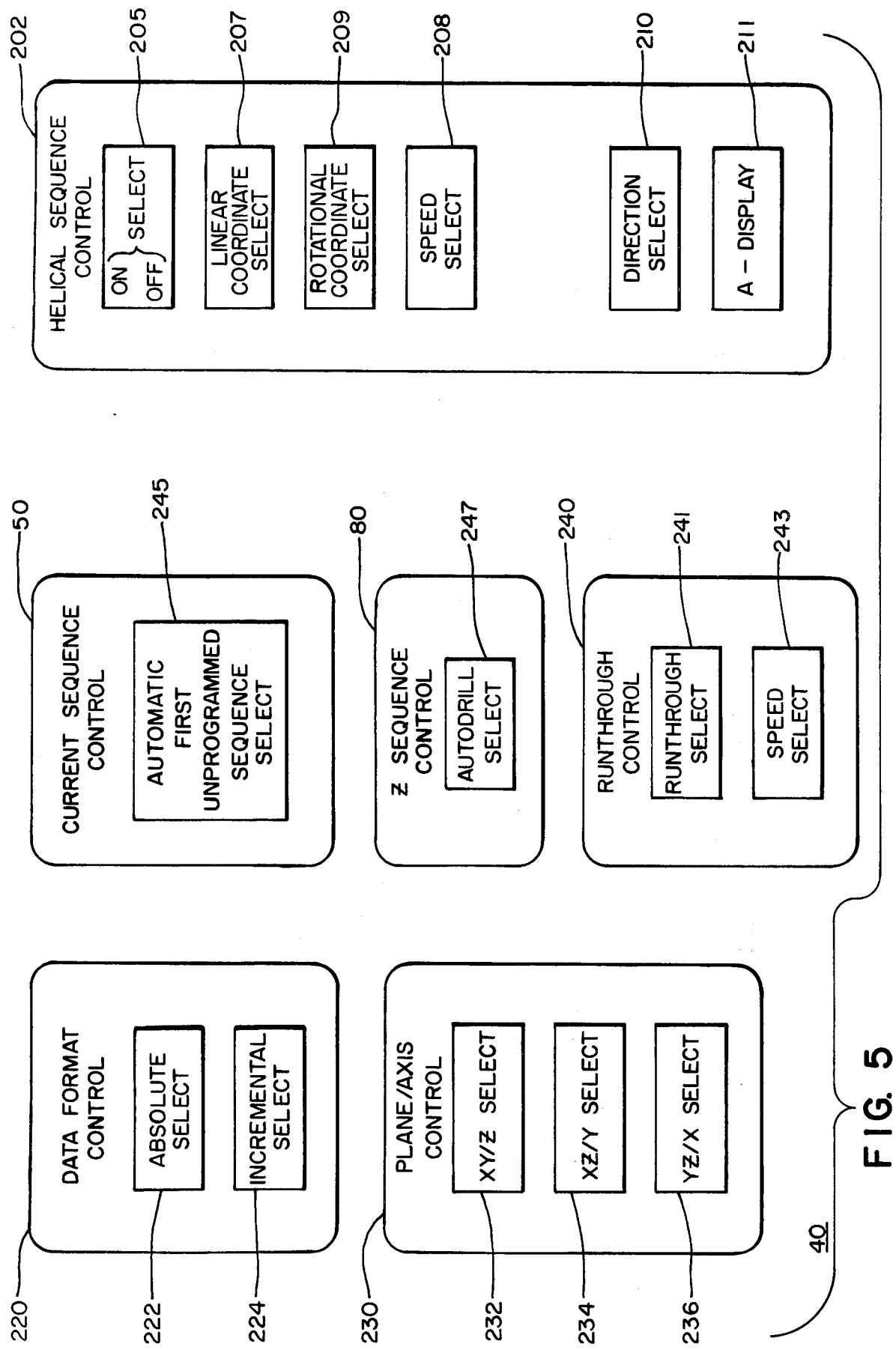
FIG. 5 shows a plan view of a further portion of the operator control panel for the operator control/programming station of FIG. 1.

In addition to these elements shown in FIG. 3, the operator control/programming station 40 further comprises HELICAL SEQUENCE CONTROL 202 (including select means 205, 207-210, and display 211), DATA FORMAT CONTROL 220 (including select means 222 and 224), PLANE/AXIS CONTROL 230 (including select means 232, 234 and 236), RUNTHROUGH CONTROL 240 (including select means 241 and 243), all shown in FIG. 5. In addition, the CURRENT SEQUENCE control 50 (FIG. 3) includes automatic first unprogrammed SEQUENCE select control 245, and the Z SEQUENCE CONTROL 80 (FIG. 3) includes autodrill select control 247.

The helical SEQUENCE control 202 includes select controls 207-210 for entering data suitable for defining a desired helical path and for defining a desired feed rate along the helical path. These controls 207-210 may be of the push button or thumb wheel select type. Alternatively, a keyboard may be utilized in conjunction with a data entry push button switch. Display 211 provides a visual output signal representative of the current angular displacement, $\theta$, of the A axis. The speed select 243 associated with the runthrough control 240 may also be similarly configured. All of these elements 207-210 and 243 include a single or multiple bit data register which may be loaded in response to signals generated by their associated operator controlled push button (or thumb wheel) switches at station 40. All of these registers may be simultaneously cleared by an operator-push button generated CANCEL signal, or by an appropriate computer command signal in a similar manner to the blocks in FIG. 3 as described in column 17 of the incorporated reference. In other embodiments individual CANCEL signals may be generated by the operator for cleaning selected individual registers.

The data outputs of each register is applied by way of line 40a to data buffer 216 for transferral upon command to the accumulator of computer 30. The other select means shown in FIG. 5 (i.e. blocks 205, 222, 224, 232, 234, 245, 247 and 241) are similarly configured but are arranged to accommodate single bit data representative of the ON or OFF position of their associated switch. Of course, in other embodiments, suitable decode and display devices may be utilized to display to the operator any of the signals entered by these controls.

At this point, it will be assumed that all of the blocks shown in FIGS. 3 and 5 have the appropriate switches, data registers, decoding and logic networks and interconnecting signal lines to accomplish the functional description that follows.

The digital computer 30 for an embodiment of this invention may be programmed in accordance with the computer program set forth in Appendix I which appears at the end of the description of the preferred embodiment. This embodiment includes all of the features described in the referenced patent. The further controls for the operator control programming station 40 which are necessary to implement the functions performed by the present embodiment are shown in FIG. 5. The function of these controls and the interaction with the programmed digital computer 30 will now be described. It will be understood that in this embodiment, each of the axes may be individually programmed for single coordinate SEQUENCES or jointly programmed for two coordinate SEQUENCES.

In addition to the method for selecting a SEQUENCE to be programmed described in the incorporated reference, in accordance with the present invention, the operator may also activate the automatic first unprogrammed SEQUENCE select control 245 in the PROGRAM-EDIT mode. In response thereto, the digital computer 30 automatically selects as the CURRENT SEQUENCE, the next available SEQUENCE number which has no associated previously stored program data. The number of this SEQUENCE is displayed in current SEQUENCE display 52 and thereafter the operator may program the SEQUENCE in the normal manner, described in conjunction with the incorporated reference.

Figure 6:
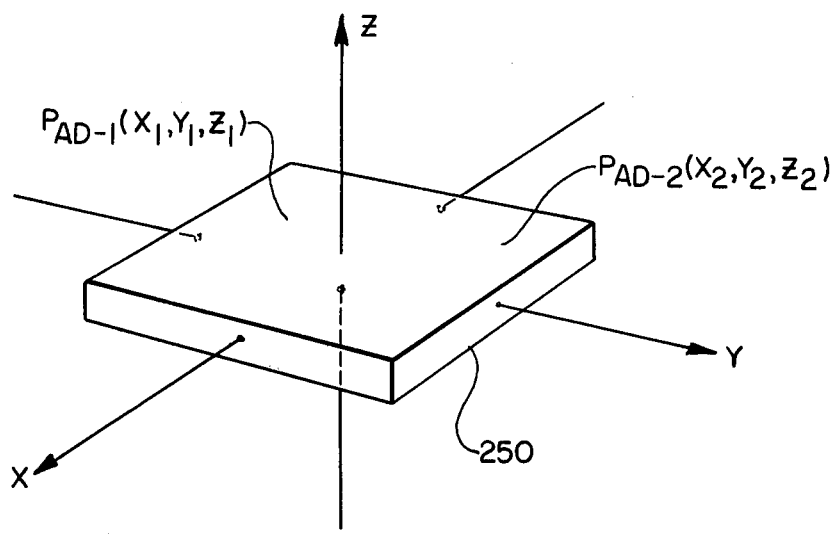
FIG. 6 shows an exemplary trajectory of the relative motion of the cutting element of FIG. 1 in response to an exemplary AUTODRILL SEQUENCE.

In the PROGRAM-EDIT mode, the operator may establish an AUTODRILL SEQUENCE by activating the autodrill select control 247 in conjunction with the programming of a current Z SEQUENCE. For example, in FIG. 6, a workpiece 250 is shown positioned with respect to X, Y and Z axes. In this example, it is assumed that a hole is desired at point $P_{AD-1}$ having coordinates $(X_1, Y_1, Z_1)$, and a second and identical hole is desired at the point $P_{AD-2}$ having coordinates $(X_2, Y_2, Z_2)$. In the PROGRAM-EDIT mode, the operator may first program a suitable succession of sequences to drill the desired hole at $P_{AD-1}$ using either a PECK CYCLE Z SEQUENCE pair or a pair of Z SEQUENCES directing the cutting element in the negative Z direction for the desired distance in association with the first SEQUENCE, and in the positive Z direction in association with the second SEQUENCE of the pair. Following the entry of one of these pairs of SEQUENCES via the SEQUENCE ENTER control 68, the operator may manually adjust the cutting element to point $P_{AD-2}$, activate autodrill select control 247, and then activate the SEQUENCE ENTER control 68. As a result, a single AUTODRILL SEQUENCE is stored in the computer memory whereby X-Y coordinate data representative of $P_{AD-2}$ is stored at the memory locations associated with the $P_{AD-2}$ SEQUENCE along with an AUTODRILL SEQUENCE identifier data word. Subsequently, when the AUTODRILL SEQUENCE is the current SEQUENCE in the RUN mode, computer 30 will identify this AUTODRILL SEQUENCE, and direct the cutting element first to the X, Y coordinates associated with the AUTODRILL SEQUENCE, and then direct the cutting element in the same motions that were specified in conjunction with the normal Z SEQUENCE pair stored in association with $P_{AD-1}$.

The operator may also in the PROGRAM-EDIT mode operate the plane/axis control 230 to establish cutting element motion in the direction of a selected axis or in a selected two coordinate plane. To program a one coordinate (X, Y or Z) SEQUENCE for directing motion along a selected axis, the operator may manually direct cutting element to a desired spatial point, and then set the X, Y or Z select switch, as desired, set a desired speed, set the appropriate one of the switches 236, 234 or 232 of plane/axis control 230, (thereby generating an X, Y or Z SEQUENCE tag to be stored with the SEQUENCE data), followed by the activation of SEQUENCE ENTER control 68. To generate a two coordinate (X-Y, X-Z or Y-Z) SEQUENCE, the operator may direct the cutting element to the desired point, and then set the two of the X, Y and Z select switches which are associated with the desired two coordinate axes, set the appropriate speed select controls, set the one of plane select controls 232, 234 or 236, corresponding to the desired X-Y, X-Z or Y-Z plane (thereby generating an X-Y, or X-Z or Y-Z SEQUENCE tag to be stored with the SEQUENCE data), followed by the activation of SEQUENCE ENTER control 68. If a circular motion is desired in the selected plane, the circular interpolation control 90 may be appropriately activated in conjunction with the data entry for the SEQUENCE currently being programmed. For either one or two coordinate SEQUENCES, if desired, the operator may omit the step of manually positioning the cutting element to the spatial point, if the coordinates of that point are entered by way of a keyboard entry means or equivalent.

In the RUN mode, the computer detects and identifies the plane/axis tag associated with a current SEQUENCE before generating axis drive signals. For the case of a one coordinate SEQUENCE, the one coordinate axis drive signals are generated and applied to the drive motor associated with the one coordinate tag axis. For a two coordinate SEQUENCE, having no circular interpolation tag, the computer utilizes the coordinate data stored in association with the current SEQUENCE to generate a corresponding series of two coordinate axis drive signals in accordance with the best straight line algorithm defined in the referenced patent. For a two coordinate SEQUENCE, having a circular interpolation tag, the computer utilizes the data stored in association with the current SEQUENCE to generate two coordinate axis drive signals in accordance with the circular interpolation algorithm as described in the referenced patent. In both of these cases, the resultant series of drive signals are applied to the drive motors means associated with the two coordinate tag axis in order to drive the cutting element along either the best straight line, or along the circular path in the specified plane.

Figure 7:
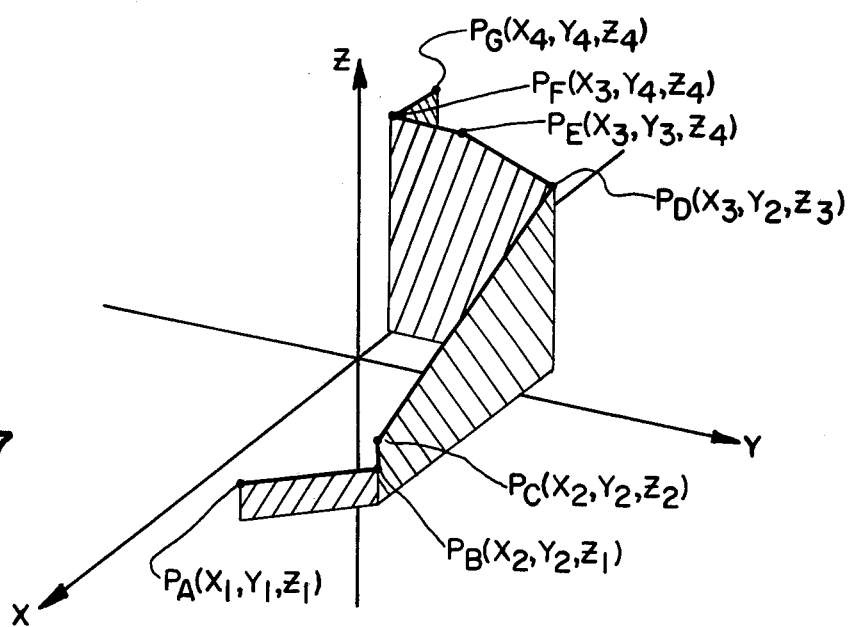
FIG. 7 shows an exemplary machine point for the cutting element of FIG. 1 in response to exemplary X-Y, Y-Z and X-Z PLANE SEQUENCES.

FIG. 7 illustrates an exemplary machine tool path with reference to an X, Y, Z coordinate system. As shown in FIG. 7, the spatial points $P_A$–$P_G$ illustrate the desired spatial points through which the cutting element is to pass from the initial point $P_A$ characterized by coordinates $X_1$, $Y_1$, $Z_1$. The solid lines interconnecting the various points $P_A$–$P_G$ are representative of the cutting element path. The diagonally shaded areas are representative of planes which aid in illustrating the path followed by the cutting element, and otherwise these planes have no significance.

Table I illustrates the one coordinate and two coordinate SEQUENCES which are required to drive the cutting element from the initial point $P_A$ to the final point $P_G$ in FIG. 7. In the first column of Table I, $SEQ_{AB}$, $SEQ_{BC}$, $SEQ_{CD}$, $SEQ_{DE}$, $SEQ_{EF}$, and $SEQ_{FG}$ represent the SEQUENCES required for directing motion between points A and B, B and C, C and D, D and E, E and F and F and G, respectively. The second column represents the plane of motion or axis direction of motion, for the respective SEQUENCES of column 1. The third column indicates the coordinated values stored in association with the SEQUENCES of column 1 and the remaining columns indicate the binary state of select switches 232, 234 and 236 during the programming of the SEQUENCES of column 1.

TABLE I

| SEQUENCE | Initial Point: $P_A(X_1, Y_1, Z_1)$ | | XY/Z | XZ/Y | YZ/X |
|---|---|---|---|---|---|
| | PLANE/ AXIS | STORED CO-ORDINATES | | | |
| $SEQ_{AB}$ | X—Y | $X_2, Y_2$ | 1 | 0 | 0 |
| $SEQ_{BC}$ | Z | $Z_2$ | 1 | 0 | 0 |
| $SEQ_{CD}$ | X—Z | $X_3, Z_3$ | 0 | 1 | 0 |
| $SEQ_{DE}$ | Y—Z | $Y_3, Z_4$ | 0 | 0 | 1 |
| $SEQ_{EF}$ | Y | $Y_4$ | 0 | 1 | 0 |
| $SEQ_{FG}$ | X | $X_4$ | 0 | 0 | 1 |

In this example, the first sequence, $SEQ_{AB}$ is a two coordinate (X-Y) SEQUENCE and directs cutting element motion parallel to the X-Y plane from point A to B. The SEQUENCE $SEQ_{BC}$ is a one coordinate (Z) SEQUENCE, and directs single coordinate motion in a direction parallel to the Z axis from points $P_B$ to $P_C$. Similarly, the remaining SEQUENCES produce cutting element motion along the solid line connecting points $P_B$, $P_C$, $P_E$, $P_F$ and $P_G$.

While the above illustrated operation of plane/axis control 230 shows operations for X, Y and Z coordinate systems, it will be understood that a further plane/axis control select may be utilized for systems having additional axis, such as a rotational axis. In such systems, for example, as described below in conjunction with HELICAL SEQUENCE control 202, for a system as shown in FIG. 4, having X, Y and Z axes and a rotational A axis (for rotation about the X axis), the select control 205 establishes a HELICAL (X-A) SEQUENCE as described below. In the RUN mode, the computer generates a series of X and A axis drive signals in accordance with the best straight line algorithm and applies those signals to the respective X and A axis motors to direct cutting element motion along a helical path about the X axis. It will be understood that the latter signals would result in straight line motion in the X-A plane if the A axis was linear instead of rotational.

As noted above, the operator may also program a helical path to be followed by the cutting element with respect to the workpiece by activation of the controls in HELICAL SEQUENCE control 202. It will be understood that this mode of operation may be established by the milling or grinding machine tool (as shown in FIG. 1) by rotating the positioning table and the workpiece attached thereto about the Z axis (with the angle of rotation $\theta$ of the table with respect to a reference axis in the X-Y plane being a measure of the A-axis displacement) while translating a suitable cutting element 14 (such as a right angle head element) along the direction parallel to the Z axis but offset from the Z axis by a predetermined distance R. The lathe embodiment shown in FIG. 4 is also suitable, and in many applications more suitable for establishing this helical path for the cutting element. In such an embodiment, the cutting element may be controlled to move in the X direction at a predetermined distance R from the rotational axis of the workpiece (i.e. the X axis), while the workpiece is rotated about the X axis. Of course, in this latter embodiment, the cutting element may be controlled to be different distances from the rotational axis of the workpiece in order to achieve different radius helical paths, and also the cutting element may be fixed along the X axis while the workpiece is translated along that axis. Furthermore, a suitable cutting element may also be adapted for rotational motion in this embodiment.

In the presently-described embodiment with the lathe of FIG. 4, a helical path is programmed by the storing of a HELICAL (X-A) SEQUENCE pair, with the first SEQUENCE of the pair including data representative of the X and A axis coordinates of the initial point of the helical point ($X=X_1$ and $\theta = \theta_o$). The radius of the helical path $R_o$ is implicitly defined by the coordinate of the next previous SEQUENCE in the stored succession. In alternative embodiments, a helix radius may be explicitly programmed with a suitable select control. The first SEQUENCE further includes data representative of a desired feed rate at which the cutting element is to approach the initial point.

The second SEQUENCE of the pair specifies the final point of the helix (in terms of data representative of the X and A coordinates of the final point of the helical path) and desired feedrate or speed along the path. In other embodiments, different SEQUENCE formats may be used.

In entering a HELICAL SEQUENCE pair, the operator specifies a desired helical path (e.g. path 260 in FIG. 8) by manually directing the cutting element to the desired initial coordinates of the helix, and then activating switch 205 (to specify an X-A SEQUENCE and store a HELICAL SEQUENCE identifying word) switch 208 (to specify approach feedrate), and SEQUENCE ENTER control 68 to generate the first SEQUENCE of the HELICAL SEQUENCE pair. The operator may then position the cutting element to the final point of the desired helix (to specify the helix direction and final X and A coordinate values), activate speed select 208, and finally SEQUENCE ENTER control 68 to generate the second of the HELICAL SEQUENCE pair. Alternatively, the operator may enter the final X coordinate by way of the thumbwheel switch (or equivalent) associated with linear coordinate select 207 (represented by the distance of the final point from the origin L along the helix axis), the final A coordinate by way of the thumbwheel switch associated with rotational coordinate select 209 (represented by D, the product of the helix density (number of revolutions per unit length) times 360 degrees times L) and the helix direction by way of direction select 210. Thumbwheel or keyboard switches could also be utilized to generate signals representative of desired initial coordinate data, in lieu of the manual direction operation. Following the activation of controls 207-210, the activation of SEQUENCE enter control 68 stores the second SEQUENCE of the pair. This second of the HELICAL SEQUENCE pair is suitable for use with an embodiment wherein the A axis motion, as well as X, Y and Z motion is controlled by stepping motors using the major and minor move and best straight line algorithm described in the U.S. Pat. No. 3,878,983. Alternatively, where the A axis is controlled to move at constant speed, while the X, Y and Z axis motions are controlled with stepping motors, the X axis motion may be directed with X axis major moves which are suitably spaced in time to achieve the desired feedrate and path. In this latter type embodiment, the second of the HELICAL SEQUENCE pair only requires helix density data instead of D and L data.

Figure 8:
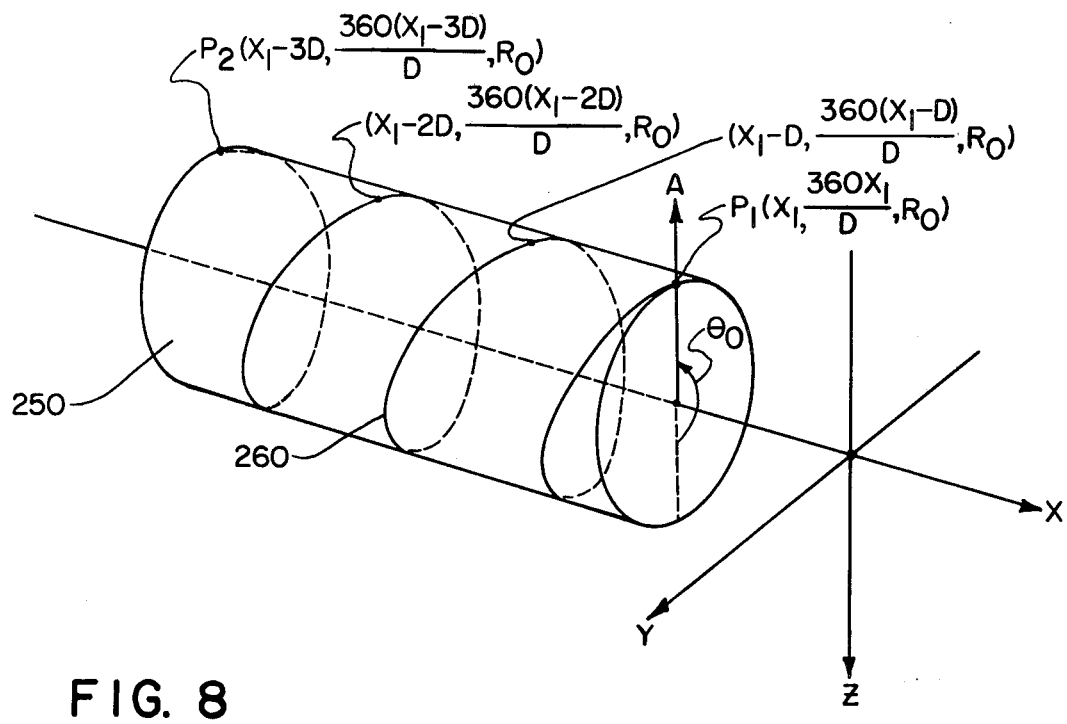
FIG. 8 shows an exemplary trajectory of the relative motion of the cutting element of FIG. 1 in response to an exemplary HELICAL SEQUENCE pair.

FIG. 8 shows an exemplary helical path 260 on a workpiece 250 which commences at initial point $P_1$ in the plane $X = X_1$ (i.e. L equals X), and lying at a distance $R_o$ from the X axis in the direction of the Z axis. The path 260 continues counterclockwise from the origin of the X, Y and Z axes (positive $\theta$) in the negative X direction and extends three full revolutions about the X axis, with a distance D per revolution along that axis, i.e. the helix density equals 1/D. Accordingly, $P_1$ is characterized by X-A-Z coordinates $(X_1, 360X_1/D, R_o)$. As shown in FIG. 8, path 260 passes through the intermediate X-A-Z points $(X_1 - D, (360(X_1-D)/D, R_o)$ and $(X_1 - 2D, (360(X_1-2D))/D, R_o)$ and the final point $P_2$ $(X_1-3D, (360(X_1-3D))/D, R_o)$.

To program such a path for a system using D and L data, following a Y SEQUENCE with associated coordinate $Y = R_o$, the operator first directs the cutting element to be positioned at point $P_1$, activates X-A SEQUENCE select control 205, selects the desired initial point approach feedrate via switch 208, and then activates SEQUENCE ENTER control 68 to store the first of the HELICAL SEQUENCE pair. The operator may then program the second HELICAL SEQUENCE of the pair by storing the helix final point X axis coordinate, L, by appropriately setting a thumbwheel (or equivalent) selector associated with control 207 to the value $X_1 - 3D$, and the final point A axis coordinate, D, by way of the thumbwheel selector associated with control 209

(e.g.) $\frac{1 \text{ revolution}}{D \text{ unit lengths}}$ times 360 degrees/revolution times $(X_1 - 3D)$ unit lengths, or $\frac{360}{D}$ $(X_1 - 3D)$ degrees, the desired feed rate via the thumbwheel selector associated with control 208, the counterclockwise direction by the appropriate positioning of the switch associated with control 210, and, by finally activating the SEQUENCE ENTER control 68.

In the RUN mode, when the first of the HELICAL SEQUENCE pair is the current SEQUENCE, the computer identifies the SEQUENCE as a HELICAL SEQUENCE and the cutting element is driven to point $P_1$. Then the second of the pair becomes the current SEQUENCE and the computer identifies that SEQUENCE as a HELICAL SEQUENCE via the identifying data word and then generates appropriate motion command signals to rotate the workpiece and translate the cutting element to establish the programmed motion along the helical path 260. The motion command signals are generated for the X and A axis drive motors in a similar manner as for the X and Y axis drive motors as described in the referenced patent, that is, a series of X major, A major, X-A minor moves and zero moves are established in order to achieve the best line in the X-A plane at the programmed feed rate. In alternate embodiments, the workpiece rotational axis (e.g. the X axis in FIG. 4) may be angularly displaced from the helix axis (which remains fixed in space) in order to generate a tapered helical path on the workpiece.

In certain applications, the desired cutting element relative path may comprise a pair of helical paths at adjacent locations along the X axis (of the FIG. 4 embodiment, for example), having identical radii but differing densities (numbers of revolutions per unit length along the X axis). A HELICAL TRANSITION SEQUENCE pair may be generated for establishing transition cutting element motion between the two helical paths for which no step accelerations are required. For example, as depicted in the X-A plane of FIG. 9, two general helical paths $S_1$ and $S_2$, may be joined in continuous fashion at points $P_1$ $(X_1, A_1)$ and $P_2$ $(X_2, A_2)$ (and where dA/dX at $P_1$ and $P_2$ are equal for the joined paths) by the circular arc segment $S_3$ having a radius R, center $P_3$ and a slope tan $\alpha$ at $P_1$ and slope tan $\beta$ at $P_2$. In that figure, $S_1$ and $S_2$ may be respectively represented by the equations:

$$A_{S_1} = (\tan \alpha) X + C_1,$$

and $$A_{S_2} = (\tan \beta) X + C_2$$

where $\alpha$ and $\beta$ are the respective angles formed by $S_1$ and $S_2$ with the X axis, and $C_1$ and $C_2$ are the respective A axis intercepts. The radius R is determined according to the formula:

$$R = \frac{\frac{1}{2} \cdot \sqrt{(\Delta A)^2 + (\Delta X)^2}}{\cos\left(90 - \left(\frac{\alpha - \beta}{2}\right)\right)}$$

where $\Delta A = A_2 - A_1$ and $\Delta X = X_2 - X_1$, and $\Delta A$ and $\Delta X$ are related by the formula:

$$\Delta A / \Delta X = \tan((\alpha + \beta)/2)).$$

Accordingly, the operator programs a path comprising two helical path segments such as $S_1$ and $S_2$ with a circular arc (in the X-A plane) joinder path such as $S_3$ by initially generating the appropriate HELICAL SEQUENCE pair for $S_1$, and then specifying a desired $\Delta X$ (or $\Delta A$) and computing R, and then generating and storing a HELICAL TRANSITION SEQUENCE pair for $S_3$, and finally generating an appropriate HELICAL SEQUENCE pair for $S_2$. To generate and store the TRANSITION SEQUENCE pair, the operator may first manually direct the cutting element to the point $P_1$, and then activate HELICAL SEQUENCE select control 205 followed by SEQUENCE ENTER control 68, thereby storing initial coordinate data $X_1$ and $A_1$. However, the resultant SEQUENCE is identical to the second of the HELICAL SEQUENCES which define $S_1$.

Accordingly, the operator may omit this first at the TRANSITION SEQUENCE pair with the result that the second of the two $S_1$ HELICAL SEQUENCE pair series as the first of the TRANSITION SEQUENCE pair. In the present embodiment, when there are intervening SEQUENCES between the $S_1$ SEQUENCE pair and the second of the TRANSITION SEQUENCE pair, the first of the TRANSITION SEQUENCE pair must be entered.

Figure 9:
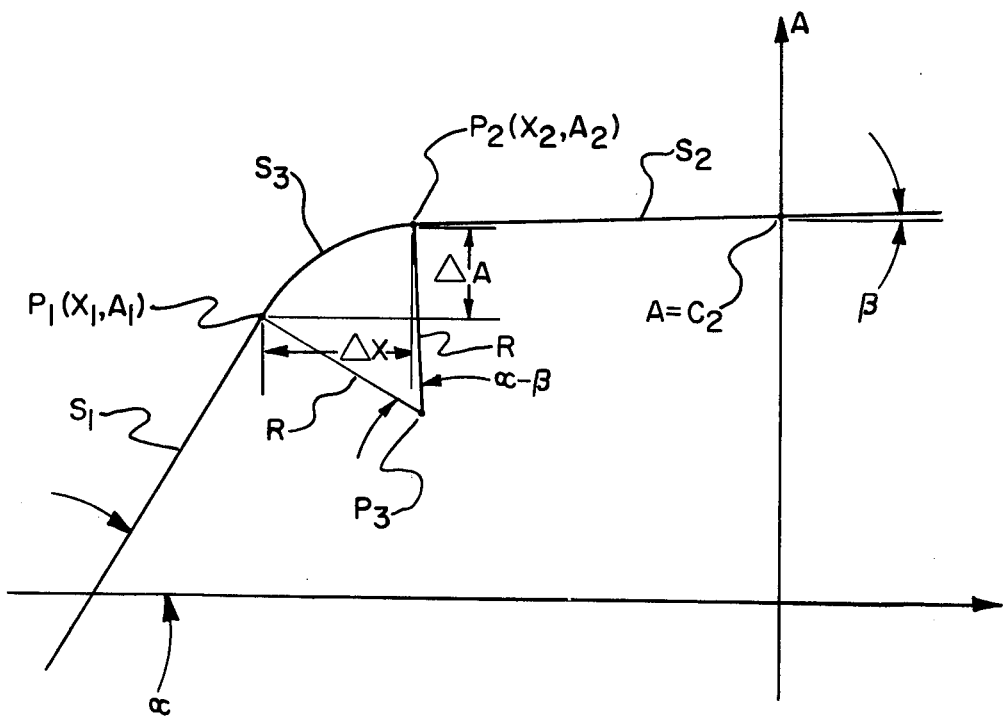
FIG. 9 shows an exemplary trajectory in the X-A plane for two helical path segments joined by a circular arc path segment.

The operator may open into the second of the TRANSITION SEQUENCE pair by directing the cutting element to arc end point $P_2$ and activating both the HELICAL SEQUENCE select control 205 and CIRCULAR INTERPOLATION select control 91 followed by activation of path select control 92, center select control 94, radius select control 93, speed (feedrate) select, control 208 and finally SEQUENCE ENTER control 68, thereby storing circular arc path direction and center data as may be determined from FIG. 9, circular radius data as determined from the above formula, and desired feedrate data. In the RUN mode, the computer identifies the HELICAL SEQUENCES for $S_1$ and $S_2$ as described above and directs the cutting element path to follow $S_1$ and $S_2$ respectively when the corresponding SEQUENCES are current. When the second SEQUENCE of the TRANSITION SEQUENCE pair is current, the computer generates X and A axis drive signals in a manner similar to that for the X and Y axis drive signals described in the referenced patent in conjunction with the circular interpolation control, with the A axis merely substituting for the Y axis. Following this operation, the HELICAL SEQUENCE pair for $S_3$ controls the cutting element motion.

Figure 10:
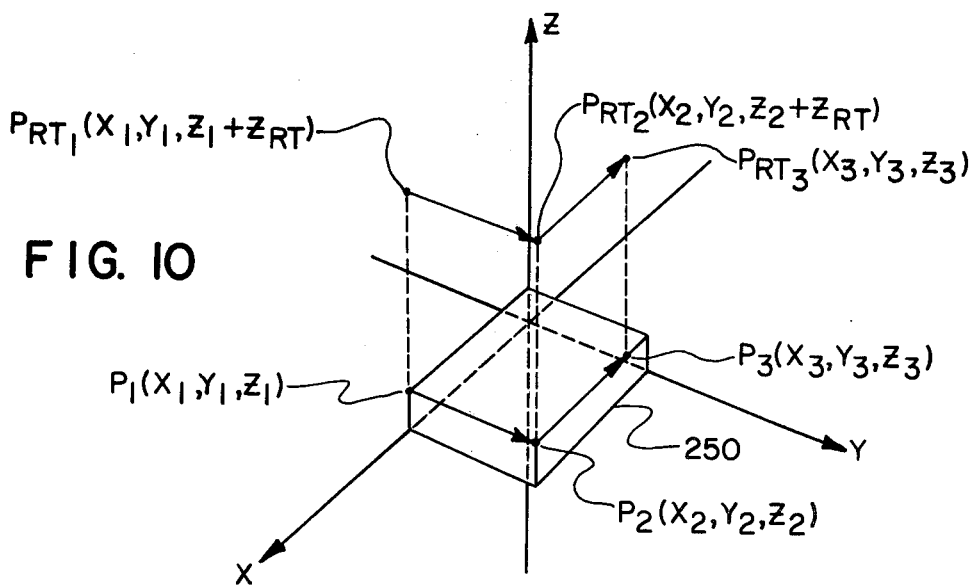
FIG. 10 shows an exemplary trajectory of the relative motion of the cutting element of FIG. 1 in response to the RUNTHROUGH control for exemplary X-Y SEQUENCES.

The operator may also direct a rapid rate runthrough of the points programmed at a predetermined distance from the workpiece to aid in his programming operations. By way of example, an exemplary runthrough path is illustrated in FIG. 10 in conjunction with a workpiece 250 wherein a succession of SEQUENCES are assumed to establish cutting element motion connecting points $P_1$ ($X_1$, $Y_1$, $Z_1$), $P_2$ ($X_2$, $Y_2$, $Z_2$) and $P_3$ ($X_3$, $Y_3$, $Z_3$) in straight line paths (where in the illustration $Z_1 = Z_2 = Z_3$). Using runthrough control 240 in the RUN mode, the operator may direct cutting element 14 to pass through the respective points $P_{RT-1}$, $P_{RT-2}$ and $P_{RT-3}$, which points correspond to the points $P_1$, $P_2$ and $P_3$, respectively, except that the Z coordinate is displaced by a predetermined constant $Z_{RT}$. For the present embodiment, to establish such motion, the operator may first manually displace the workpiece in the Z direction by offset distance $Z_{RT}$, then select the RUN mode, select the SEQUENCE associated with $P_1$ as the current SEQUENCE, activate the runthrough select control 241, select a desired runthrough speed (by way of the speed select control 243) and finally activate the CYCLE control. As a result, the computer performs the runthrough operation by directing the cutting element along the straight line path connecting points $P_{RT-1}$, $P_{RT-2}$, and $P_{RT-3}$, as shown in FIG. 10, at the runthrough feedrate, rather than in accordance with the feedrate data stored in association with the SEQUENCES. In alternative embodiments, a predetermined value for $Z_{RT}$ may be stored by the computer for automatic selection in response to activation of control 240.

In all of the above operations and in conjunction with the programming operations performed in accordance with the incorporated reference, the operator may activate the data format control 220 by selecting either the absolute control 222 or the incremental control 224 so that the data entered via the thumbwheel switches associated with various data entry means may be performed in either absolute or incremental form, respectively. It will be understood that in accordance with the present invention, the data is stored in all cases in the computer 30 memory in absolute form. Accordingly, when the incremental select control 224 is activated, the subsequently entered data is first transformed to absolute form before being stored in association with the respective SEQUENCES. As a result, the operator may at any time select any SEQUENCE and the machine operation associated therewith may be performed in the RUN mode based on the current cutting element position and without reference to a preceding machine operation.

In a multiple axis machine tool system in accordance with the present embodiments, the coordinate data stored in association with each SEQUENCE is in absolute form, representative of the coordinate values of the associated spatial point. As a consequence, any of the programmed SEQUENCES may be selected by the operator in the RUN mode as a current SEQUENCE. In order to provide this function, the computer maintains a readily accessible "scratch-pad" storage of the coordinate values stored with the most recent SEQUENCE associated with each axis, and in the RUN mode in response to the selection of any SEQUENCE, in or out of the order other stored succession of SEQUENCES, the cutting elements is directed to the same spatial point as it would have been if the current SEQUENCE had been selected in the course of stepping through the succession of SEQUENCES in order. For example, for a machine system having X, Y and Z axes, such as that described in U.S. Pat. No. 3,878,983, when a two coordinate (e.g. X-Y) SEQUENCE is selected as current, the cutting element is directed first to a reference coordinate along the Z axis, and then to the two coordinates (X and Y) stored in association with the current SEQUENCE, and finally to the one coordinate (Z) stored in association with the next previous one coordinate (e.g. Z) SEQUENCE in the succession of SEQUENCES stored in the computer memory. When a one coordinate SEQUENCE is selected as current, the cutting element is directed first to a reference coordinate along the one coordinate axis, then to the two coordinates associated with the next previous two coordinate SEQUENCE in the succession, and finally to the single one coordinate stored in association with the current SEQUENCE.

In other embodiments, the computer may reconstruct the cutting element history by directing movement to previous and current SEQUENCE coordinated in a different order, such as initial Z, A, X-Y, Z for a X-Y-Z-A axis system, or as a further example, eliminate the initial one coordinate (Z) displacement, and use the A, Z, X-Y order. In plane switching SEQUENCES, still other orders may be used.

In addition to maintaining the so-called scratch-pad storage of the most recent coordinate values in the present embodiment, the computer also displays to the operator an indication of these values. For example, in the embodiment described in conjunction with FIGS. 3 and 5, when an X-Y SEQUENCE is selected as current in the PROGRAM-EDIT mode, the X and Y displays, 71 and 72, display the X and Y coordinate values associated with the current SEQUENCE, and, in addition, Z and A displays 81 and 211 display the respective Z and A coordinate values associated with the next previous Z and A SEQUENCES in the stored succession of SEQUENCES. If the current SEQUENCE is the first unprogrammed SEQUENCE, then all of the X, Y, Z and A displays provide the operator with an indication of the corresponding most recent coordinate values. Furthermore, in the present embodiment, the operator may transfer the displayed values directly to the coordinate data registers associated with one of the SEQUENCE controls 70, 80 and 202 so that those values may be stored with the current SEQUENCE. This aspect of the present invention is particularly useful to the operator, since it permits him to not only easily keep abreast of the most recent cutting element excursions along or about the axes (or along or about those axes not associated with the current SEQUENCE), but also to utilize these coordinate values in programming further SEQUENCES by directly entering those values in the current SEQUENCE. In other embodiments, other program parameters (e.g. tool offset distance and direction, spindle speed, and current cutting element tool type or designation) may be similarly displayed to the operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX I

```
 1                    .TITLE HAMILL CO. RANC-4 22-JAN-76
 2                    /PROGRAMMED BY J. C. KILBANE
 3
 4            0001    FIELD 1
 5
 6            0000    *0
 7
 8   10000    7402    HLT
 9
10            0000    FIELD 0
11
12            0100    *FILES
13
14   00100    6221    CDF 20
15   00101    0000    0
16
17            0200    *200
18
19                    .ENABL LSB
20
21   00200    3021    START,DCA WORD/START UP
22   00201    3022    DCA LOAD
23   00202    3020    DCA EXP
24   00203    3257    DCA 1S
25
26   00204    4407    PS,FENT
27   00205    0016    RNM
28   00206    6657    FPUT I 1S
29   00207    0000    FEXT
30   00210    2257    ISZ 1S
31   00211    1257    TAD 1S
32   00212    1377    TAD (-FP.ZIP)
33   00213    7750    SPA SNA CLA
34   00214    5204    JMP 2S
35   00215    4407    FENT
36   00216    5260    FGET 3S
37   00217    0017    FNOR
38   00220    6052    FPUT STEPS
39   00221    5030    FGET FP.ZIP
40   00222    6055    FPUT NRECS
41   00223    0000    FEXT
42   00224    4776    JMS LTSOFF
43   00225    4775    JMS PTAG
44   00226    0100    FILES
45   00227    3055    DCA W.NUM
46   00230    3126    DCA RETRO
47   00231    3074    DCA RECI
48   00232    3071    DCA NEXTF
49   00233    3073    DCA FFOUND
50   00234    3125    DCA VMASK
51   00235    6007    6007
52   00236    6432    6432
53   00237    6430    6430
54
55   00240    1374    P.MEMC,TAD (162)
56   00241    4773    JMS PUT
```

```
57   00242 0076    PTA
58   00243 4772    JMS INC
59   00244 0076    PTA
60   00245 4771    JMS PTAP
61   00246 0102    PTROT
62   00247 1370    TAD (10)
63   00250 4773    JMS PUT
64   00251 0076    PTA
65   00252 4767    JMS DEC
66   00253 0076    PTA
67   00254 6603    6603
68   00255 3766    DCA WAXIS
69   00256 5765    JMP R.SSS
70
71   00257 0000    1S,0
72   00260 0027    3S,27;0;32
     00261 0000
     00262 0032
73
74   00263 0000    ISAVE,0/SAVE COUNTERS ON POWER FAIL
75   00264 1364    TAD (F.NUM-1)
76   00265 3010    DCA XR0
77
78         0000           D=0
79
80         0004           .REPT 4
81
82                        6502+D
83                        DCA I XR0
84                        6503+D
85                        DCA I XR0
86                        RAL
87                        DCA I XR0
88
89                        D=D+10
90
91                        .ENDR
92
93   00316 5663    JMP I ISAVE
94
95   00317 7200    PWUP,CLA
96   00320 1364    TAD (F.NUM-1)
97   00321 3010    DCA XR0
98   00322 1060    TAD W.AXIS
99   00323 6603    6603
100  00324 7200    CLA
101
102        0000           D=0
103
104        0002           .REPT 2
105
106                       TAD I XR0
107                       6500+D
108                       CLA
109                       TAD I XR0
110                       MQL
111                       TAD I XR0
112                       CLL RAR
113                       ACL
114                       6501+D
115                       CLA
116
117                       D=D+10
118
119                       .ENDR
120
121  00351 5763    JMP PWUQ
122
123                       .DSABL LSB
124
     00363 0501
     00364 0022
     00365 4603
     00366 5041
     00367 1645
     00370 0010
```

```
        00371 1456
        00372 1621
        00373 1600
        00374 0162
        00375 1470
        00376 2302
        00377 7750
125     00400           PAGE 1               0400    PT=.
2
3               0001    *1
4
5       00001 5402      JMP I .+1
6       00002 0403      IPROC
7       00003 0317      PWUP
8       00004 0531      RPVEC
9
10              0400    *PT
11                      .ENABL LSB
12
13      00400 6233      BKPNT,CDI 30
14      00401 5777      JMP I (6200)
15
16      00402 5214      JMP 3$
17
18      00403 3277      IPROC,DCA ACCUM/INTERRUPT HANDLER
19      00404 7004      RAL
20      00405 3300      DCA LINK
21      00406 6102      6102
22      00407 5223      JMP 1$
23      00410 4776      JMS ISAVE
24      00411 1375      TAD (JMP I 3)
25      00412 3000      DCA 0
26      00413 7402      HLT
27
28      00414 7300      3$,CLA CLL
29      00415 1300      TAD LINK
30      00416 7010      RAR
31      00417 1277      TAD ACCUM
32      00420 6244      RMF
33      00421 6001      ION
34      00422 5400      JMP I 0
35
36      00423 6435      1$,6435
37      00424 5230      JMP 5$
38      00425 7001      IAC
39      00426 3774      DCA AUXDUN
40      00427 5214      JMP 3$
41
42      00430 6031      5$,KSF
43      00431 5237      JMP 6$
44      00432 6036      KRB
45      00433 1373      TAD (-204)
46      00434 7640      SZA CLA
47      00435 5214      JMP 3$
48      00436 5200      JMP BKPNT
49
50      00437 6041      6$,TSF
51      00440 5243      JMP 7$
52      00441 6042      TCF
53      00442 5214      JMP 3$
54
55      00443 6431      7$,6431
56      00444 5214      JMP 3$
57      00445 6433      6433
58      00446 3123      DCA INTVAL
59      00447 6432      6432
60      00450 6601      6601
61      00451 5265      JMP 8$
62      00452 1123      TAD INTVAL
63      00453 0372      AND (7770)
64      00454 7640      SZA CLA
65      00455 5275      JMP 18$
66      00456 2123      ISZ INTVAL
67      00457 1123      TAD INTVAL
```

```
68    00460 1125     TAD VMASK
69    00461 7640     SZA CLA
70    00462 5214     JMP 3S
71    00463 6001     ION
72    00464 5771     JMP I ZLIMIT
73
74    00465 1123     8S,TAD INTVAL
75    00466 0372     AND (7770)
76    00467 7640     SZA CLA
77    00470 5214     JMP 3S
78    00471 7240     STA
79    00472 1123     TAD INTVAL
80    00473 7650     SNA CLA
81    00474 1370     TAD (20)
82
83    00475 3123     16S,DCA INTVAL
84    00476 5214     JMP 3S
85
86    00477 0000     ACCUM,0
87    00500 0000     LINK,0
88
89                   .DSABL LSB
90
91    00501 0020     PWUQ,D=20
92
93          0002     .REPT 2
94
95                   TAD I XR0
96                   6500+D
97                   CLA
98                   TAD I XR0
99                   MQL
100                  TAD I XR0
101                  CLL PAR
102                  ACL
103                  6501+D
104                  CLA
105
106                  D=D+10
107
108                  .ENDR
109
110   00525 6007     6007
111   00526 6430     6430
112   00527 6432     6432
113   00530 5767     JMP R.SSS
114   00531 0000     RPVEC,0
115   00532 0000     0
116   00533 0000     0
117
      00567 4603
      00570 0020
      00571 5551
      00572 7770
      00573 7574
      00574 6073
      00575 5403
      00576 0263
      00577 6200
118   00600          PAGE 1     00600 0000     FETCH,0/FETCH RECORD (F.NUM)
2     00601 3037     DCA F.STRT
3     00602 3040     DCA F.EOF
4     00603 1023     TAD F.NUM
5     00604 3075     DCA FREC
6     00605 4777     JMS FETS
7     00606 1111     TAD RBUFF+1
8     00607 4776     JMS RITSEP
9     00610 0012     10.
10    00611 0025     F.AUX
11    00612 1111     TAD RBUFF+1
12    00613 0375     AND (3)
13    00614 3026     DCA F.AXIS
14    00615 1110     TAD RBUFF
```

```
15    00616  7002          BSW
16    00617  7012          RTR
17    00620  0374          AND (17)
18    00621  3025          DCA P.AUX
19    00622  1110          TAD RBUFF
20    00623  7012          RTR
21    00624  7012          RTR
22    00625  0374          AND (17)
23    00626  3024          DCA P.TYPE
24    00627  1024          TAD P.TYPE
25    00630  1373          TAD (JMP I 1S)
26    00631  3232          DCA .+1
27    00632  7402          HLT
28
29    00633  0643          1S,10S/XY
30    00634  0670          20S/CIR
31    00635  0676          30S/Z
32    00636  0707          40S/A
33    00637  0715          50S/SPEED
34    00640  0721          60S/TOOL CHANGE
35    00641  0727          70S
36    00642  0730          80S/EOF
37
38    00643  4332          10S,JMS FOFFX
39    00644  0117          RBUFF+7
40    00645  1032          TAD P.OFF
41    00646  7650          SNA CLA
42    00647  5256          JMP 12S+1
43    00650  4407          FENT
44    00651  7255          FJMP 12S
45    00652  0006          GTZ LTZ
46    00653  0000          FEXT
47    00654  2037          ISZ P.STRT
48
49    00655  0000          12S,FEXT
50    00656  4772          JMS DFLOAT
51    00657  0113          RBUFF+3
52    00660  0001          P.X
53    00661  4772          JMS DFLOAT
54    00662  0115          RBUFF+5
55    00663  0003          P.Y
56
57    00664  4771          15S,JMS SFLOAT
58    00665  0112          RBUFF+2
59    00666  0000          P.SPD
60    00667  5600          JMP I FETCH
61
62    00670  4332          20S,JMS FOFFX
63    00671  0121          RBUFF+9
64    00672  4772          JMS DFLOAT
65    00673  0117          RBUFF+7
66    00674  0022          P.RAD
67    00675  5256          JMP 12S+1
68
69    00676  4772          30S,JMS DFLOAT
70    00677  0113          RBUFF+3
71    00700  0005          P.Z
72    00701  4332          JMS FOFFX
73    00702  0116          RBUFF+6
74    00703  4771          JMS SFLOAT
75    00704  0115          RBUFF+5
76    00705  0021          P.PECK
77    00706  5264          JMP 15S
78
79    00707  4772          40S,JMS DFLOAT
80    00710  0113          RBUFF+3
81    00711  0007          P.THET
82    00712  4332          JMS FOFFX
83    00713  0115          RBUFF+5
84    00714  5264          JMP 15S
85
86    00715  4771          50S,JMS SFLOAT
87    00716  0112          RBUFF+2
88    00717  0011          P.SSP
89    00720  5600          JMP I FETCH
90
```

```
91   00721 4771    60S,JMS SFLOAT
92   00722 0112    RBUFF+2
93   00723 0012    F.THIS
94   00724 4771    JMS SFLOAT
95   00725 0113    RBUFF+3
96   00726 0013    F.NEXT
97
98   00727 5600    70S,JMP I FETCH
99
100  00730 2040    80S,ISZ F.EOF
101  00731 5600    JMP I FETCH
102
103  00732 0000    FOFFX,0/CHECK FOR OFFSET
104  00733 1732    TAD I FOFFX
105  00734 2332    ISZ FOFFX
106  00735 3342    DCA 1S
107  00736 1032    TAD F.OFF
108  00737 7650    SNA CLA
109  00740 5732    JMP I FOFFX
110  00741 4772    JMS DFLOAT
111
112  00742 0000    1S,0
113  00743 0023    F.OFFS
114  00744 5732    JMP I FOFFX
115
116  00745 0000    FFN,0/FAST FETCH NEXT
117  00746 1030    TAD F.EOP
118  00747 7640    SZA CLA
119  00750 5354    JMP 1S
120  00751 2023    ISZ F.NUM
121  00752 4770    JMS FFETCH
122  00753 5745    JMP I FFN
123
124  00754 4767    1S,JMS FSTRT
125  00755 5745    JMP I FFN
126
     00767 3266
     00770 1724
     00771 2000
     00772 2021
     00773 5633
     00774 0017
     00775 0003
     00776 2037
     00777 1523
127  01000          PAGE 1
2    01000 0000    CHANGE,0/CHANGE RECORD
3    01001 4777    JMS GFT
4    01002 0076    PTA
5    01003 0376    AND (17)
6    01004 3775    DCA RSIZE
7    01005 4226    JMS VALPAC
8    01006 1110    TAD RBUFF
9    01007 0376    AND (17)
10   01010 7041    CIA
11   01011 1775    TAD RSIZE
12   01012 7650    SNA CLA
13   01013 5217    JMP 1S
14   01014 4774    JMS DELETE
15   01015 4773    JMS INSRT
16   01016 5600    JMP I CHANGE
17
18   01017 1200    1S,TAD CHANGE
19   01020 3773    DCA INSRT
20   01021 5772    JMP INSRU
21
22   01022 0000    INSERT,0/INSERT RECORD
23   01023 4226    JMS VALPAC
24   01024 4773    JMS INSRT
25   01025 5622    JMP I INSERT
26
27   01026 0000    VALPAC,0/PACK RECORD
28   01027 1057    TAD W.AUX
29   01030 7106    CLL RTL
```

```
30   01031 7006       RTL
31   01032 1056       TAD W.TYPE
32   01033 7106       CLL RTL
33   01034 7120       STL
34   01035 7006       RTL
35   01036 3110       DCA RBUFF
36   01037 4771       JMS BITPAK
37   01040 0010       8.
38   01041 0061       W.DEL
39   01042 7106       CLL RTL
40   01043 1060       TAD W.AXIS
41   01044 3111       DCA RBUFF+1
42   01045 1056       TAD W.TYPE
43   01046 1370       TAD (JMP I 1$)
44   01047 3250       DCA .+1
45   01050 7402       HLT
46
47   01051 4346       10$,JMS WOFFX
48   01052 0117       RBUFF+7
49
50   01053 4767       11$,JMS DUNFL
51   01054 0001       F.X
52   01055 0113       RBUFF+3
53   01056 4767       JMS DUNFL
54   01057 0003       F.Y
55   01060 0115       RBUFF+5
56   01061 7107       CLL IAC RTL
57   01062 1110       TAD RBUFF
58   01063 3110       DCA RBUFF
59
60   01064 4766       12$,JMS SUNFL
61   01065 0000       F.SPD
62   01066 0112       RBUFF+2
63
64   01067 2110       14$,ISZ RBUFF
65
66   01070 5626       13$,JMP I VALPAC
67
68   01071 1051       1$,10$
69   01072 1101       20$
70   01073 1111       30$
71   01074 1123       40$
72   01075 1132       50$
73   01076 1136       60$
74   01077 1070       13$
75   01100 1070       13$
76
77   01101 4346       20$,JMS WOFFY
78   01102 0121       RBUFF+9.
79
80   01103 4767       21$,JMS DUNFL
81   01104 0022       F.RAD
82   01105 0117       RBUFF+7
83   01106 2110       ISZ RBUFF
84   01107 2110       ISZ RBUFF
85   01110 5253       JMP 11$
86
87   01111 4346       30$,JMS WOFFX
88   01112 0116       RBUFF+6
89   01113 4766       JMS SUNFL
90   01114 0021       F.PECK
91   01115 0115       RBUFF+5
92   01116 4767       JMS DUNFL
93   01117 0005       F.Z
94   01120 0113       RBUFF+3
95   01121 7125       STL IAC RAL
96   01122 5262       JMP 12$-2
97
98   01123 4346       40$,JMS WOFFX
99   01124 0115       RBUFF+5
100  01125 4767       JMS DUNFL
101  01126 0007       F.THET
102  01127 0113       RBUFF+3
103  01130 7126       STL RTL
104  01131 5262       JMP 12$-2
105
```

```
106 01132 4766    50S,JMS SUNFL
107 01133 0011        F.SSP
108 01134 0112        RBUFF+2
109 01135 5267        JMP 14S
110
111 01136 4766    60S,JMS SUNFL
112 01137 0012        F.THIS
113 01140 0112        RBUFF+2
114 01141 4766        JMS SUNFL
115 01142 0013        F.NEXT
116 01143 0113        RBUFF+3
117 01144 2110        ISZ RBUFF
118 01145 5267        JMP 14S
119
120 01146 0000    WOFFX,0/CHECK FOR OFFSET
121 01147 1746        TAD I WOFFX
122 01150 2346        ISZ WOFFX
123 01151 3361        DCA 1S
124 01152 1064        TAD W.OFF
125 01153 7650        SNA CLA
126 01154 5746        JMP I WOFFX
127 01155 2110        ISZ RBUFF
128 01156 2110        ISZ RBUFF
129 01157 4767        JMS DUNFL
130 01160 0023        F.OFFS
131
132 01161 0000    1S,0
133 01162 5746        JMP I WOFFX
134
    01166 2114
    01167 2132
    01170 5671
    01171 2061
    01172 1264
    01173 1200
    01174 2104
    01175 1347
    01176 0017
    01177 1303
135 01200           PAGE 1   01200 0000    INSRT,0/INSERT RECORD
2   01201 1110        TAD RBUFF
3   01202 0377        AND (17)
4   01203 3347        DCA PSIZE
5   01204 1103        TAD PTROT+1
6   01205 3105        DCA P1+1
7   01206 1102        TAD PTROT
8   01207 3224        DCA 6S
9   01210 4407        FENT
10  01211 5055        FGET NRECS
11  01212 1031        FADD FP.ONE
12  01213 6055        FPUT NRECS
13  01214 0000        FEXT
14  01215 1347        TAD PSIZE
15  01216 4776        JMS INC
16  01217 0102        PTROT
17  01220 1102        TAD PTROT
18  01221 3226        DCA 7S
19  01222 1103        TAD PTROT+1
20  01223 3107        DCA P2+1
21
22  01224 7402    6S,HLT
23  01225 1505        TAD I P1+1
24
25  01226 7402    7S,HLT
26  01227 3507        DCA I P2+1
27  01230 6201        CDF 00
28  01231 1077        TAD PTA+1
29  01232 7041        CIA
30  01233 1105        TAD P1+1
31  01234 7640        SZA CLA
32  01235 5243        JMP 2S
33  01236 1076        TAD PTA
34  01237 7041        CIA
35  01240 1224        TAD 6S
```

```
36   01241 7650    SNA CLA
37   01242 5264    JMP 3S
38
39   01243 7340    2S,STA CLL
40   01244 1105    TAD P1+1
41   01245 3105    DCA P1+1
42   01246 7430    SZL
43   01247 5253    JMP 4S
44   01250 1375    TAD (-10)
45   01251 1224    TAD 6S
46   01252 3224    DCA 6S
47
48   01253 7340    4S,STA CLL
49   01254 1107    TAD P2+1
50   01255 3107    DCA P2+1
51   01256 7430    SZL
52   01257 5224    JMP 6S
53   01260 1375    TAD (-10)
54   01261 1226    TAD 7S
55   01262 3226    DCA 7S
56   01263 5224    JMP 6S
57
58         1264    INSRU.
59
60   01264 4774    3S,JMS PTAP
61   01265 0104    P1
62   01266 1347    TAD RSIZE
63   01267 7041    CIA
64   01270 3347    DCA RSIZE
65   01271 1373    TAD (RBUFF-1)
66   01272 3014    DCA XR4
67
68   01273 1414    5S,TAD I XR4
69   01274 4772    JMS PUT
70   01275 0104    P1
71   01276 4776    JMS INC
72   01277 0104    P1
73   01300 2347    ISZ RSIZE
74   01301 5273    JMP 5S
75   01302 5600    JMP I INSRT
76
77   01303 0000    GET,0/FETCH WORD
78   01304 1703    TAD I GET
79   01305 2303    ISZ GET
80   01306 3320    DCA 1S
81   01307 1720    TAD I 1S
82   01310 3314    DCA 2S
83   01311 2320    ISZ 1S
84   01312 1720    TAD I 1S
85   01313 3320    DCA 1S
86
87   01314 7402    2S,HLT
88   01315 1720    TAD I 1S
89   01316 6201    CDF 00
90   01317 5703    JMP I GET
91
92   01320 0000    1S,0
93
94   01321 0000    ARROW,0/PUNCH ARROW
95   01322 1371    TAD (1S-1)
96   01323 3014    DCA XR4
97
98   01324 1414    2S,TAD I XR4
99   01325 7450    SNA
100  01326 5331    JMP 3S
101  01327 4770    JMS PNCH
102  01330 5324    JMP 2S
103
104  01331 1367    3S,TAD (-80.)
105  01332 3014    DCA XR4
106  01333 4770    JMS PNCH
107  01334 2014    ISZ XR4
108  01335 5333    JMP .-2
109  01336 5721    JMP I ARROW
110
```

```
111  01337 0002    1S,217
     01340 0007
112
113        0005    .REPT 5.
114
115                2
116
117                .ENDR
118
119  01346 0000    0
120  01347 0000    RSIZE,0
121
     01367 7660
     01370 2705
     01371 1336
     01372 1600
     01373 0107
     01374 1456
     01375 7770
     01376 1621
     01377 0017
122  01400         PAGE 1    01400 0000    SQEEZE,0/CONTRACT FILE
2    01401 4256    JMS PTAP
3    01402 0104    P1
4    01403 4256    JMS PTAP
5    01404 0106    P2
6    01405 4777    JMS GET
7    01406 0076    PTA
8    01407 0376    AND (17)
9    01410 7421    MQL
10   01411 7701    ACL
11   01412 4775    JMS INC
12   01413 0106    P2
13   01414 1106    TAD P2
14   01415 3220    DCA 4S
15   01416 1104    TAD P1
16   01417 3222    DCA 5S
17
18   01420 7402    4S,HLT
19   01421 1507    TAD I P2+1
20
21   01422 7402    5S,HLT
22   01423 3505    DCA I P1+1
23   01424 6201    CDF 00
24   01425 1107    TAD P2+1
25   01426 7041    CIA
26   01427 1103    TAD PTBOT+1
27   01430 7640    SZA CLA
28   01431 5237    JMP 2S
29   01432 1220    TAD 4S
30   01433 7041    CIA
31   01434 1102    TAD PTBOT
32   01435 7650    SNA CLA
33   01436 5252    JMP 3S
34
35   01437 2105    2S,ISZ P1+1
36   01440 5244    JMP 6S
37   01441 1374    TAD (10)
38   01442 1222    TAD 5S
39   01443 3222    DCA 5S
40
41   01444 2107    6S,ISZ P2+1
42   01445 5220    JMP 4S
43   01446 1374    TAD (10)
44   01447 1220    TAD 4S
45   01450 3220    DCA 4S
46   01451 5220    JMP 4S
47
48   01452 7701    3S,ACL
49   01453 4773    JMS DEC
50   01454 0102    PTBOT
51   01455 5600    JMP I SQEEZE
52
```

```
 53                     .ENABL LSB
 54
 55    01456 0000       PTAP,0/SAVE PTA
 56    01457 1656       TAD I PTAP
 57    01460 3346       DCA 1S
 58    01461 2256       ISZ PTAP
 59    01462 1076       TAD PTA
 60    01463 3746       DCA I 1S
 61    01464 2346       ISZ 1S
 62    01465 1077       TAD PTA+1
 63    01466 3746       DCA I 1S
 64    01467 5656       JMP I PTAP
 65
 66    01470 0000       PTAG,0/RESTORE PTA
 67    01471 1670       TAD I PTAG
 68    01472 3346       DCA 1S
 69    01473 2270       ISZ PTAG
 70    01474 1746       TAD I 1S
 71    01475 3076       DCA PTA
 72    01476 2346       ISZ 1S
 73    01477 1746       TAD I 1S
 74    01500 3077       DCA PTA+1
 75    01501 5670       JMP I PTAG
 76
 77    01502 0000       XROOM,0/CHECK ROOM FOR MAX LENGTH RECORD
 78    01503 1372       TAD (MAXRS)
 79    01504 4775       JMS INC
 80    01505 0102       PTROT
 81    01506 7100       CLL
 82    01507 1350       TAD SPACE+1
 83    01510 1103       TAD PTROT+1
 84    01511 7630       SZL CLA
 85    01512 1374       TAD (10)
 86    01513 1347       TAD SPACE
 87    01514 1102       TAD PTROT
 88    01515 7710       SPA CLA
 89    01516 2302       ISZ XROOM
 90    01517 1372       TAD (MAXRS)
 91    01520 4773       JMS DEC
 92    01521 0102       PTROT
 93    01522 5702       JMP I XROOM
 94
 95    01523 0000       FETS,0/MOVE FOUND RECORD INTO BUFFER
 96    01524 4771       JMS FIND
 97    01525 4256       JMS PTAP
 98    01526 0104       P1
 99    01527 4777       JMS GET
100    01530 0076       PTA
101    01531 0376       AND (17)
102    01532 7041       CIA
103    01533 3346       DCA 1S
104    01534 1370       TAD (RBUFF-1)
105    01535 3014       DCA XR4
106
107    01536 4777       2S,JMS GET
108    01537 0104       P1
109    01540 3414       DCA I XR4
110    01541 4775       JMS INC
111    01542 0104       P1
112    01543 2346       ISZ 1S
113    01544 5336       JMP 2S
114    01545 5723       JMP I FETS
115
116    01546 0000       1S,0
117    01547 1537       SPACE,-6241/-6177
       01550 1601
118
119                     .DSABL LSB
120
       01570 0107
       01571 1674
       01572 0013
       01573 1645
       01574 0010
       01575 1621
```

```
        01576 0017
        01577 1303
121 01600         PAGE 1   01600 0000    PUT,0/STORE WORD
2   01601 3217    DCA 1S
3   01602 1600    TAD I PUT
4   01603 2200    ISZ PUT
5   01604 3220    DCA 2S
6   01605 1620    TAD I 2S
7   01606 3213    DCA 3S
8   01607 2220    ISZ 2S
9   01610 1620    TAD I 2S
10  01611 3220    DCA 2S
11  01612 1217    TAD 1S
12
13  01613 6201    3S,CDF
14  01614 3620    DCA I 2S
15  01615 6201    CDF 00
16  01616 5600    JMP I PUT
17
18  01617 0000    1S,0
19  01620 0000    2S,0
20
21               .ENABL LSB
22
23  01621 0000    INC,0/INCREMENT APS
24  01622 7450    SNA
25  01623 7001    IAC
26  01624 3271    DCA 1S
27  01625 1621    TAD I INC
28  01626 2221    ISZ INC
29  01627 3272    DCA 2S
30  01630 1272    TAD 2S
31  01631 7001    IAC
32  01632 3273    DCA 3S
33  01633 1673    TAD I 3S
34  01634 7100    CLL
35  01635 1271    TAD 1S
36  01636 3673    DCA I 3S
37  01637 7420    SNL
38  01640 5621    JMP I INC
39  01641 1377    TAD (10)
40  01642 1672    TAD I 2S
41  01643 3672    DCA I 2S
42  01644 5621    JMP I INC
43
44  01645 0000    DEC,0/DECREMENT APS
45  01646 7450    SNA
46  01647 7001    IAC
47  01650 7141    CIA CLL
48  01651 3271    DCA 1S
49  01652 1645    TAD I DEC
50  01653 2245    ISZ DEC
51  01654 3272    DCA 2S
52  01655 1272    TAD 2S
53  01656 7001    IAC
54  01657 3273    DCA 3S
55  01660 1673    TAD I 3S
56  01661 1271    TAD 1S
57  01662 3673    DCA I 3S
58  01663 7430    SZL
59  01664 5645    JMP I DEC
60  01665 1376    TAD (-10)
61  01666 1672    TAD I 2S
62  01667 3672    DCA I 2S
63  01670 5645    JMP I DEC
64
65  01671 0000    1S,0
66  01672 0000    2S,0
67  01673 0000    3S,0
68
69               .DSABL LSB
70
71  01674 0000    FIND,0/LOCATE RECORD
```

```
72   01675 7100         CLL
73   01676 1075         TAD FREC
74   01677 7041         CIA
75   01700 1074         TAD RECI
76   01701 7650         SNA CLA
77   01702 5674         JMP I FIND
78   01703 7420         SNL
79   01704 5310         JMP 2S
80   01705 3074         DCA RECI
81   01706 4775         JMS PTAG
82   01707 0100         FILES
83
84   01710 1074         2S,TAD RECI
85   01711 7041         CIA
86   01712 1075         TAD FREC
87   01713 7650         SNA CLA
88   01714 5674         JMP I FIND
89   01715 2074         ISZ RECI
90   01716 4774         JMS GET
91   01717 0076         PTA
92   01720 0373         AND (17)
93   01721 4221         JMS INC
94   01722 0076         PTA
95   01723 5310         JMP 2S
96
97   01724 0000         FFETCH,0/FAST FETCH
98   01725 1023         TAD F.NUM
99   01726 3075         DCA FREC
100  01727 4274         JMS FIND
101  01730 4774         JMS GET
102  01731 0076         PTA
103  01732 7012         RTR
104  01733 7012         RTR
105  01734 0373         AND (17)
106  01735 3024         DCA F.TYPE
107  01736 4221         JMS INC
108  01737 0076         PTA
109  01740 4774         JMS GET
110  01741 0076         PTA
111  01742 7012         RTR
112  01743 4772         JMS BITSEP
113  01744 0002         2
114  01745 0027         F.DEL
115  01746 4245         JMS DEC
116  01747 0076         PTA
117  01750 3040         DCA F.EOF
118  01751 1024         TAD F.TYPE
119  01752 1371         TAD (-7)
120  01753 7650         SNA CLA
121  01754 2040         ISZ F.EOF
122  01755 5724         JMP I FFETCH
123
     01771 7771
     01772 2037
     01773 0017
     01774 1303
     01775 1470
     01776 7770
     01777 0010
124  02000         PAGE

1                    .ENABL LSB
2
3    02000 0000         SFLOAT,0/SINGLE WORD FIX TO FLOAT
4    02001 1600         TAD I SFLOAT
5    02002 3235         DCA 1S
6    02003 2200         ISZ SFLOAT
7    02004 1600         TAD I SFLOAT
8    02005 2200         ISZ SFLOAT
9    02006 3236         DCA 2S
10
11   02007 3021         3S,DCA WORD
12   02010 1635         TAD I 1S
13   02011 3022         DCA LORD
14   02012 1377         TAD (27)
15   02013 3020         DCA EXP
```

```
16  02014 4407         FENT
17  02015 0017         FNOR
18  02016 6636         FPUT I 2S
19  02017 0000         FEXT
20  02020 5600         JMP I SFLOAT
21
22  02021 0000  DFLOAT,0/DOUBLE WORD FIX TO FLOAT
23  02022 1621         TAD I DFLOAT
24  02023 3235         DCA 1S
25  02024 2221         ISZ DFLOAT
26  02025 1621         TAD I DFLOAT
27  02026 2221         ISZ DFLOAT
28  02027 3236         DCA 2S
29  02030 1221         TAD DFLOAT
30  02031 3200         DCA SFLOAT
31  02032 1635         TAD I 1S
32  02033 2235         ISZ 1S
33  02034 5207         JMP 3S
34
35  02035 0000         1S,0
36  02036 0000         2S,0
37
38  02037 0000  BITSEP,0/UNPACK BIT STRING
39  02040 3236         DCA 2S
40  02041 1637         TAD I BITSEP
41  02042 2237         ISZ BITSEP
42  02043 7041         CIA
43  02044 3235         DCA 1S
44  02045 7240         STA
45  02046 1637         TAD I BITSEP
46  02047 2237         ISZ BITSEP
47  02050 3014         DCA XR4
48
49  02051 1236  4S,TAD 2S
50  02052 7010         RAR
51  02053 3236         DCA 2S
52  02054 7004         RAL
53  02055 3414         DCA I XR4
54  02056 2235         ISZ 1S
55  02057 5251         JMP 4S
56  02060 5637         JMP I BITSEP
57
58  02061 0000  BITPAK,0/PAK BIT STRING
59  02062 1661         TAD I BITPAK
60  02063 7041         CIA
61  02064 3235         DCA 1S
62  02065 1661         TAD I BITPAK
63  02066 2261         ISZ BITPAK
64  02067 1661         TAD I BITPAK
65  02070 2261         ISZ BITPAK
66  02071 3237         DCA BITSEP
67
68  02072 3304  5S,DCA DELETE
69  02073 7240         STA
70  02074 1237         TAD BITSEP
71  02075 3237         DCA BITSEP
72  02076 1304         TAD DELETE
73  02077 7104         CLL RAL
74  02100 1637         TAD I BITSEP
75  02101 2235         ISZ 1S
76  02102 5272         JMP 5S
77  02103 5661         JMP I BITPAK
78
79  02104 0000  DELETE,0/DELETE RECORD
80  02105 4776         JMS SQEEZE
81  02106 4407         FENT
82  02107 5055         FGET NRECS
83  02110 2031         FSUB FP.ONE
84  02111 6055         FPUT NRECS
85  02112 0000         FEXT
86  02113 5704         JMP I DELETE
87
88  02114 0000  SUNFL,0/SINGLE WORD UNFLOAT
89  02115 1714         TAD I SUNFL
90  02116 2314         TSZ SUNFL
91  02117 3235         DCA 1S
```

```
 92  02120 1714    TAD I SUNFL
 93  02121 2314    ISZ SUNFL
 94  02122 3236    DCA 2S
 95  02123 4407    FENT
 96  02124 5635    FGET I 1S
 97  02125 0011    UNNOR
 98  02126 0000    FEXT
 99  02127 1022    TAD LORD
100  02130 3636    DCA I 2S
101  02131 5714    JMP I SUNFL
102
103  02132 0000    DUNFL,0/DOUBLE WORD UNFLOAT
104  02133 1732    TAD I DUNFL
105  02134 2332    ISZ DUNFL
106  02135 3235    DCA 1S
107  02136 1732    TAD I DUNFL
108  02137 2332    ISZ DUNFL
109  02140 3236    DCA 2S
110  02141 4407    FENT
111  02142 5635    FGET I 1S
112  02143 0011    UNNOR
113  02144 0000    FEXT
114  02145 1021    TAD HORD
115  02146 3636    DCA I 2S
116  02147 2236    ISZ 2S
117  02150 1022    TAD LORD
118  02151 3636    DCA I 2S
119  02152 5732    JMP I DUNFL
120
121  02153 0000    Z.N0,0
122  02154 0000    Z.N1,0
123  02155          ENVTAB,.BLKW 7.
124
125                .DSABL LSB
126
     02176 1400
     02177 0027
127  02200          PAGE 1  02200 0000    WORLD,0/READ WORLD
  2  02201 4777    JMS INCON
  3  02202 0014    C.X
  4  02203 4777    JMS INCON
  5  02204 0015    C.Y
  6  02205 4777    JMS INCON
  7  02206 0016    C.Z
  8  02207 4777    JMS INCON
  9  02210 0017    C.THET
 10  02211 1376    TAD (100)
 11  02212 6400    6400
 12  02213 1375    TAD (DSPTCH-101)
 13  02214 3014    DCA XR4
 14
 15  02215 1414    1S,TAD I XR4
 16  02216 7450    SNA
 17  02217 5224    JMP 3S
 18  02220 3314    DCA LTSON
 19  02221 6417    6417
 20  02222 3714    DCA I LTSON
 21  02223 5215    JMP 1S
 22
 23  02224 4774    3S,JMS BITPAK
 24  02225 0004    4
 25  02226 2276    R.AUX1
 26  02227 3057    DCA W.AUX
 27  02230 1773    TAD WAXIS
 28  02231 3060    DCA W.AXIS
 29  02232 6604    6604
 30  02233 4772    JMS BITSEP
 31  02234 0004    4
 32  02235 0091    M.TH
 33  02236 6605    6605
 34  02237 4772    JMS BITSEP
 35  02240 0004    4
 36  02241 0045    AUX.TH
 37  02242 5600    JMP I WORLD
```

```
38
39    02243 2275    DSPTCH,B.CIS
40    02244 0070    W.PENT
41    02245 0067    W.CCW
42    02246 0064    W.OFF
43    02247 0065    W.SENS
44    02250 0061    W.DEL
45    02251 0063    W.HOLD
46    02252 0062    W.EOP
47    02253 2274    B.Z
48    02254 2273    B.TH
49    02255 0066    W.AUTO
50    02256 2272    B.SSP
51    02257 0041    B.ADX
52    02260 0042    B.ADY
53    02261 0043    B.ADZ
54    02262 0044    B.ADTH
55    02263 2276    B.AUX1
56    02264 2277    B.AUX2
57    02265 2300    B.AUX3
58    02266 2301    B.AUX4
59    02267 2271    B.TS
60    02270 0000    DSPEND,0
61
62    02271 0000    B.TS,0
63    02272 0000    B.SSP,0
64    02273 0000    B.TH,0
65    02274 0000    B.Z,0
66    02275 0000    B.CIS,0
67    02276 0000    B.AUX1,0
68    02277 0000    B.AUX2,0
69    02300 0000    B.AUX3,0
70    02301 0000    B.AUX4,0
71
72    02302 0000    LTSOFF,0/ALL LIGHTS OFF
73    02303 1376    TAD (100)
74    02304 6400    6400
75    02305 1371    TAD (DSPTCH-DSPEND-100)
76    02306 3014    DCA XR4
77
78    02307 6415    1S,6415
79    02310 2014    ISZ XR4
80    02311 5307    JMP 1S
81    02312 4200    JMS WORLD
82    02313 5702    JMP I LTSOFF
83
84    02314 0000    LTSON,0/LIGHTS ON
85    02315 1057    TAD W.AUX
86    02316 4772    JMS BITSEP
87    02317 0004    4
88    02320 2276    B.AUX1
89    02321 1056    TAD W.TYPE
90    02322 1370    TAD (ISZ I 2S)
91    02323 3324    DCA .+1
92    02324 7402    HLT
93    02325 1376    TAD (100)
94    02326 6400    6400
95    02327 1375    TAD (DSPTCH-101)
96    02330 3014    DCA XR4
97    02331 1040    TAD F.EOF
98    02332 7640    SZA CLA
99    02333 5340    JMP 1S-1
100   02334 1060    TAD W.AXIS
101   02335 6603    6603
102   02336 3773    DCA WAXIS
103
104   02337 7410    SKP
105   02340 3062    DCA W.EOP
106
107   02341 1414    1S,TAD I XR4
108   02342 7450    SNA
109   02343 5714    JMP I LTSON
110   02344 3200    DCA WORLD
111   02345 1600    TAD I WORLD
112   02346 7640    SZA CLA
```

```
113  02347  6412         6412
114  02350  6401         6401
115  02351  5341         JMP 1$
116
117  02352  2200         2$,WORLD;B.CIS;R.Z;B.TH;B.SSP;B.TS;WORLD;WORLD
     02353  2275
     02354  2274
     02355  2273
     02356  2272
     02357  2271
     02360  2200
     02361  2200
118
     02370  2752
     02371  7653
     02372  2037
     02373  5041
     02374  2061
     02375  2142
     02376  0100
     02377  3600
119  02400         PAGE 1   02400  0000   EVALT,0/EVALUATE RECORD TYPE
 2   02401  1377   TAD (B.TS-1)
 3   02402  3014   DCA XR4
 4   02403  1376   TAD (5)
 5
 6   02404  3223   2$,DCA 1$
 7   02405  1223   TAD 1$
 8   02406  7650   SNA CLA
 9   02407  5216   JMP 3$
10   02410  1414   TAD I XR4
11   02411  7640   SZA CLA
12   02412  5216   JMP 3$
13   02413  7240   STA
14   02414  1223   TAD 1$
15   02415  5204   JMP 2$
16
17   02416  1223   3$,TAD 1$
18   02417  3056   DCA W.TYPE
19   02420  1056   TAD W.TYPE
20   02421  1375   TAD (JMP I 4$)
21   02422  3223   DCA .+1
22
23   02423  7402   1$,HLT
24
25   02424  4267   10$,JMS VSET
26   02425  0002   2
27   02426  0067   W.CCW
28   02427  5600   JMP I EVALT
29
30   02430  4267   12$,JMS VSET
31   02431  0005   5
32   02432  0064   W.OPP
33
34   02433  5600   11$,JMP I EVALT
35
36   02434  2424   4$,10$;11$;10$;10$;12$;12$
     02435  2433
     02436  2424
     02437  2424
     02440  2430
     02441  2430
37
38                .ENABL LSB
39
40   02442  0000   MOVE,0/MOVE BLOCK
41   02443  1642   TAD I MOVE
42   02444  7041   CIA
43   02445  3264   DCA 1$
44   02446  2242   ISZ MOVE
45   02447  1642   TAD I MOVE
46   02450  3265   DCA 2$
47   02451  2242   ISZ MOVE
48   02452  1642   TAD I MOVE
```

```
49  02453 3266       DCA 3S
50  02454 2242       ISZ MOVE
51
52  02455 1665       14S,TAD I 2S
53  02456 3666       DCA I 3S
54  02457 2265       ISZ 2S
55  02460 2266       ISZ 3S
56  02461 2264       ISZ 1S
57  02462 5255       JMP 14S
58  02463 5642       JMP I MOVE
59
60  02464 0000       1S,0
61  02465 0000       2S,0
62  02466 0000       3S,0
63
64  02467 0000       VSET,0/SET BLOCK TO AC VALUE
65  02470 3264       DCA 1S
66  02471 1667       TAD I VSET
67  02472 7041       CIA
68  02473 3265       DCA 2S
69  02474 2267       ISZ VSET
70  02475 1667       TAD I VSET
71  02476 2267       ISZ VSET
72  02477 3266       DCA 3S
73
74  02500 1264       15S,TAD 1S
75  02501 3666       DCA I 3S
76  02502 2266       ISZ 3S
77  02503 2265       ISZ 2S
78  02504 5300       JMP 15S
79  02505 5667       JMP I VSET
80
81                   .DSABL LSB
82
    02575 5634
    02576 0005
    02577 2270
83  02600            PAGE

1                    .ENABL LSB
2
3   02600 0000       PUNCH,0/PUNCH FROM POINT
4   02601 3125       DCA VMASK
5   02602 4777       JMS ARROW
6   02603 4264       JMS LPUN
7
8   02604 1055       1S,TAD W.NUM
9   02605 3023       DCA F.NUM
10  02606 4776       JMS FETCH
11  02607 4775       JMS PDTWU
12  02610 0020       W.SEQ
13
14  02611 1110       3S,TAD RBUFF
15  02612 0374       AND (17)
16  02613 7041       CIA
17  02614 3016       DCA XR6
18  02615 1373       TAD (RBUFF-1)
19  02616 3014       DCA XR4
20  02617 3340       DCA CSUM
21  02620 1372       TAD (100)
22  02621 4305       JMS PNCH
23
24  02622 1414       2S,TAD I XR4
25  02623 7421       MQL
26  02624 7701       ACL
27  02625 1340       TAD CSUM
28  02626 3340       DCA CSUM
29  02627 4274       JMS PPR
30  02630 2016       ISZ XR6
31  02631 5222       JMP 2S
32  02632 1340       TAD CSUM
33  02633 7421       MQL
34  02634 4274       JMS PPR
35  02635 4264       JMS LPUN
36  02636 1040       TAD F.EOF
```

```
37   02637 7640   SZA CLA
38   02640 5255   JMP 4$
39   02641 2055   ISZ W.NUM
40   02642 4771   JMS SFLOAT
41   02643 0055   W.NUM
42   02644 0020   W.SEQ
43   02645 4324   JMS STOPX
44   02646 7410   SKP
45   02647 5204   JMP 1$
46   02650 4770   JMS SUNFL
47   02651 0055   NRFCS
48   02652 0023   F.NUM
49   02653 4776   JMS FETCH
50   02654 5211   JMP 3$
51
52   02655 1367   4$,TAD (-80.)
53   02656 3342   DCA 90$
54   02657 4305   JMS PNCH
55   02660 2342   ISZ 90$
56   02661 5257   JMP .-2
57   02662 4777   JMS ARROW
58   02663 5600   JMP I PUNCH
59
60   02664 0000   LPUN,0/PUNCH LEADER
61   02665 1366   TAD(-4)
62   02666 3342   DCA 90$
63   02667 1365   TAD (200)
64   02670 4305   JMS PNCH
65   02671 2342   ISZ 90$
66   02672 5267   JMP .-3
67   02673 5664   JMP I LPUN
68
69   02674 0000   PPR,0/PUNCH PAIR
70   02675 7001   ACL
71   02676 7002   BSW
72   02677 0364   AND (77)
73   02700 4305   JMS PNCH
74   02701 7001   ACL
75   02702 0364   AND (77)
76   02703 4305   JMS PNCH
77   02704 5674   JMP I PPR
78
79   02705 0000   PNCH,0/PUNCH ONE
80   02706 6026   PLS
81   02707 7200   CLA
82   02710 1363   TAD (-30.)
83   02711 3341   DCA WAITK
84
85   02712 2343   20$,ISZ 91$
86   02713 5321   JMP 22$
87   02714 2341   ISZ WAITK
88   02715 5321   JMP 22$
89   02716 4762   JMS FRRPT
90   02717 0002   2
91   02720 5600   JMP I PUNCH
92
93   02721 6021   22$,PSF
94   02722 5312   JMP 20$
95   02723 5705   JMP I PNCH
96
97   02724 0000   STOPX,0/CHECK FOR STOP
98   02725 7346   STA CLL RTL
99   02726 1123   TAD INTVAL
100  02727 7640   SZA CLA
101  02730 2324   ISZ STOPX
102  02731 3123   DCA INTVAL
103  02732 5724   JMP I STOPX
104
105  02733 0000   STOPS,0/SET STOP LOCATION
106  02734 1733   TAD I STOPS
107  02735 2333   ISZ STOPS
108  02736 3124   DCA STPLOC
109  02737 5733   JMP I STOPS
110
111  02740 0000   CSUM,0
112  02741 0000   WAITK,0
```

```
113  02742 0000         90S,0
114  02743 0000         91S,0
115
116                     .DSABL LSB
117
     02762 3200
     02763 7742
     02764 0077
     02765 0200
     02766 7774
     02767 7660
     02770 2114
     02771 2000
     02772 0100
     02773 0107
     02774 0017
     02775 3400
     02776 0600
     02777 1321
118  03000         PAGE

1                    .ENABL LSB
2
3    03000 0000    READ,0/READ AND INSERT FROM TAPE
4    03001 3125    DCA VMASK
5
6    03002 4777    59S,JMS XROOM
7    03003 5253    JMP 50S
8    03004 1055    TAD W.NUM
9    03005 3075    DCA FREC
10   03006 4776    JMS FIND
11   03007 4307    JMS 60S
12   03010 7410    SKP
13   03011 5207    JMP .-2
14   03012 4307    JMS 60S
15   03013 5212    JMP .-1
16   03014 1324    TAD RCHAR
17   03015 1375    TAD (-100)
18   03016 7640    SZA CLA
19   03017 5250    JMP 52S
20   03020 4307    JMS 60S
21   03021 5250    JMP 52S
22   03022 1374    TAD (RBUFF-1)
23   03023 3014    DCA XR4
24
25   03024 3773    51S,DCA CSUM
26   03025 1324    TAD RCHAR
27   03026 3325    DCA 70S
28   03027 4307    JMS 60S
29   03030 5250    JMP 52S
30   03031 1324    TAD RCHAR
31   03032 3326    DCA 71S
32   03033 4307    JMS 60S
33   03034 5256    JMP 53S
34   03035 4301    JMS 80S
35   03036 1014    TAD XR4
36   03037 7041    CIA
37   03040 1372    TAD (RBUFF+MAXRS-1)
38   03041 7750    SPA SNA CLA
39   03042 5250    JMP 52S
40   03043 1325    TAD 70S
41   03044 3414    DCA I XR4
42   03045 1325    TAD 70S
43   03046 1773    TAD CSUM
44   03047 5224    JMP 51S
45
46   03050 4771    52S,JMS ERRPT
47   03051 0001    1
48   03052 5600    JMP I READ
49
50   03053 4771    50S,JMS ERRPT
51   03054 0000    0
52   03055 5600    JMP I READ
53
54   03056 4301    53S,JMS 80S
```

```
55                    4,135,238                   56
 55  03057 1325    TAD 70S
 56  03060 7041    CIA
 57  03061 1773    TAD CSUM
 58  03062 7640    SZA CLA
 59  03063 5250    JMP 52S
 60  03064 1110    TAD RBUFF
 61  03065 0370    AND (360)
 62  03066 1367    TAD (-160)
 63  03067 7650    SNA CLA
 64  03070 5600    JMP I READ
 65  03071 4766    JMS INSRT
 66  03072 2055    ISZ W.NUM
 67  03073 4765    JMS PDTWU
 68  03074 0020    W.SEQ
 69  03075 4764    JMS SFLOAT
 70  03076 0055    W.NUM
 71  03077 0020    W.SEQ
 72  03100 5202    JMP 59S
 73
 74  03101 0000    80S,0/ASSEMBLE BYTE PAIR
 75  03102 1325    TAD 70S
 76  03103 7002    BSW
 77  03104 1326    TAD 71S
 78  03105 3325    DCA 70S
 79  03106 5701    JMP I 80S
 80
 81  03107 0000    60S,0/READ CHARACTER
 82  03110 6014    RFC
 83
 84  03111 4763    61S,JMS STOPY
 85  03112 5600    JMP I READ
 86  03113 6011    RSF
 87  03114 5311    JMP 61S
 88  03115 6012    RRB
 89  03116 3324    DCA RCHAR
 90  03117 1324    TAD RCHAR
 91  03120 1362    TAD (-200)
 92  03121 7640    SZA CLA
 93  03122 2307    ISZ 60S
 94  03123 5707    JMP I 60S
 95
 96  03124 0000    RCHAR,0
 97  03125 0000    70S,0
 98  03126 0000    71S,0
 99
100                .OSABL LSB
101
     03162 7600
     03163 2724
     03164 2000
     03165 3400
     03166 1200
     03167 7620
     03170 0360
     03171 3200
     03172 0122
     03173 2740
     03174 0107
     03175 7700
     03176 1674
     03177 1902
102  03200          PAGE

1                 .ENABL LSB
  2
  3  03200 0000    ERRPT,0/ERROR REPORT
  4  03201 3125    DCA VMASK
  5  03202 3123    DCA INTVAL
  6  03203 1600    TAD I ERRPT
  7  03204 3232    DCA 1S
  8  03205 2200    ISZ ERRPT
  9  03206 4777    JMS SFLOAT
 10  03207 3232    1S
 11  03210 0025    E.NUM
 12
 13  03211 4776    2S,JMS PDTWU
```

```
14  03212 0025    E,NUM
15  03213 4233    JMS 3S
16  03214 1375    TAD (32)
17  03215 6400    6400
18  03216 7240    STA
19  03217 6405    6405
20  03220 6405    6405
21  03221 6405    6405
22  03222 6405    6405
23  03223 4233    JMS 3S
24  03224 1123    TAD INTVAL
25  03225 7650    SNA CLA
26  03226 5211    JMP 2S
27  03227 4776    JMS PDTWU
28  03230 0020    W,SEQ
29  03231 5600    JMP I ERRPT
30
31  03232 0000    1S,0
32
33  03233 0000    3S,0/DELAY APPROX .5 SECONDS
34  03234 1374    TAD (-30.)
35  03235 3014    DCA XR4
36  03236 3015    DCA XR5
37  03237 2015    ISZ XR5
38  03240 5237    JMP .-1
39  03241 2014    ISZ XR4
40  03242 5237    JMP .-3
41  03243 5633    JMP I 3S
42
43  03244 0000    VCTEF,0/FFTCH VARIABLE CONVERSION
44  03245 7106    CLL RTL/TABLE ENTRY
45  03246 7004    RAL
46  03247 1373    TAD (VCTST-1)
47  03250 3014    DCA XR4
48  03251 1372    TAD (-8.)
49  03252 3016    DCA XR6
50  03253 7240    STA
51  03254 1644    TAD I VCTEF
52  03255 2244    ISZ VCTEF
53  03256 3015    DCA XR5
54
55  03257 6211    4S,CDF 10
56  03260 1414    TAD I XR4
57  03261 6201    CDF 00
58  03262 3415    DCA I XR5
59  03263 2016    ISZ XR6
60  03264 5257    JMP 4S
61  03265 5644    JMP I VCTEF
62
63  03266 0000    FSTRT,0/FAST FIND FIRST RECORD
64  03267 1073    TAD FFOUND
65  03270 7640    SZA CLA
66  03271 5315    JMP 63S
67  03272 1023    TAD F,NUM
68  03273 7041    CIA
69  03274 3175    DCA T.15
70  03275 3023    DCA F,NUM
71
72  03276 3174    64S,DCA T.14
73  03277 4771    JMS FFETCH
74  03300 1175    TAD T.15
75  03301 1023    TAD F,NUM
76  03302 2023    ISZ F,NUM
77  03303 7650    SNA CLA
78  03304 5312    JMP 62S
79  03305 1030    TAD F,EOP
80  03306 7650    SNA CLA
81  03307 5277    JMP 64S+1
82  03310 1023    TAD F,NUM
83  03311 5276    JMP 64S
84
85  03312 2073    62S,ISZ FFOUND
86  03313 1174    TAD T.14
87  03314 3072    DCA FOUNDF
88
89  03315 1072    63S,TAD FOUNDF
```

```
90   03316 3023    DCA F.NUM
91   03317 4770    JMS FETCH
92   03320 5666    JMP I FSTRT
93
     03370 0600
     03371 1724
     03372 7770
     03373 1777
     03374 7742
     03375 0032
     03376 3400
     03377 2000
94   03400          PAGE
1    03400 0000    POTWU,0/OUTPUT CONVERSION
2    03401 1600    TAD I POTWU
3    03402 2200    ISZ POTWU
4    03403 4777    JMS VCTEF
5    03404 0160    T.0
6    03405 1376    TAD (90$)
7    03406 3320    DCA A0$
8    03407 7001    IAC
9    03410 1320    TAD A0$
10   03411 3321    DCA A0$+1
11   03412 1375    TAD (A2$)
12   03413 3331    DCA A3$
13   03414 1374    TAD (-5)
14   03415 3332    DCA A4$
15   03416 4407    FENT
16   03417 5560    FGET I T.0
17   03420 0011    UNNOR
18   03421 0000    FEXT
19   03422 1021    TAD HORD
20   03423 7700    SMA CLA
21   03424 5237    JMP 5$
22   03425 7100    CLL
23   03426 1022    TAD LORD
24   03427 7041    CIA
25   03430 3022    DCA LORD
26   03431 1021    TAD HORD
27   03432 7040    CMA
28   03433 7430    SZL
29   03434 7001    IAC
30   03435 3021    DCA HORD
31   03436 1373    TAD (14.)
32
33   03437 3322    5$,DCA A1$
34
35   03440 3731    6$,DCA I A3$
36
37   03441 7100    7$,CLL
38   03442 1022    TAD LORD
39   03443 1721    TAD I A0$+1
40   03444 3014    DCA XR4
41   03445 7004    RAL
42   03446 1021    TAD HORD
43   03447 1720    TAD I A0$
44   03450 7500    SMA
45   03451 5313    JMP A$
46   03452 7200    CLA
47   03453 2321    ISZ A0$+1
48   03454 2321    ISZ A0$+1
49   03455 2320    ISZ A0$
50   03456 2320    ISZ A0$
51   03457 2331    ISZ A3$
52   03460 2332    ISZ A4$
53   03461 5240    JMP 6$
54   03462 1022    TAD LORD
55   03463 3731    DCA I A3$
56   03464 1166    TAD T.6
57   03465 6400    6400
58   03466 7200    CLA
59   03467 1165    TAD T.5
60   03470 7650    SNA CLA
61   03471 5275    JMP 11$
62   03472 1322    TAD A1$
63   03473 6405    6405
```

```
64   03474 7200    CLA
65
66   03475 1167    11$,TAD T.7
67   03476 7041    CIA
68   03477 3332    DCA A4$
69   03500 1332    TAD A4$
70   03501 1372    TAD (6)
71   03502 1375    TAD (82S)
72   03503 3331    DCA A3$
73
74   03504 1731    12$,TAD I A3$
75   03505 6405    6405
76   03506 7200    CLA
77   03507 2331    ISZ A3$
78   03510 2332    ISZ A4$
79   03511 5304    JMP 12$
80
81   03512 5600    13$,JMP I POTWU
82
83   03513 3021    8$,DCA HORD
84   03514 1014    TAD XR4
85   03515 3022    DCA LORD
86   03516 2731    ISZ I A3$
87   03517 5241    JMP 7$
88
89   03520 0000    80$,0/0
     03521 0000
90   03522 0000    81$,0
91   03523 0000    A2$,0/0/0/0/0/0/0
     03524 0000
     03525 0000
     03526 0000
     03527 0000
     03530 0000
92   03531 0000    A3$,0
93   03532 0000    A4$,0
94
95   03533 7747    90$,7747/POWERS OF TEN
96   03534 4540    4540
97   03535 7775    7775
98   03536 4360    4360
99   03537 7777    7777
100  03540 6030    6030
101  03541 7777    7777
102  03542 7634    7634
103  03543 7777    7777
104  03544 7766    7766
105
106                .DSABL LSB
107
     03572 0006
     03573 0016
     03574 7773
     03575 3523
     03576 3533
     03577 3244
108  03600          PAGE

1                  .ENABL LSB
2
3    03600 0000    INCON,0/CONVERT INPUT FROM
4    03601 1600    TAD I INCON/PAD OR COUNTERS
5    03602 2200    ISZ INCON
6    03603 4777    JMS VCTEF
7    03604 0160    T.0
8    03605 1166    TAD T.6
9    03606 7710    SPA CLA
10   03607 5776    JMP 1$
11   03610 1375    TAD (6420)
12   03611 3335    DCA 21$
13   03612 3351    DCA 91$
14   03613 3352    DCA 92$
15   03614 1374    TAD (-7)
16   03615 3353    DCA 93$
17   03616 3021    DCA HORD
```

```
18   03617 3022      DCA LORD
19   03620 3020      DCA FXP
20
21   03621 4334   5$,JMS 20$
22   03622 2335      ISZ 21$
23   03623 1373      TAD (-15.)
24   03624 7450      SNA
25   03625 5242      JMP 4$
26   03626 1372      TAD (15.,-11.)
27   03627 7650      SNA CLA
28   03630 5341      JMP 3$
29   03631 7701      ACL
30   03632 3355      DCA 94$+1
31   03633 4407      FENT
32   03634 3032      FMPY FP.TEN
33   03635 1354      FADD 94$
34   03636 0000      FEXT
35   03637 1351      TAD 91$
36   03640 1352      TAD 92$
37   03641 3352      DCA 92$
38
39   03642 2353   4$,ISZ 93$
40   03643 5221      JMP 5$
41   03644 4334      JMS 20$
42   03645 1371      TAD (-14.)
43   03646 7640      SZA CLA
44   03647 5253      JMP 6$
45   03650 4407      FENT
46   03651 0014      FNEG
47   03652 0000      FEXT
48
49   03653 1352   6$,TAD 92$
50   03654 7450      SNA
51   03655 5264      JMP 7$
52   03656 7001      IAC
53   03657 3352      DCA 92$
54   03660 4407      FENT
55   03661 4032      FDIV FP.TEN
56   03662 0000      FEXT
57   03663 5253      JMP 6$
58
59   03664 6606   7$,6606
60   03665 5274      JMP 8$
61   03666 1162      TAD T.2
62   03667 7650      SNA CLA
63   03670 5274      JMP 8$
64   03671 4407      FENT
65   03672 4357      FDIV METCON
66   03673 0000      FEXT
67
68   03674 4407   8$,FENT
69   03675 3561      FMPY I T.1
70   03676 0012      FRND
71   03677 0011      UNNOR
72   03700 0017      FNOR
73   03701 6053      FPUT WFT.0
74   03702 0000      FEXT
75   03703 1165      TAD T.5
76   03704 7640      SZA CLA
77   03705 5311      JMP 12$
78   03706 4407      FENT
79   03707 7345      FJMP 13$
80   03710 0004      LTZ
81
82   03711 0000   12$,FEXT
83   03712 4407      FENT
84   03713 0006      FABS
85   03714 2563      FSUB I T.3
86   03715 7345      FJMP 13$
87   03716 0002      GTZ
88   03717 0000      FEXT
89   03720 2200      ISZ INCON
90   03721 1164      TAD T.4
91   03722 7650      SNA CLA
92   03723 5327      JMP 10$
93   03724 1564      TAD I T.4
```

```
94   03725  7640    SZA CLA
95   03726  2160    ISZ T.0
96
97   03727  4407    10S,FENT
98   03730  5053    FGET WFT.0
99
100  03731  6560    11S,FPUT I T.0
101  03732  0000    FEXT
102  03733  5600    JMP I INCON
103
104  03734  0000    20S,0/READ DIGIT
105
106  03735  0000    21S,0
107  03736  7421    MQL
108  03737  7701    ACL
109  03740  5734    JMP I 20S
110
111  03741  7240    3S,STA
112  03742  3351    DCA 91S
113  03743  3352    DCA 92S
114  03744  5242    JMP 4S
115
116  03745  0000    13S,FEXT
117  03746  4770    JMS ERPPT
118  03747  0003    3
119  03750  5600    JMP I INCON
120
121  03751  0000    91S,0
122  03752  0000    92S,0
123  03753  0000    93S,0
124  03754  0013    94S,13/0/0
     03755  0000
     03756  0000
125  03757  0005    METCON,5/3131/4631
     03760  3131
     03761  4631
126
     03770  3200
     03771  7762
     03772  0004
     03773  7761
     03774  7771
     03775  6420
     03776  4000
     03777  3244
127  04000           PAGE 1    04000  0000    1S,FEXT
2    04001  4213    JMS 14S
3    04002  6054    FPUT WFT.1
4    04003  0000    FEXT
5    04004  4213    JMS 16S
6    04005  2054    FSUB WFT.1
7    04006  7200    FJMP 1S
8    04007  0006    LTZ GTZ
9    04010  5053    FGET WFT.0
10   04011  7777    FJMP 11S
11   04012  0007    UNK
12
13   04013  0000    16S,0/BCD TO FP
14   04014  7105    CLL IAC RAL
15   04015  1166    TAD T.6
16   04016  3243    DCA 31S
17   04017  4242    JMS 30S
18   04020  6053    FPUT WFT.0
19   04021  0000    FEXT
20   04022  2243    ISZ 31S
21   04023  3275    DCA 90S
22   04024  4242    JMS 30S
23   04025  3276    FMPY 95S
24   04026  1053    FADD WFT.0
25   04027  0000    FEXT
26   04030  1275    TAD 90S
27   04031  7650    SNA CLA
28   04032  5236    JMP 15S
```

```
29  04033 4407    FENT
30  04034 0014    FNEG
31  04035 0000    FEXT
32
33  04036 4407    15S,FENT
34  04037 6053    FPUT WFT,0
35  04040 7613    FJMP I 16S
36  04041 0007    UNK
37
38  04042 0000    30S,0/BCD TO BIN
39
40  04043 7402    31S,HLT
41  04044 7430    SZL
42  04045 2275    ISZ 90S
43  04046 3304    DCA 97S
44  04047 1304    TAD 97S
45  04050 0376    AND (7400)
46  04051 7110    CLL RAR
47  04052 3305    DCA 98S
48  04053 1305    TAD 98S
49  04054 7012    RTR
50  04055 1305    TAD 98S
51  04056 1304    TAD 97S
52  04057 0375    AND (7760)
53  04060 3305    DCA 98S
54  04061 1305    TAD 98S
55  04062 7110    CLL RAR
56  04063 1305    TAD 98S
57  04064 7012    RTR
58  04065 7041    CIA
59  04066 1304    TAD 97S
60  04067 3302    DCA 96S+1
61  04070 4407    FENT
62  04071 5301    FGET 96S
63  04072 0017    FNOR
64  04073 7642    FJMP I 30S
65  04074 0007    UNK
66
67  04075 0000    90S,0
68  04076 0012    95S,12;3720;0
    04077 3720
    04100 0000
69  04101 0013    96S,13;0;0
    04102 0000
    04103 0000
70  04104 0000    97S,0
71  04105 0000    98S,0
72
73                .DSABL LSB
74
    04175 7760
    04176 7400
    04177 3731
75  04200          PAGE 1   04200 0000    DISPFF,0/DISPLAY FROM RECORD
2   04201 1377    TAD (JMP I 11S)
3   04202 3203    DCA .+1
4   04203 7402    HLT
5
6   04204 4776    2S,JMS PDTWU
7   04205 0022    F.RAD
8
9   04206 4776    3S,JMS PDTWU
10  04207 0001    F.X
11  04210 4776    JMS PDTWU
12  04211 0003    F.Y
13
14  04212 4776    31S,JMS PDTWU
15  04213 0023    F.OFFS
16  04214 4776    JMS PDTWU
17  04215 0000    F.SPD
18
19  04216 5600    10S,JMP I DISPFF
20
```

```
21  04217 4776    4S,JMS PDTWU
22  04220 0005    F.Z
23  04221 4776    JMS PDTWU
24  04222 0021    F.PECK
25  04223 5212    JMP 31S
26
27  04224 4776    5S,JMS PDTWU
28  04225 0007    F.THET
29  04226 5212    JMP 31S
30
31  04227 4776    6S,JMS PDTWU
32  04230 0011    F.SSP
33  04231 5600    JMP I DISPFF
34
35  04232 4776    7S,JMS PDTWU
36  04233 0012    F.THIS
37  04234 4776    JMS PDTWU
38  04235 0013    F.NEXT
39  04236 5600    JMP I DISPFF
40
41  04237 4206    11S,3S/2S/4S/5S/6S/7S/10S/10S
    04240 4204
    04241 4217
    04242 4224
    04243 4227
    04244 4232
    04245 4216
    04246 4216
42
43  04247 0000    DISALL,0/DISPLAY ALL
44  04250 4776    JMS PDTWU
45  04251 0024    F.N
46  04252 1375    TAD (-6)
47  04253 3263    DCA 1S
48
49  04254 7001    2S,IAC
50  04255 1263    TAD 1S
51  04256 7041    CIA
52  04257 4200    JMS DISPFF
53  04260 2263    ISZ 1S
54  04261 5254    JMP 2S
55  04262 5647    JMP I DISALL
56
57  04263 0000    1S,0
58
59  04264 0000    DISPFC,0/DISPLAY CURRENT POINT (RUN MODE)
60  04265 4774    JMS LTSOFF
61  04266 4773    JMS MOVE
62  04267 0014    12.
63  04270 0023    F.NUM
64  04271 0095    W.NUM
65  04272 4772    JMS LTSON
66
67  04273 6400    DISPFD,6400
68  04274 1371    TAD (-64.)
69  04275 3014    DCA XR4
70  04276 7240    STA
71  04277 6405    6405
72  04300 2014    ISZ XR4
73  04301 5277    JMP .-2
74  04302 4776    JMS PDTWU
75  04303 0021    W.SEQ+1
76  04304 1024    TAD F.TYPE
77  04305 4200    JMS DISPFF
78  04306 1032    TAD F.OFF
79  04307 7640    SZA CLA
80  04310 5664    JMP I DISPFC
81  04311 7127    STL IAC RTL
82  04312 6400    6400
83  04313 7240    STA
84  04314 6405    6405
85  04315 6405    6405
86  04316 6405    6405
87  04317 6405    6405
88  04320 6405    6405
89  04321 7200    CLA
```

```
 90   04322 5664          JMP I DISPFC
 91
 92   04323 1370   RUNNER,TAD (RUNN)/ENTRY TO RUN FROM PGM
 93   04324 3264          DCA DISPFC
 94   04325 5273          JMP DISPFD
 95
 96   04326 0000   FNEXT,0/FETCH NEXT RECORD
 97   04327 1030          TAD F.EOP
 98   04330 7640          SZA CLA
 99   04331 5335          JMP 1S
100   04332 2023          ISZ F.NUM
101   04333 4767          JMS FETCH
102   04334 5726          JMP I FNEXT
103
104   04335 4766   1S,JMS FSTPT
105   04336 5726          JMP I FNEXT
106
107   04337 0000   DISENV,0/DISPLAY ALL DRIVER
108   04340 1365          TAD (ENVTAB-1)
109   04341 3017          DCA XR7
110   04342 1364          TAD (-5)
111   04343 3177          DCA T.17
112
113   04344 1417   1S,TAD I XR7
114   04345 3023          DCA F.NUM
115   04346 4767          JMS FETCH
116   04347 2177          ISZ T.17
117   04350 5344          JMP 1S
118   04351 4247          JMS DISALL
119   04352 1055          TAD W.NUM
120   04353 3023          DCA F.NUM
121   04354 4767          JMS FETCH
122   04355 1024          TAD F.TYPE
123   04356 4200          JMS DISPFF
124   04357 5737          JMP I DISENV
125
      04364 7773
      04365 2154
      04366 3266
      04367 7600
      04370 5605
      04371 7700
      04372 2314
      04373 2442
      04374 2302
      04375 7772
      04376 3400
      04377 5637
126   04400          PAGE 1   04400 0000   FSRCHA,0/RECREATE ENVIRONMENT
  2   04401 4777          JMS SUNFL
  3   04402 0055          NRECS
  4   04403 4452          11S
  5   04404 1252          TAD 11S
  6   04405 4776          JMS VSET
  7   04406 0011          9.
  8   04407 2153          Z.NO
  9   04410 4777          JMS SUNFL
 10   04411 0020          W.SEQ
 11   04412 0023          F.NUM
 12   04413 1023          TAD F.NUM
 13   04414 7041          CIA
 14   04415 3252          DCA 12S
 15   04416 4775          JMS FFETCH
 16
 17   04417 4774   1S,JMS FFN
 18   04420 1027          TAD F.DEL
 19   04421 7640          SZA CLA
 20   04422 5243          JMP 2S
 21   04423 7240          STA
 22   04424 1024          TAD F.TYPE
 23   04425 7510          SPA
 24   04426 7200          CLA
 25   04427 1373          TAD (ENVTAB)
```

```
26  04430  3253       DCA 13S
27  04431  1023       TAD F.NUM
28  04432  3653       DCA I 13S
29  04433  7344       STA CLL RAL
30  04434  1024       TAD F.TYPE
31  04435  7640       SZA CLA
32  04436  5243       JMP 2S
33  04437  1772       TAD Z.N1
34  04440  3771       DCA Z.N0
35  04441  1023       TAD F.NUM
36  04442  3772       DCA Z.N1
37
38  04443  1252    2S,TAD 12S
39  04444  1023       TAD F.NUM
40  04445  7640       SZA CLA
41  04446  5217       JMP 1S
42  04447  6601       6601
43  04450  4770       JMS DISENV
44  04451  5600       JMP I FSRCHA
45
46  04452              12S,
47  04452  0000        11S,0
48  04453  0000        13S,0
49
50  04454  4200    PMODE,JMS FSRCHA/PGM MODE LOOP
51
52  04455          RPMODE,
53  04455  3123    2S,DCA INTVAL
54
55  04456  6001    3S,ION
56  04457  6601       6601
57  04460  7410       SKP
58  04461  5767       JMP RUNNER
59  04462  1123       TAD INTVAL
60  04463  7650       SNA CLA
61  04464  5256       JMP 3S
62  04465  4766       JMS WORLD
63  04466  1123       TAD INTVAL
64  04467  1365       TAD (-100)
65  04470  7500       SMA
66  04471  5303       JMP 5S
67  04472  0364       AND (37)
68  04473  1363       TAD (JMP I 10S-10)
69  04474  3302       DCA 1S
70  04475  7001       IAC
71  04476  3126       DCA RETRO
72  04477  3071       DCA NEXTF
73  04500  3073       DCA FFOUND
74  04501  4762       JMS RSEQUS
75
76  04502  7402    1S,HLT
77
78  04503  0361    5S,AND (17)
79  04504  1360       TAD (TAD 11S)
80  04505  3306       DCA .+1
81  04506  7402       HLT
82  04507  7510       SPA
83  04510  5757       JMP PLANES
84  04511  3313       DCA .+2
85  04512  4756       JMS INCON
86  04513  0000       0
87  04514  5255       JMP RPMODE
88  04515  1160       TAD T.0
89  04516  3320       DCA .+2
90  04517  4755       JMS PDTWU
91  04520  0000       0
92  04521  5255       JMP 2S
93
94  04522  4600    10S,P.SEQS;R.SENT;P.SCOR;R.SINS;R.SNUS;R.MEME;R.RLN;R.RTPP
    04523  4623
    04524  5010
    04525  5200
    04526  5022
    04527  5027
    04530  5247
    04531  5271
```

```
 95  04532 5000   R.LOOK
 96
 97  04533 0000   11S,F.SPD
 98  04534 0001   F.X
 99  04535 0003   F.Y
100  04536 0005   F.Z
101  04537 0021   F.PECK
102  04540 0022   F.RAD
103  04541 0023   F.OFFS
104  04542 0024   F.N
105  04543 4003   4003
106  04544 4000   4000
107  04545 4001   4001
108  04546 4002   4002
109  04547 0007   F.THET
110  04550 0011   F.SSP
111  04551 0013   F.NEXT
112  04552 0012   F.THIS
113
     04555 3400
     04556 3600
     04557 5034
     04560 1333
     04561 0017
     04562 5536
     04563 5712
     04564 0037
     04565 7700
     04566 2200
     04567 4323
     04570 4337
     04571 2153
     04572 2154
     04573 2155
     04574 0745
     04575 1724
     04576 2467
     04577 2114
114  04600          PAGE 1  04600 4777   R.SEQS,JMS INCON/PGM MODE SEQUENCE SELECT
  2  04601 0020   W.SEQ
  3  04602 5776   JMP RPMODE
  4
  5  04603 4775   R.SSS,JMS FSRCHA
  6
  7  04604 4774   R.SSB,JMS PDTWU
  8  04605 0020   W.SEQ
  9
 10  04606 4773   R.SSA,JMS SUNFL
 11  04607 0020   W.SEQ
 12  04610 0023   F.NUM
 13  04611 4772   JMS LTSOFF
 14  04612 4771   JMS FETCH
 15  04613 4770   JMS MOVE
 16  04614 0014   12.
 17  04615 0023   F.NUM
 18  04616 0055   W.NUM
 19  04617 4767   JMS LTSON
 20  04620 1056   TAD W.TYPE
 21  04621 4766   JMS DISPFF
 22  04622 5776   JMP RPMODE
 23
 24  04623 1040   R.SENT,TAD F.EOF/SEQUENCE ENTER
 25  04624 7640   SZA CLA
 26  04625 5765   JMP R.SINA
 27  04626 4764   JMS EVALT
 28  04627 4763   JMS XROOM
 29  04630 5762   JMP FULL
 30  04631 4761   JMS CHANGE
 31  04632 4407   FENT
 32  04633 5020   FGET W.SEQ
 33  04634 1031   FADD FP.ONE
 34  04635 6020   FPUT W.SEQ
 35  04636 0000   FEXT
 36  04637 5204   JMP R.SSB
```

```
37
38   04640 0000        SUNIV,0/SAVE X, Y, Z, THETA
39   04641 1050        TAD AUX.X
40   04642 7650        SNA CLA
41   04643 5276        JMP 2$
42   04644 4407        FENT
43   04645 5014        FGET C.X
44
45   04646 6056        1$,FPUT FT.0
46   04647 0000        FEXT
47   04650 1047        TAD AUX.Y
48   04651 7650        SNA CLA
49   04652 5312        JMP 3$
50   04653 4407        FENT
51   04654 5015        FGET C.Y
52
53   04655 6057        4$,FPUT FT.1
54   04656 0000        FEXT
55   04657 1046        TAD AUX.Z
56   04660 7650        SNA CLA
57   04661 5326        JMP 5$
58   04662 4407        FENT
59   04663 5016        FGET C.Z
60
61   04664 6060        6$,FPUT FT.2
62   04665 0000        FEXT
63   04666 1045        TAD AUX.TH
64   04667 7650        SNA CLA
65   04670 5342        JMP 7$
66   04671 4407        FENT
67   04672 5017        FGET C.THET
68
69   04673 6061        8$,FPUT FT.3
70   04674 0000        FEXT
71   04675 5640        JMP I SUNIV
72
73   04676 1041        2$,TAD B.ADX
74   04677 7650        SNA CLA
75   04700 5306        JMP 21$
76   04701 4407        FENT
77   04702 5002        FGET D.X
78   04703 1001        FADD F.X
79   04704 7246        FJMP 1$
80   04705 0007        UNK
81
82   04706 4407        21$,FENT
83   04707 5001        FGET F.X
84   04710 7246        FJMP 1$
85   04711 0007        UNK
86
87   04712 1042        3$,TAD B.ADY
88   04713 7650        SNA CLA
89   04714 5322        JMP 31$
90   04715 4407        FENT
91   04716 5004        FGET D.Y
92   04717 1003        FADD F.Y
93   04720 7255        FJMP 4$
94   04721 0007        UNK
95
96   04722 4407        31$,FENT
97   04723 5003        FGET F.Y
98   04724 7255        FJMP 4$
99   04725 0007        UNK
100
101  04726 1043        5$,TAD B.ADZ
102  04727 7650        SNA CLA
103  04730 5336        JMP 51$
104  04731 4407        FENT
105  04732 5005        FGET F.Z
106  04733 1006        FADD D.Z
107  04734 7264        FJMP 6$
108  04735 0007        UNK
109
110  04736 4407        51$,FENT
111  04737 5005        FGET F.Z
112  04740 7264        FJMP 6$
```

```
113  04741  0007        UNK
114
115  04742  1044   7S,  TAD B.ADTH
116  04743  7650        SNA CLA
117  04744  5352        JMP 71S
118  04745  4407        FENT
119  04746  5007        FGET F.THET
120  04747  1010        FADD D.THET
121  04750  7273        FJMP A$
122  04751  0007        UNK
123
124  04752  4407   71S, FENT
125  04753  5007        FGET F.THET
126  04754  7273        FJMP A$
127  04755  0007        UNK
128
     04761  1000
     04762  5005
     04763  1502
     04764  2400
     04765  5200
     04766  4200
     04767  2314
     04770  2442
     04771  0600
     04772  2302
     04773  2114
     04774  3400
     04775  4400
     04776  4455
     04777  3600
129  05000             PAGE 1           5000       PT$.
2
3           0007        *7
4    00007  5042       FPENT
5
6           5000        *PT
7
8    05000  4777   R.LOOK, JMS FNEXT/EXAMINE FILE
9    05001  4776        JMS SFLOAT
10   05002  0023        F.NUM
11   05003  0020        W.SEQ
12   05004  5775        JMP R.SSB
13
14   05005  4774   FULL, JMS ERRPT/FULL FILE
15   05006  0000        0
16   05007  5773        JMP R.SSS
17
18   05010  1040   R.SCOR, TAD F.EOF/SEQUENCE CORRECT
19   05011  7640        SZA CLA
20   05012  5217        JMP 1S
21   05013  4772        JMS XROOM
22   05014  5205        JMP FULL
23   05015  4771        JMS DELETE
24   05016  5770        JMP R.SINA
25
26   05017  4774   1S, JMS ERRPT
27   05020  0007        7
28   05021  5767        JMP RPMODE
29
30   05022  4407   R.SNUS, FENT/SELECT NEXT UNPGMD SEQ
31   05023  5055        FGET NRECS
32   05024  6020        FPUT W.SEQ
33   05025  0000        FEXT
34   05026  5773        JMP R.SSS
35
36   05027  4407   R.MEME, FENT/MEMORY ERASE
37   05030  5020        FGET W.SEQ
38   05031  6055        FPUT NRECS
39   05032  0000        FEXT
40   05033  5766        JMP R.MEMC
41
42   05034  0365   PLANES, AND (3)
```

```
43  05035 6603        6603
44  05036 3241        DCA WAXIS
45  05037 4764        JMS WORLD
46  05040 5767        JMP RPMODE
47
48  05041 0000        WAXIS,0
49
50  05042 0000        FPENT,0/ENTER FP PACKAGE
51  05043 7300        CLA CLL
52  05044 1242        TAD FPENT
53  05045 6211        CDF 10
54  05046 3763        DCA I (6400)
55  05047 1020        TAD FXP
56  05050 3762        DCA I (EXP)
57  05051 1021        TAD HORD
58  05052 3761        DCA I (HORD)
59  05053 1022        TAD LORD
60  05054 3760        DCA I (LORD)
61  05055 6201        CDF 00
62  05056 6212        CIF 10
63  05057 5757        JMP I (6401)
64
65  05060 0000        FINDL,0/FIND PREVIOUS XY OR CIRCLE RECORD
66  05061 1055        TAD W.NUM
67  05062 3023        DCA F.NUM
68
69  05063 1023        1S,TAD F.NUM
70  05064 7650        SNA CLA
71  05065 5314        JMP 2S
72
73  05066 7240        7S,STA
74  05067 1023        TAD F.NUM
75  05070 3023        DCA F.NUM
76  05071 4756        JMS FFETCH
77  05072 1030        TAD F.EOP
78  05073 7640        SZA CLA
79  05074 5314        JMP 2S
80
81  05075 1023        5S,TAD F.NUM
82  05076 7041        CIA
83  05077 1055        TAD W.NUM
84  05100 7650        SNA CLA
85  05101 5660        JMP I FINDL
86
87  05102 7240        4S,STA
88  05103 1024        TAD F.TYPE
89  05104 7740        SMA SZA CLA
90  05105 5263        JMP 1S
91  05106 1027        TAD F.DEL
92  05107 7640        SZA CLA
93  05110 5263        JMP 1S
94  05111 4755        JMS FETCH
95  05112 2260        ISZ FINDL
96  05113 5660        JMP I FINDL
97
98  05114 2023        2S,ISZ F.NUM
99  05115 4756        JMS FFETCH
100 05116 1030        TAD F.EOP
101 05117 7650        SNA CLA
102 05120 5314        JMP 2S
103 05121 1040        TAD F.EOF
104 05122 7650        SNA CLA
105 05123 5275        JMP 5S
106 05124 5266        JMP 7S
107
108 05125 0000        CNTRIN,0/READ WORLD FROM UPPER CORE
109 05126 4764        JMS WORLD
110 05127 4764        JMS WORLD
111 05130 4764        JMS WORLD
112 05131 6213        CDI 10
113 05132 5725        JMP I CNTRIN
114
115 05133 0000        EVALRT,0/EVALUATE TYPE FOR REPEATS
116 05134 1354        TAD (TAD 1S)
117 05135 3336        DCA .+1
118 05136 7402        HLT
```

```
119  05137 5733    JMP I EVALRT
120
121  05140 0000    1S,0,1,1,1,2,3,4
     05141 0000
     05142 0001
     05143 0002
     05144 0003
     05145 0004
122
     05154 1340
     05155 0600
     05156 1724
     05157 6401
     05160 0022
     05161 0021
     05162 0020
     05163 6400
     05164 2200
     05165 0003
     05166 0240
     05167 4455
     05170 5200
     05171 2104
     05172 1502
     05173 4603
     05174 3200
     05175 4604
     05176 2000
     05177 4326
123  05200          PAGE 1    05200          R.SINS,
2
3    05200 4777     R.SINA,JMS XROOM/SEQUENCE INSERT
4    05201 5776     JMP FULL
5    05202 4775     JMS EVALT
6    05203 4774     JMS SUNIV
7    05204 1056     TAD W.TYPE
8    05205 1373     TAD (JMP I 1S)
9    05206 3207     DCA .+1
10   05207 7402     HLT
11
12   05210 4407     1S,FENT
13   05211 5056     FGET FT.0
14   05212 6001     FPUT F.X
15   05213 5057     FGET FT.1
16   05214 6003     FPUT F.Y
17   05215 0000     FEXT
18
19   05216 1056     2OS,TAD W.TYPE
20   05217 4772     JMS DISPFF
21   05220 4771     JMS INSERT
22   05221 4407     FENT
23   05222 5020     FGET W.SEQ
24   05223 1031     FADD FP.ONE
25   05224 6020     FPUT W.SEQ
26   05225 0000     FEXT
27   05226 5770     JMP R.SSB
28
29   05227 4407     2S,FENT
30   05230 5060     FGET FT.2
31   05231 6005     FPUT F.Z
32   05232 0000     FEXT
33   05233 5216     JMP 2OS
34
35   05234 4407     3S,FENT
36   05235 5061     FGET FT.3
37   05236 6007     FPUT F.THET
38   05237 0000     FEXT
39   05240 5216     JMP 2OS
40
41   05241 5210    1OS,1S,1S,2S,3S,2OS,2OS
     05242 5210
     05243 5227
     05244 5234
```

```
        05245 5216
        05244 5216
42
43      05247 4774    R.RLN,JMS SUNIV/REAPEAT LAST N
44      05250 4407    FENT
45      05251 5024    FGET F.N
46      05252 2020    FSUB W.SEQ
47      05253 7267    FJMP 1$
48      05254 0002    GTZ
49      05255 0014    FNEG
50      05256 6053    FPUT WFT.0
51      05257 0000    FEXT
52      05260 4767    JMS SUNFL
53      05261 0053    WFT.0
54      05262 0023    F.NUM
55      05263 4767    JMS SUNFL
56      05264 0024    F.N
57      05265 0176    REPCNT
58      05266 5301    JMP R.RTPA
59
60      05267 0000    1$,FEXT
61      05270 5272    JMP R.RTPS
62
63      05271 4774    R.RTPP,JMS SUNIV/REPEAT PROGRAM
64
65      05272 1055    R.RTPS,TAD W.NUM
66      05273 3023    DCA F.NUM
67      05274 4766    JMS FSTRT
68      05275 1023    TAD F.NUM
69      05276 7041    CIA
70      05277 1055    TAD W.NUM
71      05300 3176    DCA REPCNT
72
73      05301 4775    R.RTPA,JMS EVALT
74      05302 1056    TAD W.TYPE
75      05303 4765    JMS FVALRT
76      05304 7041    CIA
77      05305 3177    DCA TARTYP
78      05306 4764    JMS FETCH
79      05307 1024    TAD F.TYPE
80      05310 4765    JMS FVALRT
81      05311 1177    TAD TARTYP
82      05312 7640    SZA CLA
83      05313 5327    JMP 1$
84      05314 4407    FENT
85      05315 5030    FGET FP.ZIP
86      05316 6062    FPUT DX
87      05317 6063    FPUT DY
88      05320 6064    FPUT DZ
89      05321 6065    FPUT DTH
90      05322 0000    FEXT
91
92            0062    DX=FT.4
93            0063    DY=FT.5
94            0064    DZ=FT.6
95            0065    DTH=FT.7
96
97      05323 1056    TAD W.TYPE
98      05324 1363    TAD (JMP I 9AS)
99      05325 3326    DCA .+1
100     05326 7402    HLT
101
102     05327 4762    1$,JMS ERRPT
103     05330 0005    5
104     05331 1055    TAD W.NUM
105     05332 3023    DCA F.NUM
106     05333 4764    JMS FETCH
107     05334 5761    JMP PMODE
108
109     05335 5400    9AS,10$/10$/11$/12$/13$/13$
        05336 5400
        05337 5411
        05340 5417
        05341 5424
        05342 5424
```

```
110
    05361 4454
    05362 3200
    05363 5735
    05364 0600
    05365 5133
    05366 3266
    05367 2114
    05370 4604
    05371 1022
    05372 4200
    05373 3641
    05374 4640
    05375 2400
    05376 5005
    05377 1502
111 05400          PAGE 1    05400 4407      10S,FENT
2    05401 5056      FGET F,A
3    05402 2001      FSUB F,X
4    05403 6062      FPUT DX
5    05404 5057      FGET F,1
6    05405 2003      FSUB F,Y
7    05406 6063      FPUT DY
8    05407 0000      FEXT
9    05410 5224      JMP 13S
10
11   05411 4407      11S,FENT
12   05412 5060      FGET F,2
13   05413 2005      FSUB F,Z
14   05414 6064      FPUT DZ
15   05415 0000      FEXT
16   05416 5224      JMP 13S
17
18   05417 4407      12S,FENT
19   05420 5061      FGET F,3
20   05421 2007      FSUB F,THET
21   05422 6065      FPUT DTH
22   05423 0000      FEXT
23
24   05424 4314      13S,JMS 30S
25   05425 1055      TAD W,NUM
26   05426 3075      DCA FREC
27   05427 4777      JMS FIND
28   05430 4306      JMS 31S
29
30   05431 7240      20S,STA
31   05432 1176      TAD REPCNT
32   05433 7510      SPA
33   05434 5304      JMP 24S
34   05435 3176      DCA REPCNT
35   05436 4776      JMS XROOM
36   05437 5775      JMP FULL
37   05440 4330      JMS 40S
38   05441 4774      JMS FETCH
39   05442 4314      JMS 30S
40   05443 2023      ISZ F,NUM
41   05444 1024      TAD F,TYPE
42   05445 4773      JMS EVALRT
43   05446 1177      TAD TARTYP
44   05447 7640      SZA CLA
45   05450 5267      JMP 23S
46   05451 4407      FENT
47   05452 5001      FGET F,X
48   05453 1062      FADD DX
49   05454 6001      FPUT F,X
50   05455 5003      FGET F,Y
51   05456 1063      FADD DY
52   05457 6003      FPUT F,Y
53   05460 5005      FGET F,Z
54   05461 1064      FADD DZ
55   05462 6005      FPUT F,Z
56   05463 5007      FGET F,THET
57   05464 1065      FADD DTH
```

```
58   05465 6007    FPUT F.THET
59   05466 0000    FEXT
60
61   05467 4772    23S,JMS MOVE
62   05470 0013    11.
63   05471 0024    F.TYPE
64   05472 0056    W.TYPE
65   05473 4322    JMS 41S
66   05474 4771    JMS INSERT
67   05475 2055    ISZ W.NUM
68   05476 4770    JMS SFLOAT
69   05477 0055    W.NUM
70   05500 0020    W.SEQ
71   05501 4767    JMS PDTWU
72   05502 0020    W.SEQ
73   05503 5225    JMP 13S+1
74
75   05504 7200    24S,CLA
76   05505 5766    JMP R.SSS
77
78   05506 0000    31S,0/SAVE W.PTA
79   05507 4765    JMS PTAP
80   05510 0173    T.13
81   05511 1074    TAD RECI
82   05512 3175    DCA T.15
83   05513 5706    JMP I 31S
84
85   05514 0000    30S,0/SAVE F.PTA
86   05515 4765    JMS PTAP
87   05516 0170    T.10
88   05517 1074    TAD RECI
89   05520 3172    DCA T.12
90   05521 5714    JMP I 30S
91
92   05522 0000    41S,0/RESTORE W.PTA
93   05523 4764    JMS PTAG
94   05524 0173    T.13
95   05525 1175    TAD T.15
96   05526 3074    DCA RECI
97   05527 5722    JMP I 41S
98
99   05530 0000    40S,0/RESTORE F.PTA
100  05531 4764    JMS PTAG
101  05532 0170    T.10
102  05533 1172    TAD T.12
103  05534 3074    DCA RECI
104  05535 5730    JMP I 40S
105
106        0176    REPCNT=T.16
107        0177    TARTYP=T.17
108
109  05536 0000    RSEQUS,0/RETRACT Z FLAG
110  05537 5736    JMP I RSEQUS
111
112  05540 0000    RSEQU,0/RETRACT Z
113  05541 1363    TAD (-A.)
114  05542 3125    DCA VMASK
115  05543 1336    TAD RSEQUS
116  05544 7650    SNA CLA
117  05545 5740    JMP I RSEQU
118  05546 3336    DCA RSEQUS
119  05547 6213    CDI 10
120  05550 4762    JMS URSQU
121
122  05551 6001    ZLIMIT,ION/Z LIMIT
123  05552 4761    JMS WORLD
124  05553 6213    CDI 10
125  05554 4760    JMS ZNUDGE
126  05555 5740    JMP I RSEQU
127
     05560 0200
     05561 2200
     05562 0223
     05563 7770
     05564 1470
     05565 1456
```

```
        05566 4603
        05567 3400
        05570 2000
        05571 1022
        05572 2442
        05573 5133
        05574 0600
        05575 5005
        05576 1502
        05577 1674
128 05600           PAGE

1                   .ENABL LSB
2
3   05600 4777      ZERROR,JMS ERRPT
4   05601 0006      6
5
6   05602 1060      RUNRET,TAD W.AXIS
7   05603 6603      6603
8   05604 7200      CLA
9
10  05605 3125      RUNN,DCA VMASK/RUN MODE LOOP
11  05606 4776      JMS STOPS
12  05607 5602      RUNRET
13  05610 3123      DCA INTVAL
14
15  05611 6001      2S,ION
16  05612 6601      6601
17  05613 5775      JMP PMODE
18  05614 1123      TAD INTVAL
19  05615 7450      SNA
20  05616 5211      JMP 2S
21  05617 1374      TAD (JMP I 10S-1)
22  05620 3223      DCA 1S
23  05621 4773      JMS WORLD
24  05622 3123      DCA INTVAL
25
26  05623 7402      1S,HLT
27
28  05624 4772      Q.SSEL,JMS INCON/RUN MODE SEQUENCE SELECT
29  05625 0020      W.SEQ
30  05626 5205      JMP RUNN
31
32  05627 4771      Q.SSA,JMS PSEQUS
33  05630 7001      IAC
34  05631 3126      DCA RETRO
35  05632 3071      DCA NEXTF
36  05633 3073      DCA FFOUND
37  05634 4770      JMS SUNFL
38  05635 0020      W.SEQ
39  05636 0023      F.NUM
40  05637 4767      JMS FETCH
41  05640 4766      JMS DISPFC
42  05641 5205      JMP RUNN
43
44  05642 5624      10S,Q.SSEL
45  05643 5652      Q.CYCL
46  05644 5605      RUNN
47  05645 6202      Q.RDR
48  05646 6200      Q.PNCH
49  05647 5605      RUNN
50  05650 5605      RUNN
51  05651 5605      RUNN
52
53                  .DSABL LSB
54
55  05652 1040      Q.CYCL,TAD F.EOF/CYCLE
56  05653 7640      SZA CLA
57  05654 5334      JMP 6S
58  05655 1071      TAD NEXTF
59  05656 7650      SNA CLA
60  05657 5322      JMP 1S
61
62  05660 4765      2S,JMS FNEXT
63  05661 3071      DCA NEXTF
64  05662 1040      TAD F.EOF
```

```
65   05663 7640      SZA CLA
66   05664 5260      JMP 2S
67   05665 4764      JMS SFLOAT
68   05666 0023      F.NUM
69   05667 0020      W.SEQ
70   05670 4766      JMS DISPFC
71
72   05671 4773  4S,JMS WORLD
73   05672 1061      TAD W.DEL
74   05673 7640      SZA CLA
75   05674 5260      JMP 2S
76   05675 1024      TAD F.TYPE
77   05676 1363      TAD (JMS I 11S)
78   05677 3305      DCA 5S
79   05700 4762      JMS RSEQU
80   05701 1361      TAD (ZERROR)
81   05702 3762      DCA RSEQU
82   05703 4776      JMS STOPS
83   05704 5602      RUNRET
84
85   05705 7402  5S,HLT
86
87   05706 6001  3S,ION
88   05707 4773      JMS WORLD
89   05710 4760      JMS STOPX
90   05711 5205      JMP RUNN
91   05712 4757      JMS AUXFDO
92   05713 3125      DCA VMASK
93   05714 4773      JMS WORLD
94   05715 1063      TAD W.HOLD
95   05716 7450      SNA
96   05717 5260      JMP 2S
97   05720 3071      DCA NEXTF
98   05721 5202      JMP RUNRET
99
100  05722 1126  1S,TAD RETRO
101  05723 7650      SNA CLA
102  05724 5271      JMP 4S
103  05725 4756      JMS FSRCHA
104  05726 4755      JMS RCREAT
105  05727 3126      DCA RETRO
106  05730 1061      TAD W.DEL
107  05731 7640      SZA CLA
108  05732 5260      JMP 2S
109  05733 5306      JMP 3S
110
111  05734 4777  6S,JMS ERRPT
112  05735 0010      8.
113  05736 5205      JMP RUNN
114
115        5737      T.JTAB=.
116
117  05737 6212  11S,DO.XY;DO.CIR;DO.Z;DO.A;DO.SSP;DO.TC;DO.EDF;DO.EOF
     05740 6217
     05741 6422
     05742 6467
     05743 6204
     05744 6206
     05745 6210
     05746 6210
118
     05755 6074
     05756 4400
     05757 6800
     05760 2724
     05761 5600
     05762 5940
     05763 4737
     05764 2000
     05765 4326
     05766 4264
     05767 0600
     05770 2114
     05771 5336
     05772 3600
     05773 2200
```

```
        05774 5641
        05775 4454
        05776 2733
        05777 3200
119 06000          PAGE 1  06000 0000    AUXFDO,0/DO AUX FCNS AND AUTO DRILL
  2  06001 1377    TAD (120)
  3  06002 6400    6400
  4  06003 1376    TAD (1S-120)
  5  06004 3271    DCA 2S
  6  06005 3125    DCA VMASK
  7  06006 1375    TAD (-4)
  8  06007 3272    DCA 4S
  9
 10  06010 6411    5S,6411
 11  06011 5226    JMP 3S
 12  06012 3273    DCA AUXDUN
 13  06013 3123    DCA INTVAL
 14  06014 1671    TAD I 2S
 15  06015 6436    6436
 16  06016 7200    CLA
 17
 18  06017 7344    7S,STA CLL RAL
 19  06020 1123    TAD INTVAL
 20  06021 7650    SNA CLA
 21  06022 5226    JMP 3S
 22  06023 1273    TAD AUXDUN
 23  06024 7650    SNA CLA
 24  06025 5217    JMP 7S
 25
 26  06026 2271    3S,ISZ 2S
 27  06027 2272    ISZ 4S
 28  06030 5210    JMP 5S
 29  06031 1066    TAD W.AUTO
 30  06032 7650    SNA CLA
 31  06033 5600    JMP I AUXFDO
 32  06034 4774    JMS STOPS
 33  06035 6063    8S
 34  06036 1773    TAD Z.N0
 35  06037 3023    DCA F.NUM
 36  06040 4772    JMS FETCH
 37  06041 7344    STA CLL RAL
 38  06042 1024    TAD F.TYPE
 39  06043 7650    SNA CLA
 40  06044 4771    JMS DO.ZE
 41  06045 1770    TAD Z.N1
 42  06046 3023    DCA F.NUM
 43  06047 4772    JMS FETCH
 44  06050 7344    STA CLL RAL
 45  06051 1024    TAD F.TYPE
 46  06052 7650    SNA CLA
 47  06053 4771    JMS DO.ZE
 48  06054 1200    TAD AUXFDO
 49
 50  06055 3767    6S,DCA DISPFC
 51  06056 1053    TAD W.NUM
 52  06057 3023    DCA F.NUM
 53  06060 4772    JMS FETCH
 54  06061 5766    JMP DISPFD
 55  06062 5600    JMP I AUXFDO
 56
 57  06063 1365    8S,TAD (RUNRET)
 58  06064 5255    JMP 6S
 59
 60  06065 0001    1S,1/2/4/8.
     06066 0002
     06067 0004
     06070 0010
 61  06071 0000    2S,0
 62  06072 0000    4S,0
 63  06073 0000    AUXDUN,0
 64
 65  06074 0000    RCREAT,0/RECREATE ENVIRONMENT
 66  06075 1060    TAD W.AXIS
```

```
67  06076 1364    TAD (TAD 1$)
68  06077 3300    DCA .+1
69  06100 7402    HLT
70  06101 3010    DCA XR0
71  06102 1410    TAD I XR0
72  06103 7640    SZA CLA
73  06104 4763    JMS RSEQU
74  06105 3762    DCA RSEQUS
75  06106 1361    TAD (ZERROR)
76  06107 3763    DCA RSEQU
77  06110 1060    TAD W.AXIS
78  06111 6603    6603
79  06112 7200    CLA
80  06113 4342    JMS DO.IT
81  06114 4342    JMS DO.IT
82  06115 4342    JMS DO.IT
83  06116 1055    TAD W.NUM
84  06117 3023    DCA F.NUM
85  06120 4772    JMS FETCH
86  06121 5674    JMP I RCREAT
87
88  06122 6125    1$,2$-1
89  06123 6131    3$-1
90  06124 6131    3$-1
91  06125 6135    4$-1
92
93  06126 0001    2$,1
94  06127 2155    ENVTAB
95  06130 2157    ENVTAB+2
96  06131 2156    ENVTAB+1
97
98  06132 0000    3$,0
99  06133 2156    ENVTAB+1
100 06134 2155    ENVTAB
101 06135 2157    ENVTAB+2
102
103 06136 0001    4$,1
104 06137 2157    ENVTAB+2
105 06140 2155    ENVTAB
106 06141 2156    ENVTAB+1
107
108 06142 0000    DO.IT,0/DO A RECREATE MOVE
109 06143 1410    TAD I XR0
110 06144 3023    DCA F.NUM
111 06145 1423    TAD I F.NUM
112 06146 3023    DCA F.NUM
113 06147 4772    JMS FETCH
114 06150 1360    TAD (T.JTAB)
115 06151 1024    TAD F.TYPE
116 06152 3357    DCA 1$
117 06153 1757    TAD I 1$
118 06154 3357    DCA 1$
119 06155 4757    JMS I 1$
120 06156 5742    JMP I DO.IT
121
122 06157 0000    1$,0
123
    06160 5737
    06161 5600
    06162 5536
    06163 5540
    06164 1322
    06165 5602
    06166 4273
    06167 4264
    06170 2154
    06171 6434
    06172 0600
    06173 2153
    06174 2733
    06175 7774
    06176 5745
    06177 0120
124 06200           PAGE
```

```
1   06200 4777   Q.PNCH,JMS PUNCH
2   06201 5776   JMP Q.SSA
3
4   06202 4775   Q.RDR,JMS READ
5   06203 5776   JMP Q.SSA
6
7   06204 0000   DO.SSP,0/SPINDLE SPEED
8   06205 5604   JMP I DO.SSP
9
10  06206 0000   DO.TC,0/TOOL CHANGE
11  06207 5606   JMP I DO.TC
12
13  06210 0000   DO.EOF,0/EOF
14  06211 5610   JMP I DO.EOF
15
16  06212 0000   DO.XY,0/STRAIGHT LINE MOVE
17  06213 4774   JMS MIRROR
18  06214 6213   CDI 10
19  06215 4773   JMS MXYU
20  06216 5612   JMP I DO.XY
21
22  06217 0000   DO.CIR,0/CIRCULAR MOVE
23  06220 1126   TAD RETRO
24  06221 7640   SZA CLA
25  06222 5267   JMP 6$
26  06223 4772   JMS FINDL
27  06224 5267   JMP 6$
28  06225 4774   JMS MIRROR
29  06226 4407   FENT
30  06227 5001   FGET F.X
31  06230 6046   FPUT XPOSA
32  06231 5003   FGET F.Y
33  06232 6047   FPUT YPOSA
34  06233 0000   FEXT
35  06234 1055   TAD W.NUM
36  06235 3023   DCA F.NUM
37  06236 4771   JMS FETCH
38  06237 4774   JMS MIRROR
39  06240 7344   STA CLL RAL
40  06241 1054   TAD M.X
41  06242 1053   TAD M.Y
42  06243 7450   SNA
43  06244 5260   JMP 4$
44  06245 7001   IAC
45  06246 7640   SZA CLA
46  06247 5260   JMP 4$
47  06250 1035   TAD F.CCW
48  06251 7650   SNA CLA
49  06252 7001   IAC
50  06253 3035   DCA F.CCW
51  06254 1036   TAD F.CENT
52  06255 7650   SNA CLA
53  06256 7001   IAC
54  06257 3036   DCA F.CENT
55
56  06260 6213   4$,CDI 10
57  06261 4770   JMS PNTCF
58  06262 5271   JMP 5$
59  06263 6213   CDI 10
60  06264 4767   JMS CIRCU
61  06265 4766   JMS WORLD
62  06266 4771   JMS FETCH
63
64  06267 4212   6$,JMS DO.XY
65  06270 5617   JMP I DO.CIR
66
67  06271 4765   5$,JMS ERRPT
68  06272 0004   4
69  06273 5764   JMP RUNN
70
71  06274 0000   PUTCH,0/FETCH AND READ WORLD FROM BANK 1
72  06275 1055   TAD W.NUM
73  06276 3023   DCA F.NUM
74  06277 4771   JMS FETCH
75  06300 4766   JMS WORLD
76  06301 6213   CDI 10
```

```
 77   06302 5674   JMP I FUTCH
 78
 79         6303   PT.
 80
      06364 5605
      06365 3200
      06366 2200
      06367 0400
      06370 1600
      06371 0600
      06372 5060
      06373 0241
      06374 6400
      06375 3000
      06376 5627
      06377 2600
 81         0000   FIELD 1
 82         0001   FIELD 1
 83
 84         0003   *FUTSCH
 85   10003 6274   FUTCH
 86
 87         0000   FIELD 0
 88
 89         6303   *PT
 90
 91   06400        PAGE 1   06400 0000   MIRROR,0/MIRROR X AND Y
  2   06401 1054   TAD M.X
  3   06402 7650   SNA CLA
  4   06403 5211   JMP 1S
  5   06404 4407   FENT
  6   06405 5001   FGET F.X
  7   06406 0014   FNEG
  8   06407 6001   FPUT F.X
  9   06410 0000   FEXT
 10
 11   06411 1053   1S,TAD M.Y
 12   06412 7650   SNA CLA
 13   06413 5600   JMP I MIRROR
 14   06414 4407   FENT
 15   06415 5003   FGET F.Y
 16   06416 0014   FNEG
 17   06417 6003   FPUT F.Y
 18   06420 0000   FEXT
 19   06421 5600   JMP I MIRROR
 20
 21   06422 0000   DO.Z,0/Z MOVE
 22   06423 4234   JMS DO.ZE
 23   06424 1126   TAD RETRO
 24   06425 7640   SZA CLA
 25   06426 5622   JMP I DO.Z
 26   06427 1777   TAD Z.N1
 27   06430 3776   DCA Z.N0
 28   06431 1023   TAD F.NUM
 29   06432 3777   DCA Z.N1
 30   06433 5622   JMP I DO.Z
 31
 32   06434 0000   DO.ZE,0
 33   06435 1126   TAD RETRO
 34   06436 7640   SZA CLA
 35   06437 5245   JMP 1S
 36   06440 1066   TAD W.AUTO
 37   06441 7650   SNA CLA
 38   06442 5245   JMP 1S
 39   06443 7126   STL RTL
 40   06444 4775   JMS DISPFF
 41
 42   06445 4312   1S,JMS XOFFS
 43   06446 4407   FENT
 44   06447 1005   FADD F.Z
 45   06450 0000   FEXT
 46   06451 1052   TAD M.Z
 47   06452 7650   SNA CLA
```

```
48  06453 5257   JMP 2$
49  06454 4407   FENT
50  06455 0014   FNEG
51  06456 0000   FEXT
52
53  06457 4407   2$,FENT
54  06460 6005   FPUT FZPOS
55  06461 0000   FEXT
56  06462 4774   JMS PDTWU
57  06463 0005   F.Z
58  06464 6213   CDI 10
59  06465 4773   JMS CVZU
60  06466 5634   JMP I DO.ZE
61
62  06467 0000   DO.A,0/THETA MOVE
63  06470 4312   JMS XOFFS
64  06471 4407   FENT
65  06472 1007   FADD F.THET
66  06473 0000   FEXT
67  06474 1051   TAD M.TH
68  06475 7650   SNA CLA
69  06476 5302   JMP 2$
70  06477 4407   FENT
71  06500 0014   FNEG
72  06501 0000   FEXT
73
74  06502 4407   2$,FENT
75  06503 6007   FPUT F.THET
76  06504 0000   FEXT
77  06505 4774   JMS PDTWU
78  06506 0007   F.THET
79  06507 6213   CDI 10
80  06510 4772   JMS THETU
81  06511 5667   JMP I DO.A
82
83  06512 0000   XOFFS,0/CHECK FOR OFFSET
84  06513 4407   FENT
85  06514 5030   FGET FP.ZIP
86  06515 0000   FEXT
87  06516 1032   TAD F.OFF
88  06517 7650   SNA CLA
89  06520 5712   JMP I XOFFS
90  06521 4407   FENT
91  06522 5023   FGET F.OFFS
92  06523 0000   FEXT
93  06524 1033   TAD F.SENS
94  06525 7650   SNA CLA
95  06526 5712   JMP I XOFFS
96  06527 4407   FENT
97  06530 0014   FNEG
98  06531 0000   FEXT
99  06532 5712   JMP I XOFFS
100
    06572 0274
    06573 0600
    06574 3400
    06575 4200
    06576 2153
    06577 2154
101 06600         PAGE 1           0001  FIELD 1
2
3           0004  *4
4
5   10004 0337   UBPV
6
7           0200  *200
8
9   10200 0000   ZNUDGE,0/NUDGE OFF Z LIMIT
10  10201 4407   FENT
11  10202 5220   FGET 1$
12  10203 6001   FPUT ZDELT
13  10204 0014   FNEG
14  10205 1016   FADD WZPOS
```

```
15  10206 6005    FPUT FZPOS
16  10207 0000    FEXT
17  10210 6603    6603
18  10211 1377    TAD (FP.SM)
19  10212 4776    JMS MOVEZ
20  10213 0001    1
21  10214 6203    CDI 00
22  10215 4775    JMS FUTCH
23  10216 6203    CDI 00
24  10217 5600    JMP I ZNUDGE
25
26  10220 0015    1S,15/234210
    10221 2342
    10222 0000
27
28  10223 0000    URSQU,0/RETRACT Z
29  10224 4407    FENT
30  10225 5236    FGET 1S
31  10226 6001    FPUT ZDELT
32  10227 0000    FEXT
33  10230 6603    6603
34  10231 1377    TAD (FP.SM)
35  10232 4776    JMS MOVEZ
36  10233 0000    0
37  10234 6203    CDI 00
38  10235 5623    JMP I URSQU
39
40  10236 0027    1S,27/3777/7777
    10237 3777
    10240 7777
41
42  10241 0000    MXYU,0/LINE FRONT END
43  10242 1374    TAD (F.SPD)
44  10243 4773    JMS XYSPC
45
46  10244 1372    2S,TAD (4)
47  10245 3771    DCA ENDXC
48  10246 1370    TAD (1P0)
49  10247 3767    DCA XYXM
50  10250 4766    JMS RSTL
51  10251 6203    CDI 00
52  10252 4765    JMS CNTRIN
53  10253 4407    FENT
54  10254 5001    FGET XDEST
55  10255 2014    FSUB C.X
56  10256 0001    FSQ
57  10257 6053    FPUT WFT.0
58  10260 5003    FGET YDEST
59  10261 2015    FSUB C.Y
60  10262 0001    FSQ
61  10263 1053    FADD WFT.0
62  10264 0002    FSQRT
63  10265 4043    FDIV EPSILN
64  10266 0000    FEXT
65  10267 1020    TAD EXP
66  10270 7740    SMA SZA CLA
67  10271 5244    JMP 2S
68  10272 6203    CDI 00
69  10273 5641    JMP I MXYU
70
71  10274 0000    THETU,0/THETA MOVE DRIVER
72  10275 1374    TAD (F.SPD)
73  10276 4773    JMS XYSPC
74
75  10277 1372    2S,TAD (4)
76  10300 3771    DCA ENDXC
77  10301 4407    FENT
78  10302 5030    FGET FP.ZIP
79  10303 6003    FPUT YDEST
80  10304 6015    FPUT WYPOS
81  10305 6014    FPUT WXPOS
82  10306 5007    FGET F.THET
83  10307 2017    FSUB C.THET
84  10310 6001    FPUT THDEL
85  10311 4043    FDIV EPSILN
86  10312 0000    FEXT
```

```
87  10313 1020    TAD EXP
88  10314 7750    SPA SNA CLA
89  10315 5335    JMP 4$
90  10316 1021    TAD HORD
91  10317 7700    SMA CLA
92  10320 5327    JMP 3$
93  10321 4407    FENT
94  10322 5001    FGET THDEL
95  10323 0014    FNEG
96  10324 6001    FPUT THDEL
97  10325 0000    FEXT
98  10326 7105    CLL IAC RAL
99
100 10327 7001    3$,IAC
101 10330 3767    DCA XYXM
102 10331 4766    JMS RSTL
103 10332 6203    CDI 00
104 10333 4765    JMS CNTRIN
105 10334 5277    JMP 2$
106
107 10335 6203    4$,CDI 00
108 10336 5674    JMP I THETU
109
110 10337 0000    URPV,0
111 10340 0000    0
112 10341 0000    0
113
    10365 5125
    10366 1043
    10367 1120
    10370 0100
    10371 1557
    10372 0004
    10373 0516
    10374 0000
    10375 6274
    10376 1000
    10377 0036
114 10400          PAGE

1               .ENABL LSB
2
3        0077   N.S=FT.17
4
5   10400 0000   CIRCU,0/CIRCLE DRIVER
6   10401 1377   TAD (TAD 1$)
7   10402 3203   DCA 2$
8
9   10403 7402   2$,HLT
10  10404 7510   SPA
11  10405 5221   JMP 3$
12  10406 3263   DCA 4$
13  10407 4407   FENT
14  10410 5663   FGET I 4$
15  10411 3037   FMPY FP.SF
16  10412 0012   FRND
17  10413 0011   UNNOR
18  10414 0017   FNOR
19  10415 6663   FPUT I 4$
20  10416 0000   FEXT
21  10417 2203   ISZ 2$
22  10420 5203   JMP 2$
23
24  10421 6607   3$,6607
25  10422 7410   SKP
26  10423 5244   JMP 20$
27  10424 4407   FENT
28  10425 5000   FGET F.SPD
29  10426 7245   FJMP 20$+1
30  10427 0001   ETZ
31  10430 5274   FGET 5$
32  10431 4000   FDIV F.SPD
33  10432 1277   FADD 6$
34  10433 4302   FDIV 7$
35  10434 0012   FRND
```

```
36  10435 0011    UNNOR
37  10436 0017    FNOR
38  10437 6077    FPUT N,S
39  10440 2310    FSUB 8S
40  10441 7247    FJMP 23S
41  10442 0003    GTZ ETZ
42  10443 0000    FEXT
43
44  10444 4407    20S,FENT
45  10445 5310    FGET 8S
46  10446 6077    FPUT N,S
47
48  10447 5077    23S,FGET N,S
49  10450 0011    UNNOR
50  10451 0000    FEXT
51  10452 1021    TAD HORD
52  10453 7640    SZA CLA
53  10454 3022    DCA LORD
54  10455 1022    TAD LORD
55  10456 7041    CIA
56  10457 3002    DCA RAMPS
57  10460 4401    JMS I CIRCLE
58  10461 6203    CDI 00
59  10462 5600    JMP I CIRCU
60
61  10463         40S,
62  10463 0000    4S,0
63  10464 0014    1S,C,X;C,Y;FRAD;XCNTR;YCNTR;XDEST;YDEST;-1
    10465 0015
    10466 0022
    10467 0100
    10470 0045
    10471 0001
    10472 0003
    10473 7777
64  10474 0021    5S,21;3465;3600/118110
    10475 3465
    10476 3600
65  10477 0006    6S,6;4340;0/-57
    10500 4340
    10501 0000
66  10502 0004    7S,4;3200;0/13
    10503 3200
    10504 0000
67  10505 0007    9S,7;5440;0/-78
    10506 5440
    10507 0000
68  10510 0006    8S,6;2440;0/41
    10511 2440
    10512 0000
69  10513 0006    30S,6;3600;0/60
    10514 3600
    10515 0000
70
71  10516 0000    XYSPC,0/COMPUTE NON-CIRCLE SPEED
72  10517 3263    DCA 40S
73  10520 6607    6607
74  10521 7410    SKP
75  10522 5362    JMP 15S
76  10523 4407    FENT
77  10524 5663    FGET I 40S
78  10525 7363    FJMP 10S
79  10526 0001    ETZ
80  10527 5274    FGET 5S
81  10530 4663    FDIV I 40S
82  10531 1305    FADD 9S
83  10532 4302    FDIV 7S
84  10533 0012    FRND
85  10534 0011    UNNOR
86  10535 0017    FNOR
87  10536 7363    FJMP 10S
88  10537 0005    ETZ LTZ
89
90  10540 6051    14S,FPUT STOPSP
91  10541 5313    FGET 30S
```

```
92   10542 6050        FPUT STRTSP
93   10543 2051        FSUB STOPSP
94   10544 7350        FJMP 13$
95   10545 0002        GTZ
96   10546 5051        FGET STOPSP
97   10547 6050        FPUT STRTSP
98
99   10550 5050        13$,FGET STRTSP
100  10551 0011        UNNOR
101  10552 0000        FEXT
102  10553 1021        TAD HORD
103  10554 7640        SZA CLA
104  10555 3022        DCA LORD
105  10556 1022        TAD LORD
106  10557 7041        CIA
107  10560 3002        DCA RAMPS
108  10561 5716        JMP I XYSPC
109
110  10562 4407        15$,FENT
111
112  10563 5044        10$,FGET SP.MAX
113  10564 7340        FJMP 14$
114  10565 0007        UNK
115
116                    .DSABL LSR
117
     10577 1264
118  10600               PAGE 1         0001        ZDELT=XDEST
2
3    10600 0000        CYZU,0/UPPER CORE Z DRIVER
4    10601 3777        DCA ENDXC
5    10602 4407        FENT
6    10603 6351        FPUT TPYT
7    10604 2016        FSUB WZPOS
8    10605 6053        FPUT WFT.0
9    10606 7214        FJMP ZMF
10   10607 0004        LTZ
11   10610 5030        FGET FP.ZIP
12   10611 6021        FPUT FZPK
13   10612 0000        FEXT
14   10613 5216        JMP ZMFA
15
16   10614 0000        ZMF,FEXT
17   10615 7001        IAC
18
19   10616 3326        ZMFA,DCA ZCMMD
20   10617 4407        FENT
21   10620 5053        FGET WFT.0
22   10621 0006        FABS
23   10622 6073        FPUT DELTAZ
24   10623 5335        FGET F.BIGE
25   10624 6043        FPUT EPSILN
26   10625 5021        FGET FZPK
27   10626 7313        FJMP ZMB
28   10627 0001        ETZ
29   10630 3343        FMPY F200
30   10631 6072        FPUT ZINK
31   10632 6071        FPUT ZINC
32   10633 5030        FGET FP.ZIP
33   10634 6001        FPUT ZDELT
34   10635 0000        FEXT
35
36   10636 4407        ZMC,FENT
37   10637 5073        FGET DELTAZ
38   10640 2072        FSUB ZINK
39   10641 7331        FJMP ZMD
40   10642 0005        LTZ ETZ
41   10643 6073        FPUT DELTAZ
42   10644 5001        FGET ZDELT
43   10645 1072        FADD ZINK
44   10646 6001        FPUT ZDELT
45   10647 0014        FNEG
46   10650 1016        FADD WZPOS
```

```
47  10651 6005   FPUT FZPOS
48  10652 0000   FEXT
49  10653 1376   TAD (F.SPD)
50  10654 4775   JMS MOVEZ
51  10655 0001   1
52  10656 4407   FENT
53  10657 5071   FGET ZINC
54  10660 6001   FPUT ZDELT
55  10661 6070   FPUT ZDETL
56  10662 1016   FADD WZPOS
57  10663 6005   FPUT FZPOS
58  10664 0000   FEXT
59  10665 1374   TAD (FP.SM)
60  10666 4775   JMS MOVEZ
61  10667 0000   0
62  10670 4407   FENT
63  10671 5070   FGET ZDETL
64  10672 2346   FSUB FIVE
65  10673 6001   FPUT ZDELT
66  10674 0014   FNEG
67  10675 1016   FADD WZPOS
68  10676 6005   FPUT FZPOS
69  10677 0000   FEXT
70  10700 1374   TAD (FP.SM)
71  10701 4775   JMS MOVEZ
72  10702 0001   1
73  10703 4407   FENT
74  10704 5346   FGET FIVE
75  10705 6001   FPUT ZDELT
76  10706 5072   FGET ZINK
77  10707 1071   FADD ZINC
78  10710 6071   FPUT ZINC
79  10711 0000   FEXT
80  10712 5236   JMP ZMC
81
82  10713 5073   ZMB,FGET DELTAZ
83  10714 6001   FPUT ZDELT
84
85  10715 5351   ZME,FGET TPY7
86  10716 6005   FPUT FZPOS
87  10717 5340   FGET F.LITE
88  10720 6043   FPUT EPSILN
89  10721 0000   FEXT
90  10722 1373   TAD (4)
91  10723 3777   DCA ENDXC
92  10724 1376   TAD (F.SPD)
93  10725 4775   JMS MOVEZ
94
95  10726 0000   ZCMMD,0
96  10727 6203   CDI 00
97  10730 5600   JMP I CYZU
98
99  10731 1072   ZMD,FADD ZINK
100 10732 6001   FPUT ZDELT
101 10733 7315   FJMP ZME
102 10734 0007   UNK
103
104 10735 0005   F.BIGE,5;2400;0
    10736 2400
    10737 0000
105 10740 0001   F.LITE,1;3000;0
    10741 3000
    10742 0000
106 10743 0007   F200,7;3100;0
    10744 3100
    10745 0000
107 10746 0006   FIVE,6;3100;0
    10747 3100
    10750 0000
108 10751 0000   TPY7,0;0;0
    10752 0000
    10753 0000
    10773 0004
    10774 0036
    10775 1000
    10776 0000
```

```
          10777 1557
   109 11000          PAGE 1
     2                 .ENARL LSB
     3  11000 0000     MOVEZ,0
     4  11001 4777     JMS XYSPC
     5  11002 1600     TAD I MOVEZ
     6  11003 2200     ISZ MOVEZ
     7  11004 7650     SNA CLA
     8
     9  11005 1376     MOVEZA,TAD (-10)
    10  11006 1375     TAD (14)
    11  11007 3320     DCA XYXM
    12  11010 4407     FENT
    13  11011 5030     FGET FP.ZIP
    14  11012 6003     FPUT YDEST
    15  11013 6015     FPUT WYPOS
    16  11014 6014     FPUT WXPOS
    17  11015 0000     FEXT
    18  11016 4243     JMS BSTL
    19  11017 6203     CDI 00
    20  11020 4774     JMS CNTRIN
    21  11021 4407     FENT
    22  11022 5005     FGET FZPOS
    23  11023 2016     FSUB WZPOS
    24  11024 6001     FPUT ZDELT
    25  11025 4043     FDIV EPSILN
    26  11026 0000     FEXT
    27  11027 1020     TAD FXP
    28  11030 7750     SPA SNA CLA
    29  11031 5600     JMP I MOVEZ
    30  11032 1021     TAD WORD
    31  11033 7700     SMA CLA
    32  11034 5205     JMP MOVEZA
    33
    34  11035 4407     MOVEZB,FENT
    35  11036 5001     FGET ZDELT
    36  11037 0014     FNEG
    37  11040 6001     FPUT ZDELT
    38  11041 0000     FEXT
    39  11042 5206     JMP MOVEZA+1
    40
    41  11043 0000     BSTL,0
    42  11044 3142     DCA SCORE
    43  11045 4407     FENT
    44  11046 5001     FGET XDEST
    45  11047 2014     FSUB WXPOS
    46  11050 7256     FJMP BSTLA6
    47  11051 0003     GTZ ETZ
    48  11052 0014     FNEG
    49  11053 0000     FEXT
    50  11054 2142     ISZ SCORE
    51  11055 4407     FENT
    52
    53  11056 3037     BSTLA6,FMPY FP.SF
    54  11057 0012     FRND
    55  11060 0011     UNNOR
    56  11061 6175     FPUT DELX
    57  11062 5003     FGET YDEST
    58  11063 2015     FSUB WYPOS
    59  11064 7273     FJMP BSTLA7
    60  11065 0003     GTZ ETZ
    61  11066 0014     FNEG
    62  11067 0000     FEXT
    63  11070 2142     ISZ SCORE
    64  11071 2142     ISZ SCORE
    65  11072 4407     FENT
    66
    67  11073 3037     BSTLA7,FMPY FP.SF
    68  11074 0012     FRND
    69  11075 0011     UNNOR
    70  11076 6172     FPUT DELY
    71  11077 2175     FSUB DELX
    72  11100 7313     FJMP BSTLA1
```

```
73   11101 0005         LTZ FTZ
74   11102 5175         FGET DELX
75   11103 6167         FPUT MOD
76   11104 5172         FGET DELY
77   11105 6175         FPUT DELX
78   11106 5167         FGET MOD
79   11107 6172         FPUT DELY
80   11110 0000         FEXT
81   11111 1321         TAD XYXM+1
82   11112 5315         JMP 1S
83
84   11113 0000         BSTLA1,FEXT
85   11114 1320         TAD XYXM
86
87   11115 3143         1S,DCA MAJOR
88   11116 4773         JMS BSTLM
89   11117 5643         JMP I BSTL
90
91         0142         SCORE=142
92
93         0175         DELX=175
94         0172         DELY=172
95         0167         MOD=167
96
97   11120 0100         XYXM,100
98   11121 0020         20
99
100                     .DSABL LSB
101
     11173 1200
     11174 5125
     11175 0014
     11176 7770
     11177 0516
102  11200               PAGE 1    11200 0000         BSTLM,0
2    11201 4407         FENT
3    11202 5175         FGET DELX
4    11203 6167         FPUT MOD
5    11204 0014         FNEG
6    11205 6164         FPUT COUNT
7    11206 6175         FPUT DELX
8    11207 0000         FEXT
9    11210 1142         TAD SCORE
10   11211 1303         TAD XYCM
11   11212 3213         DCA .+1
12   11213 7402         HLT
13   11214 3144         DCA MINOR
14   11215 1144         TAD MINOR
15   11216 0377         AND (240)
16   11217 1143         TAD MAJOR
17
18   11220 3143         BSTLMD,DCA MAJOR
19   11221 1165         TAD COUNT+1
20   11222 7700         SMA CLA
21   11223 5600         JMP I BSTLM
22   11224 1170         TAD MOD+1
23   11225 7110         CLL RAR
24   11226 3170         DCA MOD+1
25   11227 1171         TAD MOD+2
26   11230 7010         RAR
27   11231 3171         DCA MOD+2
28   11232 4407         FENT
29   11233 5052         FGET SPEEDS
30   11234 0011         UNNOR
31   11235 0000         FEXT
32   11236 1022         TAD LORD
33   11237 7041         CIA
34   11240 3145         DCA SRSET
35   11241 7240         STA
36   11242 3162         DCA FLAT+1
37   11243 7240         STA
38   11244 3163         DCA FLAT+2
39   11245 7001         IAC
```

```
40   11246 3147         DCA RAMPI
41   11247 4407         FENT
42   11250 5050         FGET STRTSP
43   11251 2051         FSUB STOPSP
44   11252 3052         FMPY SPEEDS
45   11253 7276         FJMP BSTLMA
46   11254 0005         ETZ LTZ
47   11255 0011         UNNOR
48   11256 0014         FNEG
49   11257 6156         FPUT RAMPV
50   11260 1156         FADD RAMPV
51   11261 2164         FSUB COUNT
52   11262 7271         FJMP BSTLMB
53   11263 0002         GTZ
54   11264 5167         FGET MOD
55   11265 0014         FNEG
56   11266 6156         FPUT RAMPV
57   11267 0000         FEXT
58   11270 5776         JMP BSTLG
59
60   11271 0011         BSTLMB,UNNOR
61   11272 0014         FNEG
62   11273 6161         FPUT FLAT
63   11274 0000         FEXT
64   11275 5776         JMP BSTLG
65
66   11276 5164         BSTLMA,FGET COUNT
67   11277 6161         FPUT FLAT
68   11300 0000         FEXT
69   11301 5775         JMP BSTLGA
70
71   11302 5600         BSTLMR,JMP I BSTLM
72
73         0143         MAJOR=143
74         0144         MINOR=144
75         0164         COUNT=164
76         0145         SRSET=145
77         0161         FLAT=161
78         0156         RAMPV=156
79         0154         UPDOWN=154
80         0052         SPEEDS=STEPS
81         0147         RAMPI=147
82
83   11303 1304         XYCM,TAD .+1
84   11304 0120         120
85   11305 0320         320
86   11306 0160         160
87   11307 0360         360
88
     11375 1407
     11376 1400
     11377 0240
89   11400              PAGE 1    11400 1145         BSTLG,TAD SRSET
2    11401 3150         DCA SPNOW
3    11402 1157         TAD RAMPV+1
4    11403 3154         DCA UPDOWN
5    11404 1160         TAD RAMPV+2
6    11405 3155         DCA UPDOWN+1
7    11406 4241         JMS BSTGO
8
9    11407 1162         BSTLGA,TAD FLAT+1
10   11410 3154         DCA UPDOWN
11   11411 1163         TAD FLAT+2
12   11412 3155         DCA UPDOWN+1
13   11413 3147         DCA RAMPI
14   11414 4241         JMS BSTGO
15   11415 1157         TAD RAMPV+1
16   11416 3154         DCA UPDOWN
17   11417 1160         TAD RAMPV+2
18   11420 3155         DCA UPDOWN+1
19   11421 7240         STA
20   11422 3147         DCA RAMPI
21   11423 4241         JMS BSTGO
22
```

```
23  11424 3777   RSTGON,DCA I (INTVAL)
24  11425 1776   TAD I (STPLOC)
25  11426 3240   DCA 1S
26  11427 6211   CDF 10
27  11430 4407   FENT
28  11431 5775   FGET F.LITE
29  11432 6043   FPUT EPSILN
30  11433 0000   FEXT
31  11434 6203   CDI 00
32  11435 4774   JMS FUTCH
33  11436 6203   CDI 00
34  11437 5640   JMP I 1S
35
36  11440 7402   1S,HLT
37
38  11441 0000   RSTGO,0
39  11442 7346   CLL STA RTL
40  11443 6201   CDF 00
41  11444 1777   TAD I (INTVAL)
42  11445 7650   SNA CLA
43  11446 5224   JMP RSTGON
44  11447 6211   CDF 10
45  11450 7300   CLA CLL
46  11451 1171   TAD MOD+2
47  11452 1174   TAD DELY+2
48  11453 3171   DCA MOD+2
49  11454 7004   RAL
50  11455 1170   TAD MOD+1
51  11456 1173   TAD DELY+1
52  11457 3170   DCA MOD+1
53  11460 7300   CLA CLL
54  11461 1177   TAD DELX+2
55  11462 1171   TAD MOD+2
56  11463 3167   DCA MOD
57  11464 7004   RAL
58  11465 1170   TAD MOD+1
59  11466 1176   TAD DELX+1
60  11467 7510   SPA
61  11470 5300   JMP RSTG08
62  11471 3170   DCA MOD+1
63  11472 1167   TAD MOD
64  11473 3171   DCA MOD+2
65  11474 7240   STA
66  11475 3360   DCA MINI
67  11476 1144   TAD MINOR
68  11477 5306   JMP RSTG09
69
70  11500 7200   BSTG08,CLA
71  11501 3360   DCA MINI
72  11502 3360   DCA MINI
73  11503 3360   DCA MINI
74  11504 3360   DCA MINI
75  11505 1143   TAD MAJOR
76
77  11506 6600   BSTG09,6600
78  11507 7300   CLA CLL
79  11510 2166   ISZ COUNT+2
80  11511 5315   JMP 1S
81  11512 2165   ISZ COUNT+1
82  11513 7410   SKP
83  11514 5773   JMP RSTLMR
84
85  11515 1166   1S,TAD COUNT+2
86  11516 1357   TAD ENDXC
87  11517 7204   CLA RAL
88  11520 1165   TAD COUNT+1
89  11521 7700   SMA CLA
90  11522 5773   JMP RSTLMR
91  11523 1002   TAD RAMPS
92  11524 3151   DCA RAMPT
93
94  11525 7344   4S,STA CLL RAL
95  11526 1360   TAD MINI
96  11527 3152   DCA RAMPQ
97  11530 2152   ISZ RAMPQ
98  11531 5330   JMP .-1
```

```
99   11532 2151         ISZ RAMPT
100  11533 5325         JMP 4S
101  11534 7000         NOP
102  11535 2150         ISZ SPNOW
103  11536 5352         JMP 2S
104  11537 1145         TAD SRSET
105  11540 3150         DCA SPNOW
106  11541 1147         TAD RAMPI
107  11542 1002         TAD RAMPS
108  11543 3002         DCA RAMPS
109
110  11544 2155         3S,ISZ UPDOWN+1
111  11545 5242         JMP BSTGO+1
112  11546 7000         NOP
113  11547 2154         ISZ UPDOWN
114  11550 5242         JMP BSTGO+1
115  11551 5641         JMP I BSTGO
116
117  11552 3360         2S,DCA MINI
118  11553 3360         DCA MINI
119  11554 3360         DCA MINI
120  11555 3360         DCA MINI
121  11556 5344         JMP 3S
122
123  11557 0000         ENDXC,0
124  11560 0000         MINI,0
125
126        0150         SPNOW=150
127        0151         RAMPT=151
128        0152         RAMPQ=152
129
     11573 1302
     11574 6274
     11575 0740
     11576 0124
     11577 0123
130  11600                PAGE
1          0075         TPY0=FT.15
2          0074         TPY1=FT.14
3          0073         TPY2=FT.13
4          0072         TPY3=FT.12
5
6          0001         FXPOS=XDFST
7          0003         FYPOS=YDFST
8
9    11600 0000         CNTRF,0
10   11601 4407         FENT
11   11602 5001         FGET FXPOS
12   11603 2046         FSUB XPOSA
13   11604 6075         FPUT TPY0
14   11605 4322         FDIV CIRTWO
15   11606 1046         FADD XPOSA
16   11607 6056         FPUT CIRXM
17   11610 2046         FSUB XPOSA
18   11611 0001         FSQ
19   11612 6061         FPUT CIRMC
20   11613 5003         FGET FYPOS
21   11614 2047         FSUB YPOSA
22   11615 6074         FPUT TPY1
23   11616 4322         FDIV CIRTWO
24   11617 1047         FADD YPOSA
25   11620 6057         FPUT CIRYM
26   11621 2047         FSUB YPOSA
27   11622 0001         FSQ
28   11623 1061         FADD CIRMC
29   11624 6061         FPUT CIRMC
30   11625 5022         FGET F.RAD
31   11626 0001         FSQ
32   11627 2061         FSUB CIRMC
33   11630 0002         FSQRT
34   11631 6061         FPUT CIRMC
35   11632 3075         FMPY TPY0
36   11633 6073         FPUT TPY2
37   11634 5074         FGET TPY1
38   11635 3061         FMPY CIRMC
39   11636 6072         FPUT TPY3
```

```
40   11637 5074   FGET TPY1
41   11640 0001   FSQ
42   11641 6060   FPUT CIRAB
43   11642 5075   FGET TPY0
44   11643 0001   FSQ
45   11644 1060   FADD CIRAB
46   11645 0002   FSQRT
47   11646 6060   FPUT CIRAB
48   11647 2022   FSUB F.RAD
49   11650 2022   FSUB F.RAD
50   11651 7317   FJMP CIRROR
51   11652 0002   GTZ
52   11653 0000   FEXT
53   11654 6201   CDF 00
54   11655 1777   TAD I (F.CENT)
55   11656 6211   CDF 10
56   11657 7640   SZA CLA
57   11660 5267   JMP 1$
58   11661 4407   FENT
59   11662 5072   FGET TPY3
60   11663 0014   FNEG
61   11664 6072   FPUT TPY3
62   11665 0000   FEXT
63   11666 5274   JMP 2$
64
65   11667 4407   1$,FENT
66   11670 5073   FGET TPY2
67   11671 0014   FNEG
68   11672 6073   FPUT TPY2
69   11673 0000   FEXT
70
71   11674 4407   2$,FENT
72   11675 5073   FGET TPY2
73   11676 4060   FDIV CIRAB
74   11677 1057   FADD CIRYM
75   11700 0012   FRND
76   11701 0011   UNNOR
77   11702 0017   FNOR
78   11703 6045   FPUT YCNTR
79   11704 5072   FGET TPY3
80   11705 4060   FDIV CIRAB
81   11706 1056   FADD CIRXM
82   11707 0012   FRND
83   11710 0011   UNNOR
84   11711 0017   FNOR
85   11712 6100   FPUT XCNTR
86
87   11713 0000   CYCIRX,FEXT
88   11714 2200   ISZ CNTRF
89   11715 6203   CDI 00
90   11716 5600   JMP I CNTRF
91
92   11717 0000   CIRROR,FEXT
93   11720 6203   CDI 00
94   11721 5600   JMP I CNTRF
95
96   11722 0002   CIPTWD,2;2000;0
     11723 2000
     11724 0000
     11777 0036
97   12000         PAGE 1           0000   NOMET=0
2           0001   MFTOK=1
3           0001   SIGNED=1
4           0000   NOSIGN=0
5           0000   NOSPEC=0
6
7    12000 0000   VCTST,F.SPD;FP.TEN;NOMET;FP.SM;NOSPEC;NOSIGN;1714
     12001 0032
     12002 0000
     12003 0036
     12004 0000
     12005 0000
     12006 0017
     12007 0004
```

```
 8   12010 0001   F.X;FP.XM;METOK;FP.MM;R.ADX;SIGNED;36;6
     12011 0035
     12012 0001
     12013 0040
     12014 0041
     12015 0001
     12016 0036
     12017 0006
 9   12020 0002   D.X;FP.XM;METOK;FP.MM;NOSPEC;SIGNED;36;6
     12021 0035
     12022 0001
     12023 0040
     12024 0000
     12025 0001
     12026 0036
     12027 0006
10   12030 0003   F.Y;FP.XM;METOK;FP.MM;R.ADY;SIGNED;45;6
     12031 0035
     12032 0001
     12033 0040
     12034 0042
     12035 0001
     12036 0045
     12037 0006
11   12040 0004   D.Y;FP.XM;METOK;FP.MM;NOSPEC;SIGNED;45;6
     12041 0035
     12042 0001
     12043 0040
     12044 0000
     12045 0001
     12046 0045
     12047 0006
12   12050 0005   F.Z;FP.XM;METOK;FP.MM;R.ADZ;SIGNED;54;6
     12051 0035
     12052 0001
     12053 0040
     12054 0043
     12055 0001
     12056 0054
     12057 0006
13   12060 0006   D.Z;FP.MM;METOK;FP.MM;NOSPEC;SIGNED;54;6
     12061 0040
     12062 0001
     12063 0040
     12064 0000
     12065 0001
     12066 0054
     12067 0006
14   12070 0007   F.THET;FP.C;NOMET;FP.MM;R.ADTH;SIGNED;63;6
     12071 0033
     12072 0000
     12073 0040
     12074 0044
     12075 0001
     12076 0063
     12077 0006
15   12100 0010   D.THET;FP.C;NOMET;FP.MM;NOSPEC;SIGNED;63;6
     12101 0033
     12102 0000
     12103 0040
     12104 0000
     12105 0001
     12106 0063
     12107 0006
16   12110 0011   F.SSP;FP.ONE;NOMET;FP.LC;NOSPEC;NOSIGN;23;2
     12111 0031
     12112 0000
     12113 0041
     12114 0000
     12115 0000
     12116 0023
     12117 0002
17   12120 0012   F.THIS;FP.ONE;NOMET;FP.LC;NOSPEC;NOSIGN;13;2
     12121 0031
     12122 0000
     12123 0041
```

```
      12124 0000
      12125 0000
      12126 0013
      12127 0002
18    12130 0013  F.NEXT;FP.ONE;NOMET;FP.LC;NOSPEC;NOSIGN;1512
      12131 0031
      12132 0000
      12133 0041
      12134 0000
      12135 0000
      12136 0015
      12137 0002
19    12140 0014  C.X;FP.ONE;NOMET;FP.MM;NOSPEC;SIGNED;6500;6
      12141 0031
      12142 0000
      12143 0040
      12144 0000
      12145 0001
      12146 6500
      12147 0006
20    12150 0015  C.Y;FP.ONE;NOMET;FP.MM;NOSPEC;SIGNED;6510;6
      12151 0031
      12152 0000
      12153 0040
      12154 0000
      12155 0001
      12156 6510
      12157 0006
21    12160 0016  C.Z;FP.ONE;NOMET;FP.MM;NOSPEC;SIGNED;6520;6
      12161 0031
      12162 0000
      12163 0040
      12164 0000
      12165 0001
      12166 6520
      12167 0006
22    12170 0017  C.THET;FP.ONE;NOMET;FP.MM;NOSPEC;SIGNED;6530;6
      12171 0031
      12172 0000
      12173 0040
      12174 0000
      12175 0001
      12176 6530
      12177 0006
23    12200 0020  W.SEQ;FP.ONE;NOMET;NRECS;NOSPEC;NOSIGN;32;4
      12201 0031
      12202 0000
      12203 0055
      12204 0000
      12205 0000
      12206 0032
      12207 0004
24    12210 0021  F.PECK;FP.ONE;NOMET;FP.LC;NOSPEC;NOSIGN;25;2
      12211 0031
      12212 0000
      12213 0041
      12214 0000
      12215 0000
      12216 0025
      12217 0002
25    12220 0022  F.RAD;FP.XM;METOK;FP.MM;NOSPEC;NOSIGN;0;6
      12221 0035
      12222 0001
      12223 0040
      12224 0000
      12225 0000
      12226 0000
      12227 0006
26    12230 0023  F.OFFS;FP.XM;NOMET;FP.CM;NOSPEC;NOSIGN;6;5
      12231 0035
      12232 0000
      12233 0042
      12234 0000
      12235 0000
      12236 0006
      12237 0005
```

```
27   12240  0024   F.N;FP.ONE;NOMET;FP.M;NOSPEC;NOSIGN;2713
     12241  0031
     12242  0000
     12243  0034
     12244  0000
     12245  0000
     12246  0027
     12247  0003
28   12250  0025   E.NUM;FP.ONE;NOMET;FP.C;NOSPEC;NOSIGN;3214
     12251  0031
     12252  0000
     12253  0033
     12254  0000
     12255  0000
     12256  0032
     12257  0004
29
30                S
```

SYMBOL TABLE

| | | | | | | | | | |
|---|---|---|---|---|---|---|---|---|---|
| ACCUM | 00477 | ARROW | 01321 | AUXDUN | 06073 | AUXFDO | 06000 | AUX.TH | 00045 |
| AUX.X | 00050 | AUX.Y | 00047 | AUX.Z | 00046 | BITPAK | 02061 | BITSEP | 02037 |
| BKPNT | 00400 | BPVEC | 00531 | BSTGO | 01441 | BSTGON | 01424 | BSTGOB | 01500 |
| BSTGO9 | 01506 | BSTL | 01043 | BSTLA1 | 01113 | BSTLA6 | 01056 | BSTLA7 | 01073 |
| BSTLG | 01400 | BSTLGA | 01407 | BSTLM | 01220 | BSTLMA | 01276 | BSTLMB | 01271 |
| BSTLMD | 01220 | BSTLMR | 01302 | B.ADTH | 00044 | B.ADX | 00041 | B.ADY | 00042 |
| B.ADZ | 00043 | B.AUX1 | 02276 | B.AUX2 | 02277 | B.AUX3 | 02300 | B.AUX4 | 02301 |
| B.CIS | 02275 | B.SSP | 02272 | B.TH | 02273 | B.TS | 02271 | B.Z | 02274 |
| CHANGE | 01000 | CIRAR = | 00060 | CIRCLE | 00001 | CIRCU | 00400 | CIRMC = | 00061 |
| CIRROR | 01717 | CIRTWO | 01722 | CIRXM = | 00056 | CIRYM = | 00057 | CNTRF | 01600 |
| CNTRIN | 05125 | COUNT = | 00164 | CSUM | 02740 | CYCIRX | 01713 | CYZU | 00400 |
| C.THET= | 00017 | C.X = | 00014 | C.Y = | 00015 | C.Z = | 00016 | D = | 00040 |
| DEC | 01645 | DELETE | 02104 | DELTAZ= | 00073 | DELX = | 00175 | DELY = | 00172 |
| DFLOAT | 02021 | DISALL | 04247 | DISENV | 04337 | DISPFC | 04264 | DISPFD | 04273 |
| DISPFF | 04200 | DO.A | 06467 | DO.CIR | 06217 | DO.EOF | 06210 | DO.IT | 06142 |
| DO.SSP | 06204 | DO.TC | 06206 | DO.XY | 06212 | DO.Z | 06422 | DO.ZF | 06434 |
| DSPEND | 02270 | DSPTCH | 02243 | DTH = | 00065 | DUNFL | 02132 | DX = | 00062 |
| DY = | 00063 | DZ = | 00064 | D.THET= | 00010 | D.X = | 00002 | D.Y = | 00004 |
| D.Z = | 00006 | ENDXC | 01557 | ENVTAB | 02155 | FPSILN= | 00005 | ERRPT | 03200 |
| ETZ = | 00001 | EVALRT | 05133 | EVALT | 02400 | EXP | 00020 | E.NUM = | 00025 |
| FARS = | 00006 | FCOS = | 00004 | FETCH | 00600 | FETS | 01523 | FEXT = | 00000 |
| FFETCH | 01724 | FFN | 00745 | FFOUND | 00073 | FILES | 00100 | FIND | 01674 |
| FINDL | 05060 | FIVE | 00746 | FLAT = | 00161 | FNEXT | 04326 | FNOR = | 00017 |
| FOFFX | 00732 | FOUNDF | 00072 | FPENT | 05042 | FP.C = | 00033 | FP.CM = | 00042 |
| FP.LC = | 00041 | FP.M = | 00034 | FP.MM = | 00040 | FP.ONE= | 00031 | FP.SF = | 00037 |
| FP.SM = | 00036 | FP.TEN= | 00032 | FP.XM = | 00035 | FP.ZIP= | 00030 | FRAD = | 00022 |
| FREC | 00075 | FSIN = | 00003 | FSRCHA | 04400 | FSTRT | 03266 | FT.M = | 00056 |
| FT.1 = | 00057 | FT.10 = | 00070 | FT.11 = | 00071 | FT.12 = | 00072 | FT.13 = | 00073 |
| FT.14 = | 00074 | FT.15 = | 00075 | FT.16 = | 00076 | FT.17 = | 00077 | FT.2 = | 00060 |
| FT.3 = | 00061 | FT.4 = | 00062 | FT.5 = | 00063 | FT.6 = | 00064 | FT.7 = | 00065 |
| FT.8 = | 00066 | FT.9 = | 00067 | PULL | 05005 | PUTCH | 06274 | FUTSCH | 00005 |
| FXPOS = | 00001 | FYPOS = | 00003 | FZPK = | 00021 | FZPOS = | 00005 | F.AUTO | 00034 |
| F.AUX | 00025 | F.AXIS | 00026 | F.BIGE | 00735 | F.CCW | 00035 | F.CENT | 00036 |
| F.DEL | 00027 | F.EOF | 00040 | F.EOP | 00030 | F.HOLD | 00031 | F.LITE | 00740 |
| F.N = | 00024 | F.NEXT = | 00013 | F.NUM | 00023 | F.OFF | 00032 | F.OFFS= | 00023 |
| F.PECK= | 00021 | F.RAD = | 00022 | F.SENS | 00033 | F.SPD = | 00000 | F.SSP = | 00011 |
| F.STRT | 00037 | F.THET= | 00007 | F.THIS= | 00012 | F.THPI= | 00026 | F.TYPE | 00024 |
| F.X = | 00001 | F.Y = | 00003 | F.Z = | 00005 | F200 | 00743 | GET | 01303 |
| HORD | 00021 | INC | 01621 | INCON | 03600 | INSERT | 01022 | INSRT | 01200 |
| INSRU = | 01264 | INTVAL | 00123 | IPROC | 04403 | ISAVE | 00263 | LINK | 00500 |
| LORD | 00022 | LPUN | 02664 | LTSOFF | 02302 | LTSON | 02314 | LTZ = | 00004 |
| MAJOR = | 00143 | MAXRS = | 00013 | METCON | 03757 | METOK = | 00001 | MINI | 01560 |
| MINOR = | 00144 | MIRROR | 06400 | MOD = | 00167 | MOVE | 02442 | MOVEZ | 01000 |
| MOVEZA | 01005 | MOVEZB | 01035 | MXYU | 00241 | M.TH | 00051 | M.X | 00054 |
| M.Y | 00053 | M.Z | 00052 | NEXTF | 00071 | NOMET = | 00000 | NOSIGN= | 00000 |
| NOSPEC= | 00000 | NRECS = | 00055 | N.S = | 00077 | POTWU | 03400 | PLANES | 05034 |

| | | | | | | | | | |
|---|---|---|---|---|---|---|---|---|---|
| PMODE | 04454 | PNCH | 02705 | PPR | 02674 | PT = | 06303 | PTA | 00076 |
| PTAG | 01470 | PTAP | 01456 | PTROT | 00102 | PUNCH | 02600 | PUT | 01600 |
| PWUP | 00317 | PWUQ | 00501 | P1 | 00104 | P2 | 00106 | Q.CYCL | 05652 |
| Q.PNCH | 06200 | Q.PDR | 06202 | Q.SSA | 05627 | Q.SSEL | 05624 | RAMPI = | 00147 |
| RAMPQ = | 00152 | RAMPS | 00002 | RAMPT = | 00151 | RAMPV = | 00156 | RBUFF | 00110 |
| RCHAR | 03124 | RCREAT | 06074 | READ | 03000 | RECI | 00074 | REPCNT= | 00176 |
| RETRO | 00126 | RPMODE | 04455 | RSEQU | 05540 | RSEQUS | 05536 | RSIZE | 01347 |
| RUNN | 05605 | RUNNER | 04323 | RUNRET | 05602 | R.LOOK | 05000 | R.MEMC | 00240 |
| R.MEME | 05027 | R.RLN | 05247 | R.RTPA | 05301 | R.RTPP | 05271 | R.RTPS | 05272 |
| R.SCOR | 05010 | R.SENT | 04623 | R.SEQS | 04600 | R.SINA | 05200 | R.SINS | 05200 |
| R.SNUS | 05022 | R.SSA | 04606 | R.SSB | 04604 | R.SSS | 04603 | SCORE = | 00142 |
| SFLOAT | 02000 | SIGNED= | 00001 | SPACE | 01547 | SPARE = | 00027 | SPEEDS= | 00052 |
| SPNOW = | 00150 | SP.MAX= | 00044 | SQEEZE | 01400 | SRSET = | 00145 | START | 00200 |
| STEPS = | 00052 | STOPS | 02733 | STOPSP= | 00051 | STOPX | 02724 | STPLOC | 00124 |
| STRTSP= | 00050 | SUNFL | 02114 | SUNIV | 04640 | TARTYP= | 00177 | THDFL = | 00001 |
| THETU | 00274 | TPYQ = | 00075 | TPY1 = | 00074 | TPY2 = | 00073 | TPY3 = | 00072 |
| TPY7 | 00751 | T.JTAB= | 05737 | T.0 | 00160 | T.1 | 00161 | T.10 | 00170 |
| T.11 | 00171 | T.12 | 00172 | T.13 | 00173 | T.14 | 00174 | T.15 | 00175 |
| T.16 | 00176 | T.17 | 00177 | T.2 | 00162 | T.3 | 00163 | T.4 | 00164 |
| T.5 | 00165 | T.6 | 00166 | T.7 | 00167 | UHPV | 00337 | UPDOWN= | 00154 |
| URSQU | 00223 | VALPAC | 01026 | VCTEF | 03244 | VCTST | 02000 | VMASK | 00125 |
| VSFT | 02467 | WAITK | 02741 | WAXIS | 05041 | WFT.0 = | 00053 | WFT.1 = | 00054 |
| WOFFX | 01146 | WORLD | 02200 | WXPOS = | 00014 | WYPOS = | 00015 | WZPOS = | 00016 |
| W.AUTO | 00066 | W.AUX | 00057 | W.AXIS | 00060 | W.CCW | 00067 | W.CENT | 00070 |
| W.DEL | 00061 | W.EOP | 00062 | W.HOLD | 00063 | W.NUM | 00055 | W.OFF | 00064 |
| W.SENS | 00065 | W.SEQ = | 00020 | W.TYPE | 00056 | XCNTR = | 00010 | XDEST = | 00001 |
| XOFFS | 06512 | XPOSA = | 00046 | XROOM | 01502 | XR0 | 00010 | XR1 | 00011 |
| XR2 = | 00012 | XR3 = | 00013 | XR4 = | 00014 | XR5 = | 00015 | XR6 = | 00016 |
| XR7 = | 00017 | XRA = | 00017 | XYCM | 01303 | XYSPC | 00516 | XYYM | 01120 |
| YCNTR = | 00045 | YDEST = | 00003 | YPOSA = | 00047 | ZCMMD | 00726 | ZDELT = | 00001 |
| ZDETL = | 00070 | ZERROR | 05600 | ZINC = | 00071 | ZINK = | 00072 | ZLIMIT | 05551 |
| ZMB | 00713 | ZMC | 00636 | ZMD | 00731 | ZME | 00715 | ZMF | 00614 |
| ZMFA | 00616 | ZNUDGE | 00200 | Z.N0 | 02153 | Z.N1 | 02154 | | |

ERRORS DETECTED: 0
FREE CORE: 1896. WORDS
!,!<HAMPZ.HAMSYS

```
  1                      .TITLE HAMILL CO. RANC-4 16-JAN-76
  2                      /PROGRAMMED BY J. C. KILRANE
  3
  4             0000     FIELD 0
  5
  6                      .DSABL PNC
  7
  8             0007     *7
  9
 10   00007 0000         0
 11
 12             0020     *20
 13
 14   00020 0000         EXP,0
 15   00021 0000         HORD,0
 16   00022 0000         LORD,0
 17
 18   00023 0000         F.NUM,0
 19   00024 0000         F.TYPE,0
 20   00025 0000         F.AUX,0
 21   00026 0000         F.AXIS,0
 22   00027 0000         F.DEL,0
 23   00030 0000         F.EOP,0
 24   00031 0000         F.HOLD,0
 25   00032 0000         F.OFF,0
 26   00033 0000         F.SENS,0
 27   00034 0000         F.AUTO,0
 28   00035 0000         F.CCW,0
 29   00036 0000         F.CENT,0
 30   00037 0000         F.STRT,0
 31   00040 0000         F.EOF,0
 32   00041 0000         B.ADX,0
 33   00042 0000         B.ADY,0
 34   00043 0000         B.ADZ,0
 35   00044 0000         B.ADTH,0
 36   00045 0000         AUX.TH,0
 37   00046 0000         AUX.Z,0
 38   00047 0000         AUX.Y,0
 39   00050 0000         AUX.X,0
 40   00051 0000         M.TH,0
 41   00052 0000         M.Z,0
 42   00053 0000         M.Y,0
 43   00054 0000         M.X,0
 44   00055 0000         W.NUM,0
 45   00056 0000         W.TYPE,0
 46   00057 0000         W.AUX,0
 47   00060 0000         W.AXIS,0
 48   00061 0000         W.DEL,0
 49   00062 0000         W.EOP,0
 50   00063 0000         W.HOLD,0
 51   00064 0000         W.OFF,0
 52   00065 0000         W.SENS,0
 53   00066 0000         W.AUTO,0
 54   00067 0000         W.CCW,0
 55   00070 0000         W.CENT,0
 56   00071 0000         NEXTF,0
 57   00072 0000         FOUNDF,0
 58   00073 0000         FFOUND,0
 59   00074 0000         RECI,0
 60   00075 0000         FREC,0
 61   00076 0000         PTA,0
 62   00077 0000         0
 63   00100 0000         FILES,0
 64   00101 0000         0
 65   00102 0000         PTROT,0
 66   00103 0000         0
 67   00104 0000         P1,0
 68   00105 0000         0
 69   00106 0000         P2,0
 70   00107 0000         0
 71
 72             0013     MAXRS=11.
 73
 74   00110              RBUFF,.BLKW MAXRS
 75
 76   00123 0000         INTVAL,0
```

```
 77  00124 0000    STPLOC,0
 78  00125 0000    VMASK,0
 79  00126 0000    RETRO,0
 80
 81        0160    *160
 82
 83  00160 0000    T.0,0
 84  00161 0000    T.1,0
 85  00162 0000    T.2,0
 86  00163 0000    T.3,0
 87  00164 0004    T.4,4
 88  00165 0005    T.5,5
 89  00166 0006    T.6,6
 90  00167 0007    T.7,7
 91  00170 0000    T.10,0
 92  00171 0000    T.11,0
 93  00172 0000    T.12,0
 94  00173 0000    T.13,0
 95  00174 0000    T.14,0
 96  00175 0000    T.15,0
 97  00176 0000    T.16,0
 98  00177 0000    T.17,0
 99
100        0001    FIELD 1
101
102        0000    *0
103
104  10000 7402    HLT
105  10001 0000    CIRCLE,0
106  10002 0000    RAMPS,0
107  10003 0000    FUTSCH,0
108

1        0000    F.SPD=0
  2        0001    F.X=1
  3        0002    D.X=2
  4        0003    F.Y=3
  5        0004    D.Y=4
  6        0005    F.Z=5
  7        0006    D.Z=6
  8        0007    F.THET=7
  9        0010    D.THET=10
 10        0011    F.SSP=11
 11        0012    F.THIS=12
 12        0013    F.NEXT=13
 13        0014    C.X=14
 14        0015    C.Y=15
 15        0016    C.Z=16
 16        0017    C.THET=17
 17        0020    W.SEQ=20
 18        0021    F.PECK=21
 19        0022    F.RAD=22
 20        0023    F.OFFS=23
 21        0024    F.N=24
 22        0025    E.NUM=25
 23        0026    F.THPI=26
 24        0027    SPARE=27
 25
 26        0030    FP.ZIP=30
 27        0031    FP.ONE=31
 28        0032    FP.TEN=32
 29        0033    FP.C=33
 30        0034    FP.M=34
 31        0035    FP.XM=35
 32        0036    FP.SM=36
 33        0037    FP.SF=37
 34        0040    FP.MM=40
 35        0041    FP.LC=41
 36        0042    FP.CM=42
 37        0043    EPSILN=43
 38        0044    SP.MAX=44
 39        0045    YCNTR=45
 40        0046    XPOSA=46
 41        0047    YPOSA=47
 42        0050    STRTSP=50
```

```
 43      0051   STOPSP=51
 44      0052   STEPS=52
 45      0053   WFT.0=53
 46      0054   WFT.1=54
 47      0055   NRECS=55
 48      0056   FT.0=56
 49      0057   FT.1=57
 50      0060   FT.2=60
 51      0061   FT.3=61
 52      0062   FT.4=62
 53      0063   FT.5=63
 54      0064   FT.6=64
 55      0065   FT.7=65
 56      0066   FT.8=66
 57      0067   FT.9=67
 58      0070   FT.10=70
 59      0071   FT.11=71
 60      0072   FT.12=72
 61      0073   FT.13=73
 62      0074   FT.14=74
 63      0075   FT.15=75
 64      0076   FT.16=76
 65      0077   FT.17=77
 66      0100   XCNTP=100
 67
 68      0016   WZPOS=C.Z
 69      0005   FZPOS=F.Z
 70      0021   FZPK=F.PECK
 71      0073   DELTAZ=FT.13
 72      0072   ZINK=FT.12
 73      0071   ZINC=FT.11
 74      0001   ZDELT=F.X
 75      0001   XDFST=F.X
 76      0070   ZDETL=FT.10
 77      0003   YDFST=F.Y
 78      0015   WYPOS=C.Y
 79      0014   WXPOS=C.X
 80      0056   CIRXM=FT.0
 81      0057   CIRYM=FT.1
 82      0060   CIRAB=FT.2
 83      0061   CIRMC=FT.3
 84      0022   FRAD=F.RAD
 85      0001   THDEL=F.X
 86
 87      0010   XR0=10
 88      0011   XR1=11
 89      0012   XR2=12
 90      0013   XR3=13
 91      0014   XR4=14
 92      0015   XR5=15
 93      0016   XR6=16
 94      0017   XR7=17
 95      0017   XRA=17
 96
 97      0000   FEXT=0
 98      0003   FSIN=3
 99      0004   FCOS=4
100      0001   ETZ=1
101      0004   LTZ=4
102      0017   FNOR=17
103      0006   FABS=6
104
105             .ENABL PNC
```

```
  1                   .TITLE HAMILL CO. BANC-4 16-JAN-76
  2                   /PROGRAMMED BY J. C. KILBANE
  3
  4          0001    FIELD 1
  5
  6                  .DSABL PNC
  7
  8          0130    *130
  9
 10   10130 0000     SPEED,0
 11   10131 0000     DRCTN,0
 12   10132 0000     SCORE,0
 13   10133 0027     27
 14   10134 0000     DX,0;0
      10135 0000
 15   10136 0027     27
 16   10137 0000     DY,0;0
      10140 0000
 17   10141          MOD,
 18   10141 0000     XT,0;0
      10142 0000
 19   10143 0000     COUNT,0;0
      10144 0000
 20   10145 0000     SHF,0
 21   10146 0000     SHN,0
 22   10147 0000     XS,0
 23   10150 0000     YS,0
 24   10151 0000     XSL,0
 25   10152 0000     YSL,0
 26   10153 0000     FY,0;0
      10154 0000
 27   10155 0000     FX,0;0
      10156 0000
 28   10157 0000     XL,0;0;0
      10160 0000
      10161 0000
 29   10162 0000     YL,0;0;0
      10163 0000
      10164 0000
 30   10165 0000     SPX,0;0;0
      10166 0000
      10167 0000
 31   10170 0000     SRY,0;0;0
      10171 0000
      10172 0000
 32   10173 0000     SWITCH,0
 33   10174 0000     MAJOR,0
 34   10175 0000     MINOR,0
 35   10176 0000     XCARRY,0
 36   10177 0000     YCARRY,0
 37
 38                  .ENABL PNC 1
  2          0014    XPOS=C.X
  3          0015    YPOS=C.Y
  4          0022    RADIUS=FRAD
  5
  6          2400    *2400
  7
  8   12400 0000     A,0/CIRCULAR INTERPOLATION
  9   12401 6201     CDF 00
 10   12402 1777     TAD I (F.CCW)
 11   12403 6211     CDF 10
 12   12404 3131     DCA DRCTN
 13   12405 4407     FENT
 14   12406 5014     FGET XPOS
 15   12407 2100     FSUB XCNTR
 16   12410 0011     UNNOR
 17   12411 6156     FPUT XL-1
 18   12412 5015     FGET YPOS
 19   12413 2045     FSUB YCNTR
 20   12414 0011     UNNOR
 21   12415 6161     FPUT YL-1
 22   12416 5001     FGET XDEST
```

```
23   12417  2100   FSUB XCNTR
24   12420  0011   UNNOR
25   12421  0014   FNEG
26   12422  6154   FPUT FX-1
27   12423  5003   FGET YDEST
28   12424  2045   FSUB YCNTR
29   12425  0011   UNNOR
30   12426  0014   FNEG
31   12427  6152   FPUT FY-1
32   12430  5022   FGET RADIUS
33   12431  0000   FEXT
34   12432  3164   DCA YL+2
35   12433  3161   DCA XL+2
36   12434  3173   DCA SWITCH
37   12435  1367   TAD N9
38   12436  1020   TAD EXP
39   12437  7550   SPA SNA
40   12440  5246   JMP AA
41   12441  1370   TAD P6
42   12442  7110   CLL RAR
43   12443  7430   SZL
44   12444  7001   IAC
45   12445  7410   SKP
46
47   12446  7325   AA,CLA STL RAL IAC
48   12447  3145   DCA SHF
49
50   12450  1145   AB,TAD SHF
51   12451  7001   IAC
52   12452  3146   DCA SHN
53
54   12453  1376   AC,TAD (68.+41.)
55   12454  1002   TAD RAMPS
56   12455  7510   SPA
57   12456  7410   SKP
58   12457  7200   CLA
59   12460  1375   TAD (-41.)
60   12461  3130   DCA SPEED
61   12462  1157   TAD XL
62   12463  3165   DCA SRX
63   12464  1160   TAD XL+1
64   12465  3166   DCA SRX+1
65   12466  1161   TAD XL+2
66   12467  3167   DCA SRX+2
67   12470  1162   TAD YL
68   12471  3170   DCA SRY
69   12472  1163   TAD YL+1
70   12473  3171   DCA SRY+1
71   12474  1164   TAD YL+2
72   12475  3172   DCA SRY+2
73   12476  1131   TAD DRCTN
74   12477  7640   SZA CLA
75   12500  5303   JMP AD
76   12501  4761   JMS I COMPX
77   12502  7410   SKP
78
79   12503  4762   AD,JMS I COMPY
80   12504  1145   TAD SHF
81   12505  4763   JMS I SHFTX
82   12506  1165   TAD SRX
83   12507  3141   DCA XT
84   12510  1166   TAD SRX+1
85   12511  3142   DCA XT+1
86   12512  1167   TAD SRX+2
87   12513  3143   DCA XT+2
88   12514  1146   TAD SHN
89   12515  4763   JMS I SHFTX
90   12516  1131   TAD DRCTN
91   12517  7640   SZA CLA
92   12520  4761   JMS I COMPX
93   12521  1145   TAD SHF
94   12522  4764   JMS I SHFTY
95   12523  7100   CLL
96   12524  1172   TAD SRY+2
97   12525  1167   TAD SRX+2
98   12526  3167   DCA SRX+2
```

```
99   12527 7004   RAL
100  12530 1171   TAD SRY+1
101  12531 1166   TAD SRX+1
102  12532 3166   DCA SPX+1
103  12533 7004   RAL
104  12534 1170   TAD SRY
105  12535 1165   TAD SRX
106  12536 3165   DCA SRX
107  12537 1146   TAD SHN
108  12540 4764   JMS I SHFTY
109  12541 1131   TAD DRCTN
110  12542 7650   SNA CLA
111  12543 4762   JMS I COMPY
112  12544 7100   CLL
113  12545 1172   TAD SRY+2
114  12546 1143   TAD XT+2
115  12547 3172   DCA SRY+2
116  12550 7004   RAL
117  12551 1171   TAD SRY+1
118  12552 1142   TAD XT+1
119  12553 3171   DCA SRY+1
120  12554 7004   RAL
121  12555 1170   TAD SRY
122  12556 1141   TAD XT
123  12557 3170   DCA SRY
124  12560 5765   JMP I NEXT
125
126  12561 2726   COMPX,XCOMP
127  12562 2746   COMPY,YCOMP
128  12563 3000   SHFTX,XSHFT
129  12564 3006   SHFTY,YSHFT
130  12565 2600   NEXT,AI
131  12566 5600   EXIT,JMP I A
132
133  12567 7767   N9,-11
134  12570 0006   P6,6
     12575 7727
     12576 0155
     12577 0035
135  12600          PAGE 1    12600 7100   AI,CLL
2    12601 1167   TAD SRX+2
3    12602 1161   TAD XL+2
4    12603 3161   DCA XL+2
5    12604 7004   RAL
6    12605 3176   DCA XCARRY
7    12606 1176   TAD XCARRY
8    12607 1166   TAD SRX+1
9    12610 1160   TAD XL+1
10   12611 3160   DCA XL+1
11   12612 7004   RAL
12   12613 1165   TAD SRX
13   12614 1157   TAD XL
14   12615 3157   DCA XL
15   12616 7100   CLL
16   12617 1172   TAD SRY+2
17   12620 1164   TAD YL+2
18   12621 3164   DCA YL+2
19   12622 7004   RAL
20   12623 3177   DCA YCARRY
21   12624 1177   TAD YCARRY
22   12625 1171   TAD SRY+1
23   12626 1163   TAD YL+1
24   12627 3163   DCA YL+1
25   12630 7004   RAL
26   12631 1170   TAD SRY
27   12632 1162   TAD YL
28   12633 3162   DCA YL
29   12634 7100   CLL
30   12635 1156   TAD FX+1
31   12636 1160   TAD XL+1
32   12637 7204   CLA RAL
33   12640 1155   TAD FX
34   12641 1157   TAD XL
```

```
35   12642 7710       SPA CLA
36   12643 7001       IAC
37   12644 3151       DCA XSL
38   12645 7100       CLL
39   12646 1154       TAD FY+1
40   12647 1163       TAD YL+1
41   12650 7204       CLA RAL
42   12651 1153       TAD FY
43   12652 1162       TAD YL
44   12653 7710       SPA CLA
45   12654 7001       IAC
46   12655 3152       DCA YSL
47   12656 1151       TAD XSL
48   12657 7041       CIA
49   12660 1147       TAD XS
50   12661 7650       SNA CLA
51   12662 5312       JMP AJ
52   12663 1152       TAD YSL
53   12664 7041       CIA
54   12665 1150       TAD YS
55   12666 7650       SNA CLA
56   12667 5303       JMP AK
57
58   12670 1173       AL,TAD SWITCH
59   12671 7640       SZA CLA
60   12672 5766       JMP I AR
61
62   12673 1151       AM,TAD XSL
63   12674 3147       DCA XS
64   12675 1152       TAD YSL
65   12676 3150       DCA YS
66   12677 4767       JMS I ASTLA
67   12700 7001       IAC
68   12701 3173       DCA SWITCH
69   12702 5770       JMP I CP
70
71   12703 1153       AK,TAD FY
72   12704 7710       SPA CLA
73   12705 7130       STL RAR
74   12706 1162       TAD YL
75   12707 7700       SMA CLA
76   12710 5273       JMP AM
77   12711 5270       JMP AL
78
79   12712 1152       AJ,TAD YSL
80   12713 7041       CIA
81   12714 1150       TAD YS
82   12715 7650       SNA CLA
83   12716 5273       JMP AM
84   12717 1155       TAD FX
85   12720 7710       SPA CLA
86   12721 7130       STL RAR
87   12722 1157       TAD XL
88   12723 7700       SMA CLA
89   12724 5273       JMP AM
90   12725 5270       JMP AL
91
92   12726 0000       XCOMP,0
93   12727 7100       CLL
94   12730 1167       TAD SRX+2
95   12731 7041       CIA
96   12732 3167       DCA SRX+2
97   12733 1166       TAD SRX+1
98   12734 7040       CMA
99   12735 7430       SZL
100  12736 7101       CLL IAC
101  12737 3166       DCA SRX+1
102  12740 1165       TAD SRX
103  12741 7040       CMA
104  12742 7430       SZL
105  12743 7101       CLL IAC
106  12744 3165       DCA SRX
107  12745 5726       JMP I XCOMP
108
109  12746 0000       YCOMP,0
110  12747 7100       CLL
```

```
111  12750 1172    TAD SRY+2
112  12751 7041    CIA
113  12752 3172    DCA SRY+2
114  12753 1171    TAD SRY+1
115  12754 7040    CMA
116  12755 7430    SZL
117  12756 7101    CLL IAC
118  12757 3171    DCA SRY+1
119  12760 1170    TAD SRY
120  12761 7040    CMA
121  12762 7430    SZL
122  12763 7101    CLL IAC
123  12764 3170    DCA SRY
124  12765 5746    JMP I YCOMP
125
126  12766 2566    AR,EXIT
127  12767 3200    BSTLA,ABSTL
128  12770 2453    CP,AC
129
130  13000          PAGE 1    13000 0000    XSHFT,0
2    13001 1310    TAD M9
3    13002 7041    CIA
4    13003 1250    TAD XJMP
5    13004 3205    DCA .+1
6    13005 7402    HLT
7
8    13006 0000    YSHFT,0
9    13007 1310    TAD M9
10   13010 7041    CIA
11   13011 1264    TAD YJMP
12   13012 3213    DCA .+1
13   13013 7402    HLT
14
15   13014 0000    SXR,0
16   13015 7100    CLL
17   13016 1165    TAD SRX
18   13017 7510    SPA
19   13020 7120    STL
20   13021 7010    RAR
21   13022 3165    DCA SRX
22   13023 1166    TAD SRX+1
23   13024 7010    RAR
24   13025 3166    DCA SRX+1
25   13026 1167    TAD SRX+2
26   13027 7010    RAR
27   13030 3167    DCA SRX+2
28   13031 5614    JMP I SXR
29
30   13032 0000    SYR,0
31   13033 7100    CLL
32   13034 1170    TAD SRY
33   13035 7510    SPA
34   13036 7120    STL
35   13037 7010    RAR
36   13040 3170    DCA SRY
37   13041 1171    TAD SRY+1
38   13042 7010    RAR
39   13043 3171    DCA SRY+1
40   13044 1172    TAD SRY+2
41   13045 7010    RAR
42   13046 3172    DCA SRY+2
43   13047 5632    JMP I SYR
44
45   13050 5251    XJMP,JMP .+1
46   13051 4214    JMS SXR
47   13052 4214    JMS SXR
48   13053 4214    JMS SXR
49   13054 4214    JMS SXR
50   13055 4214    JMS SXR
51   13056 4214    JMS SXR
52   13057 4214    JMS SXR
53   13060 4214    JMS SXR
54   13061 4214    JMS SXR
```

```
55   13062 4214   JMS SXR
56   13063 5600   JMP I XSHFT
57
58   13064 5265   YJMP,JMP .+1
59   13065 4232   JMS SYR
60   13066 4232   JMS SYR
61   13067 4232   JMS SYR
62   13070 4232   JMS SYR
63   13071 4232   JMS SYR
64   13072 4232   JMS SYR
65   13073 4232   JMS SYR
66   13074 4232   JMS SYR
67   13075 4232   JMS SYR
68   13076 4232   JMS SYR
69   13077 5606   JMP I YSHFT
70
71   13100 1276   DTAB,TAD .-2
72   13101 7763   -15
73   13102 7765   -13
74   13103 7767   -11
75   13104 7771   -7
76   13105 7773   -5
77   13106 7775   -3
78   13107 7777   -1
79   13110 7766   M9,-12
80
81   13200        PAGE 1    13200 0000   ABSTL,0
2    13201 7100   CLL
3    13202 1176   TAD XCARRY
4    13203 1166   TAD SRX+1
5    13204 3166   DCA SRX+1
6    13205 7004   RAL
7    13206 1165   TAD SRX
8    13207 3165   DCA SRX
9    13210 7100   CLL
10   13211 1177   TAD YCARRY
11   13212 1171   TAD SRY+1
12   13213 3171   DCA SRY+1
13   13214 7004   RAL
14   13215 1170   TAD SRY
15   13216 3170   DCA SRY
16   13217 3132   DCA SCORE
17   13220 1165   TAD SRX
18   13221 7700   SMA CLA
19   13222 5235   JMP STLA
20   13223 2132   ISZ SCORE
21   13224 7100   CLL
22   13225 1166   TAD SRX+1
23   13226 7041   CIA
24   13227 3166   DCA SRX+1
25   13230 1165   TAD SRX
26   13231 7040   CMA
27   13232 7430   SZL
28   13233 7101   IAC CLL
29   13234 3165   DCA SRX
30
31   13235 1170   STLA,TAD SRY
32   13236 7700   SMA CLA
33   13237 5253   JMP STLB
34   13240 2132   ISZ SCORE
35   13241 2132   ISZ SCORE
36   13242 7100   CLL
37   13243 1171   TAD SRY+1
38   13244 7041   CIA
39   13245 3171   DCA SRY+1
40   13246 1170   TAD SRY
41   13247 7040   CMA
42   13250 7430   SZL
43   13251 7101   CLL IAC
44   13252 3170   DCA SRY
45
46   13253 7100   STLB,CLL
47   13254 1171   TAD SRY+1
```

```
48  13255 7041  CIA
49  13256 3140  DCA DY+1
50  13257 1170  TAD SRY
51  13260 7040  CMA
52  13261 7430  SZL
53  13262 7001  IAC
54  13263 3137  DCA DY
55  13264 7100  CLL
56  13265 1166  TAD SRX+1
57  13266 1140  TAD DY+1
58  13267 7204  CLA RAL
59  13270 1165  TAD SRX
60  13271 1137  TAD DY
61  13272 7700  SMA CLA
62  13273 5306  JMP STLC
63  13274 1170  TAD SRY
64  13275 3134  DCA DX
65  13276 1171  TAD SRY+1
66  13277 3135  DCA DX+1
67  13300 1165  TAD SRX
68  13301 3137  DCA DY
69  13302 1166  TAD SRX+1
70  13303 3140  DCA DY+1
71  13304 1362  TAD XMTAB+1
72  13305 5317  JMP STLD
73
74  13306 1165  STLC,TAD SRX
75  13307 3134  DCA DX
76  13310 1166  TAD SRX+1
77  13311 3135  DCA DX+1
78  13312 1170  TAD SRY
79  13313 3137  DCA DY
80  13314 1171  TAD SRY+1
81  13315 3140  DCA DY+1
82  13316 1361  TAD XMTAB
83
84  13317 3174  STLD,DCA MAJOR
85  13320 1173  TAD SWITCH
86  13321 7640  SZA CLA
87  13322 5355  JMP 1S
88  13323 1377  TAD (27)
89  13324 3133  DCA DX-1
90  13325 1377  TAD (27)
91  13326 3136  DCA DY-1
92  13327 4407  FENT
93  13330 5014  FGET XPOS
94  13331 2001  FSUB XDEST
95  13332 0001  FSQ
96  13333 6053  FPUT WFT.0
97  13334 5015  FGET YPOS
98  13335 2003  FSUB YDEST
99  13336 0001  FSQ
100 13337 1053  FADD WFT.0
101 13340 6053  FPUT WFT.0
102 13341 5133  FGET DX-1
103 13342 0017  FNOR
104 13343 0001  FSQ
105 13344 6054  FPUT WFT.1
106 13345 5136  FGET DY-1
107 13346 0017  FNOR
108 13347 0001  FSQ
109 13350 1054  FADD WFT.1
110 13351 2053  FSUB WFT.0
111 13352 7357  FJMP 2S
112 13353 0003  GTZ ETZ
113 13354 0000  FEXT
114
115 13355 4776  1S,JMS MOVE
116 13356 5600  JMP I ABSTL
117
118 13357 0000  2S,FEXT
119 13360 5775  JMP EXIT
120
121 13361 0100  XMTAB,100
122 13362 0020  20
```

```
123
    13375 2566
    13376 3400
    13377 0027
124 13400         PAGE 1   13400 0000   MOVE,0
2   13401 1135   TAD DX+1
3   13402 7040   CMA
4   13403 3144   DCA COUNT+1
5   13404 1134   TAD DX
6   13405 7040   CMA
7   13406 3143   DCA COUNT
8   13407 1134   TAD DX
9   13410 7110   CLL RAR
10  13411 3141   DCA MOD
11  13412 1135   TAD DX+1
12  13413 7010   RAR
13  13414 3142   DCA MOD+1
14  13415 7101   CLL IAC
15  13416 1144   TAD COUNT+1
16  13417 3135   DCA DX+1
17  13420 7004   RAL
18  13421 1143   TAD COUNT
19  13422 3134   DCA DX
20  13423 1132   TAD SCORE
21  13424 1331   TAD CTAB
22  13425 3226   DCA .+1
23  13426 7402   HLT
24  13427 3175   DCA MINOR
25  13430 1175   TAD MINOR
26  13431 0377   AND (240)
27  13432 1174   TAD MAJOR
28  13433 3174   DCA MAJOR
29
30  13434 2144   MOVC,ISZ COUNT+1
31  13435 5241   JMP 1$
32  13436 2143   ISZ COUNT
33  13437 7410   SKP
34  13440 5600   JMP I MOVE
35
36  13441 6201   1$,CDF 00
37  13442 7346   CLL STA RTL
38  13443 1776   TAD I (INTVAL)
39  13444 7650   SNA CLA
40  13445 5321   JMP CSTOP
41  13446 6211   CDF 10
42  13447 7300   CLA CLL
43  13450 1142   TAD MOD+1
44  13451 1140   TAD DY+1
45  13452 3142   DCA MOD+1
46  13453 7004   RAL
47  13454 1141   TAD MOD
48  13455 1137   TAD DY
49  13456 3141   DCA MOD
50  13457 7300   CLA CLL
51  13460 1135   TAD DX+1
52  13461 1142   TAD MOD+1
53  13462 3017   DCA XR8
54  13463 7004   RAL
55  13464 1141   TAD MOD
56  13465 1134   TAD DX
57  13466 7510   SPA
58  13467 5277   JMP MOVB
59  13470 3141   DCA MOD
60  13471 1017   TAD XR8
61  13472 3142   DCA MOD+1
62  13473 7240   STA
63  13474 3336   DCA MINI
64  13475 1175   TAD MINOR
65  13476 5305   JMP MOV9
66
67  13477 7200   MOVB,CLA
```

```
68   13500 3336   DCA MINI
69   13501 3336   DCA MINI
70   13502 3336   DCA MINI
71   13503 3336   DCA MINI
72   13504 1174   TAD MAJOR
73
74   13505 6600   MOV9,6600
75
76   13506 7344   1$,STA CLL RAL
77   13507 1336   TAD MINI
78   13510 3017   DCA XRA
79   13511 2017   ISZ XRA
80   13512 5311   JMP .-1
81   13513 2130   ISZ SPEED
82   13514 5306   JMP 1$
83   13515 7000   NOP
84   13516 1002   TAD RAMPS
85   13517 3130   DCA SPEED
86   13520 5234   JMP MOVC
87
88   13521 3776   CSTOP,DCA I (INTVAL)
89   13522 1775   TAD I (STPLOC)
90   13523 3330   DCA 1$
91   13524 6203   CDI 00
92   13525 4403   JMS I FUTSCH
93   13526 6203   CDI 00
94   13527 5730   JMP I 1$
95
96   13530 7402   1$,HLT
97
98   13531 1332   CTAB,TAD .+1
99   13532 0120   120
100  13533 0320   320
101  13534 0160   160
102  13535 0360   360
103  13536 0000   MINI,0
104
     13575 0124
     13576 0123
     13577 0240
105        0001   *CIRCLE
106  10001 2400   A
107               $
```

SYMBOL TABLE

| | | | | | | | | | |
|---|---|---|---|---|---|---|---|---|---|
| A | 02400 | AA | 02446 | AB | 02450 | ABSTL | 03200 | AC | 02453 |
| AD | 02503 | AI | 02600 | AJ | 02712 | AK | 02703 | AL | 02670 |
| AM | 02673 | AR | 02766 | AUX.TH | 00045 | AUX.X | 00050 | AUX.Y | 00047 |
| AUX.Z | 00046 | BSTLA | 02767 | B.ADTH | 00044 | B.ADX | 00041 | B.ADY | 00042 |
| B.ADZ | 00043 | CIRAB = | 00060 | CIRCLE | 00001 | CIRMC = | 00061 | CIRXM = | 00056 |
| CIRYM = | 00057 | COMPX | 02561 | COMPY | 02562 | COUNT | 00143 | CP | 02770 |
| CSTOP | 03521 | CTAB | 03531 | C.THET= | 00017 | C.X = | 00014 | C.Y = | 00015 |
| C.Z = | 00016 | DELTAZ = | 00073 | DRCTN | 00131 | DTAB | 03100 | DX | 00134 |
| DY | 00137 | D.THET= | 00010 | D.X = | 00002 | D.Y = | 00004 | D.Z = | 00006 |
| EPSILN= | 00043 | ETZ = | 00001 | EXIT | 02566 | EXP | 00020 | F.NUM = | 00025 |
| FABS = | 00006 | FCOS = | 00004 | FEXT = | 00000 | FFOUND | 00073 | FILES | 00100 |
| FNOR = | 00017 | FOUNDF | 00072 | FP.C = | 00033 | FP.CM = | 00042 | FP.LC = | 00041 |
| FP.M = | 00034 | FP.MM = | 00040 | FP.ONE= | 00031 | FP.SF = | 00037 | FP.SM = | 00036 |
| FP.TEN= | 00032 | FP.XM = | 00035 | FP.ZIP= | 00030 | FRAD = | 00022 | FREC | 00075 |
| FSIN = | 00003 | FT.0 = | 00056 | FT.1 = | 00057 | FT.10 = | 00070 | FT.11 = | 00071 |
| FT.12 = | 00072 | FT.13 = | 00073 | FT.14 = | 00074 | FT.15 = | 00075 | FT.16 = | 00076 |
| FT.17 = | 00077 | FT.2 = | 00060 | FT.3 = | 00061 | FT.4 = | 00062 | FT.5 = | 00063 |
| FT.6 = | 00064 | FT.7 = | 00065 | FT.8 = | 00066 | FT.9 = | 00067 | FUTSCH | 00003 |
| FX | 00155 | FY | 00153 | FZPK = | 00021 | FZPOS = | 00005 | F.AUTO | 00034 |
| F.AUX | 00025 | F.AXIS | 00026 | F.CCW | 00035 | F.CENT | 00036 | F.DFL | 00027 |
| F.EOF | 00040 | F.EOP | 00030 | F.HOLD | 00031 | F.N = | 00024 | F.NEXT= | 00013 |
| F.NUM | 00023 | F.OFF | 00032 | F.OFFS= | 00023 | F.PECK= | 00021 | F.RAD = | 00022 |
| F.SENS | 00033 | F.SPD = | 00000 | F.SSP = | 00011 | F.STRT | 00037 | F.THET= | 00007 |
| F.THIS= | 00012 | F.THPI= | 00026 | F.TYPE | 00024 | F.X = | 00001 | F.Y = | 00003 |
| F.Z = | 00005 | HORD | 00021 | INTVAL | 00123 | LORD | 00022 | LTZ = | 00004 |
| MAJOR | 00174 | MAXRS = | 00013 | MINI | 03536 | MINOR | 00175 | MOD | 00141 |
| MOVC | 03434 | MOVE | 03400 | MOV8 | 03477 | MOV9 | 03505 | M.TH | 00051 |
| M.X | 00054 | M.Y | 00053 | M.Z | 00052 | M9 | 03110 | NEXT | 02565 |
| NEXTF | 00071 | NRECS = | 00055 | N9 | 02567 | PTA | 00076 | PTROT | 00102 |
| P1 | 00104 | P2 | 00106 | P6 | 02570 | RADIUS= | 00022 | RAMPS | 00002 |

| | | | | | | | | | |
|---|---|---|---|---|---|---|---|---|---|
| RBUFF | 00110 | RECI | 00074 | RETRO | 00126 | SCORE | 00132 | SHF | 00145 |
| SHFTX | 02563 | SHFTY | 02564 | SHN | 00146 | SPARE = | 00027 | SPEED | 00130 |
| SP.MAX= | 00044 | SRX | 00165 | SRY | 00170 | STEPS = | 00052 | STLA | 03235 |
| STLB | 03253 | STLC | 03306 | STLD | 03317 | STOPSP= | 00051 | STPLOC | 00124 |
| STRTSP= | 00050 | SWITCH | 00173 | SXR | 03014 | SYR | 03032 | THDEL = | 00001 |
| T.0 | 00160 | T.1 | 00161 | T.10 | 00170 | T.11 | 00171 | T.12 | 00172 |
| T.13 | 00173 | T.14 | 00174 | T.15 | 00175 | T.16 | 00176 | T.17 | 00177 |
| T.2 | 00162 | T.3 | 00163 | T.4 | 00164 | T.5 | 00165 | T.6 | 00166 |
| T.7 | 00167 | VMASK | 00125 | WFT.0 = | 00053 | WFT.1 = | 00054 | WXPOS = | 00014 |
| WYPOS = | 00015 | WZPOS = | 00016 | W.AUTO | 00066 | W.AUX | 00057 | W.AXIS | 00060 |
| W.CCW | 00067 | W.CENT | 00070 | W.DEL | 00061 | W.EOP | 00062 | W.HOLD | 00063 |
| W.NUM | 00055 | W.OFF | 00064 | W.SENS | 00065 | W.SEQ = | 00020 | W.TYPE | 00056 |
| XCARRY | 00176 | XCNTR = | 00100 | XCOMP | 02726 | XDEST = | 00001 | XJMP | 03050 |
| XL | 00157 | XMTAB | 03361 | XPOS = | 00014 | XPOSA = | 00046 | XR0 = | 00010 |
| XR1 = | 00011 | XR2 = | 00012 | XR3 = | 00013 | XR4 = | 00014 | XR5 = | 00015 |
| XR6 = | 00016 | XR7 = | 00017 | XR8 = | 00017 | YS | 00147 | XSHFT | 03000 |
| XSL | 00151 | XT | 00141 | YCARRY | 00177 | YCNTR = | 00045 | YCOMP | 02746 |
| YDEST = | 00003 | YJMP | 03064 | YL | 00162 | YPOS = | 00015 | YPOSA = | 00047 |
| YS | 00150 | YSHFT | 03006 | YSL | 00152 | ZDELT = | 00001 | ZDETL = | 00070 |
| ZINC = | 00071 | ZINK = | 00072 | | | | | | |

```
ERRORS DETECTED:  0
FREE CORE:  3624. WORDS
:,:<HAMPZ,HAMCIN

1                     .TITLE HAMILL CO. BANC-4 16-JAN-76
 2                     /PROGRAMMED BY . C. KILBANE
 3
 4            0001     FIELD 1
 5
 6            0010     FPFLD=10
 7            0010     VBLFLD=10
 8            0000     FEXT=0
 9            0001     ETZ=1
10            0004     LTZ=4
11            0017     FNOR=17
12            0006     FABS=6
13
14                     TABSET 7,14
15
16            0020     *20
17
18   10020 0000        EXP,0/F.A.
19   10021 0000        HORD,0
20   10022 0000        LORD,0
21   10023 0000        OVER2,0
22   10024 0000        EX1,0/OPERAND STORAGE
23   10025 0000        AC1H,0
24   10026 0000        AC1L,0
25   10027 0000        OVER1,0
26   10030 0000        EXP1,0
27   10031 0000        QUOL,0
28   10032 0000        DRCTY,0
29   10033 0000        JUMP,0
30   10034 0000        SAVE,0
31   10035 0000        ADDR,0
32   10036 0000        NORML,0/NE 0 IF UNNORM ADD, SUB.
33   10037 0000        DF1,0/DATA FIELD CURRENT LEVEL
34   10040 0000        DF0,0/DATA FIELD PUSHED LEVEL
35   10041 0000        PC0,0/PGM CNTR, PUSHED LEVEL
36   10042 7677        LIMT,-N,/NR OF DIRECTORY VBLES
37   10043 6277        DIRECT,VT/LOCN OF DIRECTORY
38

1            0007     *7
 2   10007 6400        FPNT
 3
 4                     TABSET 2,21
 5
 6            6400     *6400
 7
 8   16400 0000        FPNT,0
 9   16401 7300        CLA CLL
```

```
10   16402 6214        RDF
11   16403 1356        TAD RDFI
12   16404 3037        DCA DF1
13   16405 3027        DCA OVER1
14   16406 3023        DCA OVER2
15   16407 1600        TAD I FPNT/GET NEXT INSTRUCTION
16   16410 2200        ISZ FPNT
17   16411 3033        DCA JUMP
18   16412 1033        TAD JUMP
19   16413 0361        AND MASK5
20   16414 7450        SNA
21   16415 5271        JMP PUSH
22   16416 0363        AND PAGENO/GET PAGE BIT
23   16417 7650        SNA CLA/PAGE ZERO?
24   16420 5223        JMP .+3/YES
25   16421 1361        TAD MASK5/NO
26   16422 0200        AND FPNT/C(FPNT)0-4 CONTAINS PAGE BITS
27   16423 3035        DCA ADDR
28   16424 1362        TAD MASK7/GET 7 BIT ADDRESS
29   16425 0033        AND JUMP
30   16426 1035        TAD ADDR
31   16427 3035        DCA ADDR
32   16430 1364        TAD INDRCT/INDIRECT BIT=1?
33   16431 0033        AND JUMP
34   16432 7650        SNA CLA
35   16433 5236        JMP DVY
36   16434 1435        TAD I ADDR/YES DEFER
37   16435 3035        DCA ADDR
38
39   16436 3032        DVY,DCA DRCTY
40   16437 1035        TAD ADDR
41   16440 7100        CLL
42   16441 1042        TAD LIMT
43   16442 7630        SZL CLA
44   16443 5253        JMP LOOP01
45   16444 1035        TAD ADDR
46   16445 1043        TAD DIRECT
47   16446 3032        DCA DRCTY
48   16447 6211        CDF FPFLD
49   16450 1432        TAD I DRCTY
50   16451 3035        DCA ADDR
51   16452 6211        CDF VALFLD
52   16453 7132        LOOP01,STL RTR
53   16454 1033        TAD JUMP
54   16455 7630        SZL CLA
55   16456 5271        JMP PUSH/OP 6 OR 7
56   16457 1035        TAD ADDR
57   16460 3034        DCA SAVE
58   16461 1435        TAD I ADDR
59   16462 3024        DCA EX1/EXPONENT
60   16463 2034        ISZ SAVE
61   16464 1434        TAD I SAVE
62   16465 3025        DCA AC1H/HIGH ORDER MANTISSA
63   16466 2034        ISZ SAVE
64   16467 1434        TAD I SAVE
65   16470 3026        DCA AC1L/LOW ORDER MANTISSA
66   16471 6211        PUSH,CDF FPFLD
67   16472 1033        TAD JUMP
68   16473 7106        CLL RTL
69   16474 7006        RTL
70   16475 0360        AND MASK3/GET BITS 0-2, IE OPCODE
71   16476 1365        TAD TABLE/LOOKUP IN TABLE
72   16477 3357        DCA JUMP2
73   16500 1757        TAD I JUMP2
74   16501 3357        DCA JUMP2
75   16502 4757        JMS I JUMP2/GO THERE
76   16503 4312        FOO,JMS CDFP
77   16504 5201        JMP FPNT+1
78
79   16505 7126        FOUT,STL RTL
80   16506 1037        TAD DF1
81   16507 3310        DCA .+1
82   16510 0000        0
83   16511 5600        JMP I FPNT
84
85   16512 0000        CDFP,0
```

```
86   16513 1037    TAD DF1
87   16514 3315    DCA .+1
88   16515 0000    0
89   16516 5712    JMP I CDFP
90
91   16517 0000    FCMP,0
92   16520 4312    JMS CDFP
93   16521 1600    TAD I FPNT
94   16522 6211    CDF FPFLD
95   16523 3357    DCA JUMP2
96   16524 3355    DCA CNDT
97   16525 1021    TAD HORD
98   16526 7550    SPA SNA
99   16527 5346    JMP FCMPA
100  16530 7410    SKP
101  16531 2355    ISZ CNDT
102
103  16532 2355    FCMPB,ISZ CNDT
104  16533 2355    ISZ CNDT
105  16534 7300    CLA CLL
106  16535 1357    TAD JUMP2
107  16536 0355    AND CNDT
108  16537 7640    SZA CLA
109  16540 5343    JMP .+3
110  16541 2200    ISZ FPNT
111  16542 5717    JMP I FCMP
112
113  16543 1035    FCMPC,TAD ADDR
114  16544 3200    DCA FPNT
115  16545 5717    JMP I FCMP
116
117  16546 2355    FCMPA,ISZ CNDT
118  16547 7710    SPA CLA
119  16550 5331    JMP FCMPB-1
120  16551 1022    TAD LORD
121  16552 7650    SNA CLA
122  16553 5334    JMP FCMPB+2
123  16554 5333    JMP FCMPB+1
124
125          TABSET 7,14
126
127  16555 0000    CNDT,0/1 EQ 0; 2 GT 0; 4 LT 0
128  16556 6201    RDFI,CDF 00
129  16557 0000    JUMP2,0
130  16560 0017    MASK3,0017
131  16561 7600    MASK5,7600
132  16562 0177    MASK7,0177
133  16563 0200    PAGENO,0200
134  16564 0400    INDRCT,0400
135  16565 6566    TABLE,.+1
136  16566 6665    EXIT/TABLE USED IN INTERPRETING
137  16567 6632    FLAD/BITS 0-2 OF PSEUDO
138  16570 6660    FLSU/INSTRUCTION
139  16571 6711    FLMY
140  16572 7305    FLDV/IF OPCODE=0, GO TO EXIT
141  16573 6600    FLGT/AND INTERPRET BITS 8-11
142  16574 6610    FLPT
143  16575 6517    FCMP

1          TABSET 2,21
2
3
4        6600    *FPNT+200
5
6    16600 0000    FLGT,0
7    16601 1024    TAD EX1/FGET=5
8    16602 3020    DCA EXP
9    16603 1025    TAD AC1H
10   16604 3021    DCA HORD
11   16605 1026    TAD AC1L
12   16606 3022    DCA LORD
13   16607 5600    JMP I FLGT
14
15   16610 0000    FLPT,0
```

```
16   16611 1032    TAD DRCTY
17   16612 7650    SNA CLA
18   16613 5216    JMP FLPTQ
19   16614 6211    CDF VBLFLO
20   16615 5221    JMP .+4
21
22   16616 1037    FLPTQ,TAD DF1
23   16617 3220    DCA .+1
24   16620 0000    0
25   16621 1020    TAD EXP/FPUT=6
26   16622 3435    DCA I ADDR
27   16623 2035    ISZ ADDR
28   16624 1021    TAD HORD
29   16625 3435    DCA I ADDR
30   16626 2035    ISZ ADDR
31   16627 1022    TAD LORD
32   16630 3435    DCA I ADDR
33   16631 5610    JMP I FLPT
34   16632 0000    FLAD,0
35   16633 4750    JMS I ALGN/FLAD=1 - FIRST ALIGN EXPONENTS
36   16634 5632    JMP I FLAD
37   16635 1036    TAD NORML
38   16636 7650    SNA CLA
39   16637 4751    JMS I UNORM/LARGER OF THE TWO IS IN F.A.
40   16640 7100    CLL
41   16641 1027    TAD OVER1/TRIPLE PRECISION ADDITION
42   16642 1023    TAD OVER2/SINCE BITS ARE SHIFTED
43   16643 3023    DCA OVER2/RIGHT
44   16644 7004    RAL
45   16645 1026    TAD AC1L
46   16646 1022    TAD LORD
47   16647 3022    DCA LORD
48   16650 7004    RAL
49   16651 1025    TAD AC1H
50   16652 1021    TAD HORD
51   16653 3021    DCA HORD
52   16654 1036    TAD NORML
53   16655 7650    SNA CLA
54   16656 4756    JMS I NORM/NORMALIZE THE RESULT
55   16657 5632    JMP I FLAD
56
57   16660 0000    FLSU,0
58   16661 4664    JMS I OPMINS/FSUB=2 - NEGATE THE OPERAND
59   16662 4232    JMS FLAD
60   16663 5660    JMP I FLSU
61   16664 7400    OPMINS,MINUS2
62   16665 0000    EXIT,0
63   16666 1033    TAD JUMP/OPCODE=0
64   16667 0355    AND MASK7/ARE BITS8-11=0?
65   16670 7450    SNA
66   16671 5332    JMP FPEXT/YES=FEXT
67   16672 1310    TAD ACON6/LOOKUP ON TABLE
68   16673 3354    DCA JUMPT
69   16674 1754    TAD I JUMPT
70   16675 3354    DCA JUMPT
71   16676 1753    TAD I FPNTP
72   16677 3041    DCA PCO
73   16700 1037    TAD DF1
74   16701 3040    DCA DFO
75   16702 4754    JMS I JUMPT/CALL AS A SUBROUTINE
76   16703 1041    TAD PCO
77   16704 3753    DCA I FPNTP
78   16705 1040    TAD DFO
79   16706 3037    DCA DF1
80   16707 5665    JMP I EXIT
81   16710 7545    ACON6,TABLE6-1
82
83   16711 0000    FLMY,0
84   16712 7201    CLA IAC/FMPY=3
85   16713 1024    TAD EX1
86   16714 1020    TAD EXP/ADD EXPONENTS TOGETHER
87   16715 3020    DCA EXP
88   16716 4747    JMS I MULT/MULTIPLY
89   16717 5711    JMP I FLMY
90
91   16720 0000    FRNDP,0/ROUND FLOATING AC
```

```
 92  16721 1021      TAD HORD
 93  16722 7710      SPA CLA
 94  16723 1343      TAD C1000
 95  16724 1342      TAD INCR
 96  16725 3327      DCA .+2
 97  16726 4407      JMS I 7
 98  16727 1000      FADD P/OR FSUB
 99  16730 0000      FEXT
100  16731 5720      JMP I FRNDR
101
102  16732 4762  FPEXT,JMS I OFSET
103  16733 1020      TAD EXP
104  16734 3757      DCA I EXPP
105  16735 1021      TAD HORD
106  16736 3760      DCA I HOAP
107  16737 1022      TAD LORD
108  16740 3761      DCA I LOAP
109  16741 5752      JMP I FPEX
110
111                  TABSET 7,14
112
113  16742 1344  INCR,FADD FPH
114  16743 1000  C1000,1000
115  16744 0000  FPH,0
116  16745 2000       2000
117  16746 0000       0
118  16747 7221  MULT,DMULT
119  16750 7020  ALGN,ALIGN
120  16751 7565  UNORM,DUNORM
121  16752 6505  FPEX,FOUT
122  16753 6400  FPNTP,FPNT
123  16754 0000  JUMPT,0
124  16755 0017  MASKT,17
125  16756 7600  NORM,DNORM
126  16757 0020  EXPP,EXP
127  16760 0021  HOAP,HORD
128  16761 0022  LOAP,LORD
129  16762 6512  OFSET,CDFP
130
131                  TABSET 2,21
132
133  16763 0000  PSUNM,0/SET UNNORMALIZED MODE
134  16764 7001      IAC
135  16765 3036      DCA NORML
136  16766 5763      JMP I PSUNM
137
138  16767 0000  PRNM,0/RESET TO NORMALIZED MODE
139  16770 3036      DCA NORML
140  16771 5767      JMP I PRNM
141

1        7000      *FPNT+400
  2  17000 0000  ACMINS,0/ROUTINE TO PERFORM
  3  17001 7300      CLL CLA
  4  17002 1023      TAD OVER2/TRIPLE PRECISION NEGATION
  5  17003 7041      CMA IAC/OF FLOATING AC
  6  17004 3023      DCA OVER2
  7  17005 1022      TAD LORD
  8  17006 7040      CMA
  9  17007 7430      SZL
 10  17010 7101      CLL IAC
 11  17011 3022      DCA LORD
 12  17012 1021      TAD HORD
 13  17013 7040      CMA
 14  17014 7430      SZL
 15  17015 7101      CLL IAC
 16  17016 3021      DCA HORD
 17  17017 5600      JMP I ACMINS
 18  17020 0000  ALIGN,0/SUBROUTINE TO ALIGN
 19  17021 1024      TAD EX1
 20  17022 7041      CMA IAC
 21  17023 1020      TAD EXP
 22  17024 7450      SNA/ARE EXPONENTS EQUAL?
 23  17025 5300      JMP DONE/YES
```

```
24  17026 7500    SMA
25  17027 7041    CMA IAC
26  17030 3323    DCA AMOUNT
27  17031 1323    TAD AMOUNT
28  17032 1324    TAD TEST2
29  17033 7700    SMA CLA/CAN EXPONENTS BE ALIGNED?
30  17034 5242    JMP .+6/YES
31  17035 4302    JMS OUTGO/NO
32  17036 7430    SZL
33  17037 1331    TAD TAG2
34  17040 1330    TAD TAG1
35  17041 5311    JMP NOGO
36  17042 4302    JMS OUTGO
37  17043 7420    SNL/SET UP ADDRESSES
38  17044 1331    TAD TAG2
39  17045 1330    TAD TAG1
40  17046 3325    DCA TEST3
41  17047 1323    TAD AMOUNT
42  17050 7041    CMA IAC
43  17051 1725    TAD I TEST3
44  17052 3725    DCA I TEST3
45  17053 2325    ISZ TEST3
46  17054 1325    TAD TEST3
47  17055 3326    DCA TEST4
48  17056 2326    ISZ TEST4
49  17057 1326    TAD TEST4
50  17060 3327    DCA TEST5
51  17061 2327    ISZ TEST5
52
53  17062 7100    SHIFT,CLL/THIS ROUTINE DOES
54  17063 1725    TAD I TEST3/THE ACTUAL SHIFTING
55  17064 7510    SPA
56  17065 7020    CML
57  17066 7010    RAR
58  17067 3725    DCA I TEST3
59  17070 1726    TAD I TEST4
60  17071 7010    RAR
61  17072 3726    DCA I TEST4
62  17073 1727    TAD I TEST5
63  17074 7010    RAR
64  17075 3727    DCA I TEST5
65  17076 2323    ISZ AMOUNT
66  17077 5262    JMP SHIFT
67  17100 2220    DONE,ISZ ALIGN
68  17101 5620    JMP I ALIGN
69  17102 0000    OUTGO,0/DETERMINE WHICH TO SHIFT
70  17103 1024    TAD EX1
71  17104 7041    CMA IAC
72  17105 1020    TAD EXP
73  17106 7004    RAL
74  17107 7200    CLA
75  17110 5702    JMP I OUTGO
76  17111 3325    NOGO,DCA TEST3/CAN'T BE ALIGNED
77  17112 1725    TAD I TEST3/LARGEST GOES INTO FAC
78  17113 3020    DCA EXP
79  17114 2325    ISZ TEST3
80  17115 1725    TAD I TEST3
81  17116 3021    DCA HORD
82  17117 2325    ISZ TEST3
83  17120 1725    TAD I TEST3
84  17121 3022    DCA LORD
85  17122 5620    JMP I ALIGN
86
87              TABSET 7,14
88
89  17123 0000    AMOUNT,0
90  17124 0030    TEST2,0030
91  17125 0000    TEST3,0
92  17126 0000    TEST4,0
93  17127 0000    TEST5,0
94  17130 0020    TAG1,EXP
95  17131 0004    TAG2,EX1-EXP
96  17132 6503    RETN2,FOO
97
98              TABSET 2,21
99
```

```
100 17133 1342    ERROR1,TAD GOOF/DIVISION BY ZERO
101 17134 3020    DCA EXP/SET TO LARGEST + VALUE
102 17135 1342    TAD GOOF
103 17136 3021    DCA HORD
104 17137 7040    CMA
105 17140 3022    DCA LORD
106 17141 5732    JMP I RETN2
107 17142 3777    GOOF,3777
108 17143 0000    SQUARE,0
109 17144 4407    JMS I 0007
110 17145 6353    FPUT FPACX
111 17146 3353    FMPY FPACX
112 17147 0000    FEXT
113 17150 5743    JMP I SQUARE
114 17151 0000    EXIT6,0/DUMMY SUBROUTINE
115 17152 5751    JMP I EXIT6
116 17153 0000    FPACX,0
117 17154 0000    0
118 17155 0000    0
119
120 17156 0000    UNORF,0/UNNORMALIZE FP ACCUM
121 17157 3200    DCA ACMINS
122 17160 1021    TAD HORD
123 17161 7710    SPA CLA
124 17162 4200    JMS ACMINS
125 17163 1376    TAD C27
126 17164 3024    DCA EX1
127 17165 3025    DCA AC1H
128 17166 3026    DCA AC1L
129 17167 4220    JMS ALIGN
130 17170 7000    NOP
131 17171 3023    DCA OVER2
132 17172 1200    TAD ACMINS
133 17173 7640    SZA CLA
134 17174 4200    JMS ACMINS
135 17175 5756    JMP I UNORF
136 17176 0027    C27,27

1       7200    *FPNT+600
 2  17200 0000    DIV1,0/SHIFT FAC RIGHT
 3  17201 7300    CLA CLL
 4  17202 1021    TAD HORD
 5  17203 7510    SPA
 6  17204 7120    CLL CML
 7  17205 7010    RAR
 8  17206 3021    DCA HORD
 9  17207 1022    TAD LORD
10  17210 7010    RAR
11  17211 3022    DCA LORD
12  17212 1023    TAD OVER2
13  17213 7010    RAR
14  17214 3023    DCA OVER2
15  17215 7100    CLL
16  17216 2020    ISZ EXP
17  17217 7000    NOP
18  17220 5600    JMP I DIV1
19  17221 0000    DMULT,0/DOUBLE PRECISION MULTIPLY
20  17222 7300    CLA CLL/SAVE PRODUCT TRIPLE PRECISION
21  17223 1365    TAD SMACLA
22  17224 3351    DCA SNSWIT/CALLS A SINGLE PRECISION
23  17225 4340    JMS SIGN/MULTIPLY 3 TIMES
24  17226 1026    TAD AC1L
25  17227 3760    DCA I MP2PT
26  17230 1022    TAD LORD
27  17231 4757    JMS I MP4PT
28  17232 7200    CLA
29  17233 1761    TAD I MP5PT
30  17234 3023    DCA OVER2
31  17235 1021    TAD HORD
32  17236 3760    DCA I MP2PT
33  17237 1026    TAD AC1L
34  17240 4757    JMS I MP4PT
35  17241 1023    TAD OVER2
36  17242 3023    DCA OVER2
37  17243 7004    RAL
```

```
 38  17244 1761   TAD I MP5PT
 39  17245 3371   DCA D
 40  17246 7004   RAL
 41  17247 3372   DCA KEEP
 42  17250 1025   TAD AC1H
 43  17251 3760   DCA I MP2PT
 44  17252 1022   TAD LORD
 45  17253 4757   JMS I MP4PT
 46  17254 1023   TAD OVER2
 47  17255 3023   DCA OVER2
 48  17256 7004   RAL
 49  17257 1761   TAD I MP5PT
 50  17260 1371   TAD D
 51  17261 3371   DCA D
 52  17262 7004   RAL
 53  17263 1372   TAD KEEP
 54  17264 3372   DCA KEEP
 55  17265 1021   TAD HORD
 56  17266 3760   DCA I MP2PT
 57  17267 1025   TAD AC1H
 58  17270 4757   JMS I MP4PT
 59  17271 1371   TAD D
 60  17272 3022   DCA LORD
 61  17273 7004   RAL
 62  17274 1761   TAD I MP5PT
 63  17275 1372   TAD KEEP
 64  17276 3021   DCA HORD
 65  17277 4762   JMS I NORMF
 66  17300 3023   DCA OVER2
 67  17301 2367   ISZ SGN
 68  17302 5621   JMP I DMULT
 69  17303 4775   JMS I MINS
 70  17304 5621   JMP I DMULT
 71  17305 0000   FLDV,0
 72  17306 1025   TAD AC1H
 73  17307 7640   SZA CLA
 74  17310 5314   JMP .+4
 75  17311 1026   TAD AC1L
 76  17312 7650   SNA CLA
 77  17313 5776   JMP I ERROR/DIVISION BY ZERO
 78  17314 1024   TAD EX1
 79  17315 7041   CMA IAC
 80  17316 1020   TAD EXP
 81  17317 7001   IAC
 82  17320 3020   DCA EXP/SUBTRACT EXPONENTS
 83  17321 1364   TAD SPACLA
 84  17322 3351   DCA SNSWIT
 85  17323 4340   JMS SIGN/SET UP SIGNS
 86  17324 4763   JMS I DIVIDE/DIVIDE
 87  17325 7630   SZL CLA
 88  17326 7001   IAC
 89  17327 3026   DCA AC1L
 90  17330 3025   DCA AC1H
 91  17331 2367   ISZ SGN/TEST SIGN
 92  17332 5335   JMP .+3
 93  17333 5734   JMP I .+1/ADD ROUNDING
 94  17334 6637   FLAD+5
 95  17335 4775   JMS I MINS
 96  17336 4773   JMS I MINS2
 97  17337 5734   JMP I .-3
 98
 99  17340 0000   SIGN,0/TEST SIGN OF RESULT
100  17341 1370   TAD REST/SET UP BY MULTIPLY AND
101  17342 3367   DCA SGN/DIVIDE
102  17343 1021   TAD HORD
103  17344 7700   SMA CLA
104  17345 5350   JMP .+3
105  17346 4775   JMS I MINS
106  17347 2367   ISZ SGN
107  17350 1025   TAD AC1H
108  17351 7700   SNSWIT,SMA CLA/OR SPA CLA
109  17352 5740   JMP I SIGN
110  17353 4773   JMS I MINS2
111  17354 2367   ISZ SGN
112  17355 7000   NOP
113  17356 5740   JMP I SIGN
114
```

```
115                    TARSET 7,14
116
117  17357 7437        MP4PT,MP4
118  17360 7471        MP2PT,MP2
119  17361 7465        MP5PT,MP5
120  17362 7600        NORMF,DNORM
121  17363 7472        DIVIDE,DUADIV
122  17364 7710        SPACLA,SPA CLA
123  17365 7700        SMACLA,SMA CLA
124  17366 6503        RETURN,FOO
125  17367 0000        SGN,0
126  17370 7776        REST,7776
127  17371 0000        D,0
128  17372 0000        KEFP,0
129  17373 7400        MINS2,MINUS2/-AC1H,AC1L
130  17374 7420        RAR2,DIV2/AC1H,AC1L/2
131  17375 7000        MINS,ACMINS
132  17376 7133        ERROR,ERROR1

1                      TARSET 2,21
2
3          7400        *FPNT+1000
4    17400 0000        MINUS2,0/NEGATE OPERAND
5    17401 7300        CLA CLL/TRIPLE PRECISION
6    17402 1027        TAD OVER1
7    17403 7041        CMA IAC
8    17404 3027        DCA OVER1
9    17405 1026        TAD AC1L
10   17406 7040        CMA
11   17407 7430        SZL
12   17410 7101        CLL IAC
13   17411 3026        DCA AC1L
14   17412 1025        TAD AC1H
15   17413 7040        CMA
16   17414 7430        SZL
17   17415 7101        CLL IAC
18   17416 3025        DCA AC1H
19   17417 5600        JMP I MINUS2
20   17420 0000        DIV2,0/SHIFT OPERAND RIGHT
21   17421 7300        CLA CLL/TRIPLE PRECISION
22   17422 1025        TAD AC1H
23   17423 7510        SPA
24   17424 7120        CLL CML
25   17425 7010        RAR
26   17426 3025        DCA AC1H
27   17427 1026        TAD AC1L
28   17430 7010        RAR
29   17431 3026        DCA AC1L
30   17432 1027        TAD OVER1
31   17433 7010        RAR
32   17434 3027        DCA OVER1
33   17435 7100        CLL
34   17436 5620        JMP I DIV2
35
36   17437 0000        MP4,0/SINGLE PRECISION MULTIPLY
37   17440 3266        DCA MP1/12 BITS BY 12 BITS
38   17441 3265        DCA MP5
39   17442 1270        TAD THIR
40   17443 3267        DCA MP3
41   17444 7100        CLL
42   17445 1266        TAD MP1
43   17446 7010        RAR
44   17447 3266        DCA MP1
45   17450 1265        TAD MP5
46   17451 7420        SNL
47   17452 5255        JMP .+3
48   17453 7100        CLL
49   17454 1271        TAD MP2
50   17455 7010        RAR
51   17456 3265        DCA MP5
52   17457 2267        ISZ MP3
53   17460 5245        JMP MP4+6
54   17461 1266        TAD MP1
55   17462 7010        RAR
56   17463 7100        CLL
57   17464 5637        JMP I MP4
```

```
58
59                TARSET 7,14
60
61  17465 0000    MP5,0
62  17466 0000    MP1,0
63  17467 0000    MP3,0
64  17470 7764    THIR,7764
65  17471 0000    MP2,0
66
67                TARSET 2,21
68
69  17472 0000    DURDIV,0/DOUBLE PRECISION DIVIDE
70  17473 7300    CLA CLL
71  17474 3031    DCA QUOL
72  17475 1345    TAD MIF
73  17476 3267    DCA MP3
74  17477 5306    JMP DVX
75  17500 1022    DV3,TAD LORD
76  17501 7004    RAL
77  17502 3022    DCA LORD
78  17503 1021    TAD HORD
79  17504 7004    RAL
80  17505 3021    DCA HORD
81  17506 1026    DVX,TAD AC1L
82  17507 1022    TAD LORD
83  17510 3271    DCA MP2
84  17511 7004    RAL
85  17512 1021    TAD HORD
86  17513 1025    TAD AC1H
87  17514 7420    SNL
88  17515 5321    JMP DV2-1
89  17516 3021    DCA HORD
90  17517 1271    TAD MP2
91  17520 3022    DCA LORD
92  17521 7200    CLA
93  17522 1031    DV2,TAD QUOL
94  17523 7004    RAL
95  17524 3031    DCA QUOL
96  17525 1023    TAD OVER2
97  17526 7004    RAL
98  17527 3023    DCA OVER2
99  17530 2267    ISZ MP3
100 17531 5300    JMP DV3
101 17532 1031    TAD QUOL
102 17533 3022    DCA LORD
103 17534 1021    TAD HORD
104 17535 7106    CLL RTL
105 17536 3265    DCA MP5
106 17537 1023    TAD OVER2
107 17540 3021    DCA HORD
108 17541 3023    DCA OVER2
109 17542 1265    TAD MP5
110 17543 1265    TAD MP5
111 17544 5672    JMP I DURDIV
112 17545 7751    MIF,7751
113

1                 TARSET 7,14
2
3   17546 7143    TABLE6,SQUARE/TABLE FOR INTERPRETATION
4   17547 7664    SQROOT/OF BITS 8-11
5   17550 7151    EXIT6/CONTAINS ABSOLUTE ADDRESSES
6   17551 7151    EXIT6/OF PROGRAMS CALLED AS
7   17552 7151    EXIT6/SUBROUTINES
8   17553 7657    ABSF /ABSOLUTE VALUE
9   17554 7151    EXIT6
10  17555 7151    EXIT6
11  17556 7156    UNORF/FLOATING UNNORMALIZE
12  17557 6720    FRNDR/FLOATING ROUND
13  17560 7151    EXIT6/RESERVED FOR FNOP
14  17561 7200    ACMINS/FNEG
15  17562 6763    PSUNM/SET UNORMALIZED MODE
16  17563 6767    PRNM/RESET NORMALIZED MODE
17  17564 7600    DNORM/NORMALIZE FPAC
```

```
18
19                      TABSET 2,21
20
21      17565 0000      DUNORM,0
22      17566 4220      JMS DIV2/SHIFT OPERAND RIGHT
23      17567 4773      JMS I RAR1
24      17570 2024      ISZ EX1
25      17571 7000      NOP
26      17572 5765      JMP I DUNORM
27      17573 7200      RAR1,DIV1
28
29
30

1             7600     *FPNT+1200
2       17600 0000     DNORM,0/SUBROUTINE TO NORMALIZE
3       17601 7300     CLA CLL/FLOATING ACCUMULATOR
4       17602 3256     DCA AMT1
5       17603 3255     DCA SIGN1
6       17604 1021     TAD HORD
7       17605 7510     SPA/IS MANTISSA NEGATIVE
8       17606 2255     ISZ SIGN1/YES
9       17607 7640     SZA CLA/IS MANTISSA=0
10      17610 5217     JMP GO6/NO
11      17611 1022     TAD LORD
12      17612 7640     SZA CLA
13      17613 5217     JMP GO6
14      17614 1023     TAD OVER2
15      17615 7650     SNA CLA
16      17616 5252     JMP EXIT2/YES
17      17617 1255     GO6,TAD SIGN1/NO
18      17620 7640     SZA CLA/NEGATIVE?
19      17621 4654     JMS I NEG/YES
20      17622 1021     LOP,TAD HORD/WILL SHIFT BE TOO FAR?
21      17623 7104     RAL CLL
22      17624 7710     SPA CLA
23      17625 5241     JMP EXIT1/YES
24      17626 1023     TAD OVER2
25      17627 7104     CLL RAL
26      17630 3023     DCA OVER2
27      17631 1022     TAD LORD/NO SHIFT MANTISSA LEFT
28      17632 7004     RAL
29      17633 3022     DCA LORD
30      17634 1021     TAD HORD
31      17635 7004     RAL
32      17636 3021     DCA HORD
33      17637 2256     ISZ AMT1/COUNT NO. OF TIMES SHIFTED
34      17640 5222     JMP LOP
35      17641 1256     EXIT1,TAD AMT1/CORRECT EXPONENT
36      17642 7041     CMA IAC
37      17643 1020     TAD EXP
38      17644 3020     DCA EXP
39      17645 3023     DCA OVER2
40      17646 1255     TAD SIGN1/NEGATIVE?
41      17647 7640     SZA CLA
42      17650 4654     JMS I NEG/YES
43      17651 5600     JMP I DNORM
44      17652 3020     EXIT2,DCA EXP/SET TO ZERO
45      17653 5600     JMP I DNORM
46
47                     TABSET 7,14
48
49      17654 7000     NEG,ACMINS
50      17655 0000     SIGN1,0
51      17656 0000     AMT1,0
52
53                     TABSET 2,21
54
55      17657 0000     ABSF,0/FORM ABSOLUTE VALUE
56      17660 1021     TAD HORD
57      17661 7710     SPA CLA
58      17662 4654     JMS I NEG
59      17663 5657     JMP I ABSF
60      17664 0000     SQROOT,0/SQUARE ROOT
```

```
 61  17665 1021  TAD WORD
 62  17666 7710  SPA CLA
 63  17667 4654  JMS I NEG
 64  17670 4407  FENT
 65  17671 7334  FJMP SQUEND
 66  17672 0001  ETZ
 67  17673 6356  FPUT FPACQ
 68  17674 6353  FPUT ITER1
 69  17675 0000  FEXT
 70  17676 1361  TAD M4
 71  17677 3362  DCA CNT
 72  17700 1020  TAD EXP
 73  17701 7010  RAR
 74  17702 7620  SNL CLA
 75  17703 5336  JMP FVEN
 76  17704 7240  STA
 77  17705 1020  TAD EXP
 78  17706 7100  CLL
 79  17707 7510  SPA
 80  17710 7120  STL
 81  17711 7010  RAR
 82  17712 3353  DCA ITER1
 83  17713 1353  TAD ITER1
 84  17714 3350  DCA FPOH
 85
 86  17715 4407  CMMN,FENT
 87  17716 5350  FGET FPOH
 88  17717 1353  FADD ITER1
 89  17720 0000  FEXT
 90
 91  17721 4407  LOOP,FENT
 92  17722 6353  FPUT ITER1
 93  17723 5356  FGET FPACQ
 94  17724 4353  FDIV ITER1
 95  17725 1353  FADD ITER1
 96  17726 0000  FEXT
 97  17727 7240  STA
 98  17730 1020  TAD EXP
 99  17731 3020  DCA EXP
100  17732 2362  ISZ CNT
101  17733 5321  JMP LOOP
102
103  17734 0000  SQUEND,FEXT
104  17735 5664  JMP I SQROOT
105
106  17736 1020  FVEN,TAD EXP
107  17737 7100  CLL
108  17740 7510  SPA
109  17741 7120  STL
110  17742 7010  RAR
111  17743 3350  DCA FPOH
112  17744 7240  STA
113  17745 1350  TAD FPOH
114  17746 3353  DCA ITER1
115  17747 5315  JMP CMMN
116
117             TABSET 7,14
118
119
120  17750 0000  FPOH,01200010
     17751 2000
     17752 0000
121  17753 0000  ITER1,01010
     17754 0000
     17755 0000
122  17756 0000  FPACQ,01010
     17757 0000
     17760 0000
123  17761 7774  M4,-4
124  17762 0000  CNT,0
125
```

```
 1            0101    N.=65.
 2
 3            6277    *FPNT=N.
 4
 5            6277    VT=.
 6
 7            0000    VS=0
 8            5774    V=VT-N.-N.-N.
 9
10            0101    .REPT N.
11
12                    V+VS
13
14                    VS=VS+3
15
16                    .ENDR
17
18            6127    *V+31+31+31
19
20   16107 0001    1;200010
     16110 2000
     16111 2000
21   16112 0004    4;240010
     16113 2400
     16114 0000
22   16115 0007    7;310010
     16116 3100
     16117 0000
23   16120 0012    12;371610
     16121 3716
     16122 0000
24   16123 0016    16;234210
     16124 2342
     16125 0000
25   16126 0012    12;316210
     16127 3162
     16130 0000
26   16131 7777    -1;314613146
     16132 3146
     16133 3146
27   16134 0024    24;364110770
     16135 3641
     16136 0770
28   16137 0007    7;306010
     16140 3060
     16141 0000
29   16142 0021    21;303213700
     16143 3032
     16144 3700
30   16145 0001    1;300210
     16146 3000
     16147 0000
31   16150 0003    3;240010
     16151 2400
     16152 0000
32
33
```

```
SYMBOL TABLE
ABSF    07657   ACMINS  07000   ACON6   06710   ACIH    00025   ACIL    10026
ADDR    00035   ALGN    06750   ALIGN   07020   AMOUNT  07123   AMT1    07656
CDFP    06512   CMMN    07715   CNDT    06555   CNT     07762   C1000   26743
C27     07176   D       07371   DFSET   06762   DF0     00040   DF1     03037
DIRECT  00043   DIVIDE  07363   DIV1    07290   DIV2    07420   DMULT   07221
DNORM   07600   DONE    07100   DRCTY   00032   DUBDIV  07472   DUNORM  07565
DVX     07506   DVY     06436   DV2     07522   DV3     07500   FBR09   07376
ERROR1  07133   ET7   = 00001   EVEN    07736   EXIT    06665   EXIT1   07641
EXIT2   07652   EXIT6   07151   EXP     00020   EXPP    06757   EXP1    00230
EX1     00024   FABS  = 00006   FCMP    06517   FCMPA   06506   FCMPB   06532
FCMPC   06543   FEXT  = 00000   FLAD    06632   FLDV    07305   FLGT    26602
FLMY    06711   FLPT    06610   FLPTQ   06616   FLSU    06660   FNDR  = 00017
F00     06503   FOUT    06525   FPACO   07756   FPACX   07153   FPEX    06752
FPEXT   06732   FPFLD = 00010   FPH     06744   FPNT    06400   FPNTP   26753
FPOH    07750   FRNDR   06720   GOOF    07142   GO6     07617   HOAP    06760
HORD    00021   INCR    06742   INDRCY  06564   ITER1   07753   JMP     10033
```

| | | | | | | | | | |
|---|---|---|---|---|---|---|---|---|---|
| JUMPT | 06750 | JUMP2 | 06557 | KEEP | 07372 | LIMT | 00042 | LOAP | 06761 |
| LOOP | 07721 | LOOPP1 | 06453 | LOP | 07622 | LORD | 00022 | LTZ = | 00004 |
| MASKT | 06755 | MASK3 | 06560 | MASK5 | 06561 | MASK7 | 06562 | MIF | 07545 |
| MINS | 07375 | MINS2 | 07373 | MINUS2 | 07400 | MP1 | 07466 | MP2 | 07471 |
| MP2PT | 07360 | MP3 | 07467 | MP4 | 07437 | MP4PT | 07357 | MP5 | 07465 |
| MP5PT | 07361 | MULT | 06747 | M4 | 07761 | NEG | 07654 | NOGO | 07111 |
| NORM | 06756 | NORMF | 07362 | NORML | 00036 | N. = | 00101 | OPMINS | 06664 |
| OUTGO | 07102 | OVER1 | 00027 | OVER2 | 00023 | PAGENO | 06563 | PCP | 00041 |
| PRNM | 06767 | PSUNM | 06763 | PUSH | 06471 | QUOL | 00031 | RAP1 | 07573 |
| PAR2 | 07374 | RDFI | 06556 | REST | 07370 | RETN2 | 07132 | PETURN | 07366 |
| SAVE | 00034 | SGN | 07367 | SHIFT | 07062 | SIGN | 07340 | SIGN1 | 07655 |
| SMACLA | 07365 | SNSWIT | 07351 | SPACLA | 07364 | SQROOT | 07664 | SQUARE | 07143 |
| SOLEND | 07734 | TABLE | 06565 | TABLE6 | 07546 | TAG1 | 07130 | TAG2 | 07131 |
| TEST2 | 07124 | TEST3 | 07125 | TEST4 | 07126 | TEST5 | 07127 | THTR | 07472 |
| UNORF | 07156 | UNORM | 06751 | V = | 05774 | VALFLD= | 00010 | VS = | 00303 |
| VT = | 06277 | | | | | | | | |

ERRORS DETECTED: 0
FREE CORE: 3992. WORDS
:,:<HAMEPA

We claim:

1. A numerically controlled machine tool system comprising:
a machine tool, said machine tool including a cutting element and a workpiece positioning element, and
a control system for controlling the relative position of said cutting element and workpiece positioning element including:
A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed,
B. a position encoding means for generating a coordinate data signal representative of the coordinates corresponding to the current position of said cutting element with respect to said reference point,
C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to:
the coordinate data signal representative of the associated one of said succession of spatial points,
D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and
E. a computer controlled positioning means responsive to said control signals and including said axes drive means, said computer controlled positioning means being for successively controlling the relative position of said cutting element to be at each of said spatial points,
and wherein said sequence entry means further includes:
F. a sequence numbering means for automatically storing in said digital computer memory in association with each sequence a unique reference symbol selected from a predetermined ordered succession of symbols, said successively stored sequences forming an ordered succession of sequences in said computer memory with said selected reference symbol being related to the order of said stored sequences in said memory, and
wherein said sequence numbering means further includes:
a next sequence number selection means selectively operative to automatically select a reference symbol to be associated with the next sequence to be stored in said memory, said selected reference symbol being the first symbol of said predetermined ordered succession of symbols following the symbol associated with the last sequences of said ordered succession of stored sequences.

2. A numerically controlled machine tool system comprising:
a machine tool, said machine tool having a cutting element and a workpiece positioning table, wherein said cutting element rotates about a first axis and translates along said first axis, and wherein said workpiece positioning table has a planar top surface lying in a reference plane perpendicular to said first (z) axis and said table translates along a second (x) and a third (y) axis, said said second and third axes lying at right angles in said plane, and
a control system for controlling said translating motions of said cutting element and said workpiece positioning table including:
A. an operator controlled positioning control means including axes drive means for positioning the cutting element of said machine tool relative to the point of intersection of said x and y axes to a succession of spatial points, said points having x, y and z coordinates defined with respect to said point of intersection of said x and y axes and said reference plane, wherein each of said spatial points corresponds to a point at which a subsequent machining operation is to be performed, B. a position encoding means for generating x, y and z coordinate data signals, each being representative of the corresponding coordinate of the current position of said cutting element with respect to said intersection point and said reference plane, C. an operator controlled two coordinate sequence entry means including a digital computer, interface and operator control/programming station, said two coordinate sequence entry means being for generating and storing in the memory of said digital computer at least one two coordinate sequence of digital data conprising a set of digital signals for an associated one of said succession of spatial points, said set of digital signals being related to:

two coordinate data signals representative of two coordinates of the associated one of said succession of spatial points, D. an operator controlled one coordinate sequence entry means including said digital computer, said interface and said operator control/programming station, said one coordinate sequence entry means being for generating and storing in said memory of said digital computer at least one one coordinate sequence of digital data comprising a set of digital signals for an associated one of said succession of spatial points, said set of digital signals being related to:

one coordinate data signal representative of one coordinate of the associated one of said succession of spatial points, E. a sequence transformation means including said digital computer, said interface, and said operator control/programming station, said transformation means being for selectively transforming each of said stored two coordinates and one coordinate sequences of digital data into a corresponding series of encoded machine tool control signals, wherein each of said series is for directing the relative position of said cutting element toward an associated one of said spatial points, and F. a computer controlled positioning means responsive to said control signals and including said axes drive means, said computer controlled positioning means for successively controlling the relative position of said cutting element to be at each of said spatial points, and wherein said two coordinate and one coordinate sequence entry means further include:

G. a sequence numbering means for automatically storing in said digital computer memory in association with each two coordinate and one coordinate sequence a unique reference symbol selected from a predetermined ordered succession of symbols, said successively stored two coordinate and one coordinate sequences forming an ordered succession of sequences in said computer memory with said selected reference symbol being related to the order of said stored two coordinate and one coordinate sequences in said memory, and wherein said sequence numbering means further comprises:

a next sequence number selection means selectively operative to automatically select a reference symbol to be associated with the next sequence to be stored in said memory, said selected reference symbol being the first symbol of said predetermined ordered succession of symbols following the symbol associated with the last sequence of said ordered succession of stored sequences.

3. A numerically controlled machine tool system comprising:

a machine tool, said machine tool having a cutting element and a workpiece positioning table, wherein said cutting element rotates about a first axis and translates along said first axis, and wherein said workpiece positioning table has a planar top surface lying in a reference plane perpendicular to said first (z) axis and said table translates along a second (x) and a third (y) axis, said second and third axes lying at right angles in said plane, and a control system for controlling said translating motions of said cutting element and said workpiece positioning table including:

A. an operator controlled positioning control means including axes drive means for positioning the cutting element of said machine tool relative to the point of intersection of said x and y axes to a succession of spatial points, said points having x, y, and z coordinates defined with respect to said point of intersection of said x and y axes and said reference plane, wherein each of said spatial points corresponds to a point at which a subsequent machining operation is to be performed, B. a position encoding means for generating x, y and z coordinate data signals, each being representative of the corresponding coordinate of the current position of said cutting element with respect to said intersection point and said reference plane, C. an operator controlled two coordinate sequence entry means including a digital computer, interface and operator control/programming station, said two coordinate sequence entry means being for generating and storing in the memory of said digital computer at least one two coordinate sequence of digital data comprising a set of digital signals for an associated one of said succession of spatial points, said set of digital signals being related to:

two coordinate data signals representative of two coordinates of the associated one of said succession of spatial points, D. an operator controlled one coordinate sequence entry means including said digital computer, said interface and said operator control/programming station, said one coordinate sequence entry means being for generating and storing in said memory of said digital computer at least one one coordinate sequence of digital data comprising a set of digital signals for an associated one of said succession of spatial points, said set of digital signals being related to:

one coordinate data signal representative of one coordinate of the associated one of said succession of spatial points, E. a sequence transformation means including said digital computer, said interface, and said operator control/programming station, said transformation means being for selectively transforming each of said stored two coordinate and one coordinate sequence of digital data into a corresponding series of encoded machine tool control signals, wherein each of said series is for directing the relative position of said cutting element toward an associated one of said spatial points, and F. a computer controlled positioning means responsive to said control signals and including said axes drive means, said computer controlled positioning means for successively controlling the relative position of said cutting element to be at each of said spatial points, wherein said control system further includes:

operator controlled plane/axis select means selectively operative in conjunction with said one and two coordinate sequence entry means to generate and store in said memory in association with each one coordinate sequence of digital data an axis tag data signal representative of one of said axes, and with each two coordinate sequence of digital data a plane tag data signal representative of two of said axes, and wherein said sequence transformation means includes a plane/axis switching means selectively operative to:

i. identify the plane tag of a two coordinate sequence and transform the associated two coordinate sequence into a corresponding series of encoded machine tool control signals for the two coordinate axes represented by said identified plane tag, and ii. identify the axis tag of a one coordinate sequence and transform the associated one coordinate sequence into a corresponding series of encoded machine tool control signals for the coordinate axis represented by said axis tag.

4. A numerically controlled machine tool system comprising:

a machine tool, said machine tool having a cutting element and a workpiece positioning table, wherein said cutting element rotates about a first axis and translates along said first axis, and wherein said workpiece positioning table has a planar top surface lying in a reference plane perpendicular to said first (z) axis and said table translates along a second (x) and a third (y) axis, said second and third axes lying at right angles in said plane, and a control system for controlling said translating motions of said cutting element and said workpiece positioning table including:

A. an operator controlled positioning control means including axes drive means for positioning the cutting element of said machine tool relative to the point of intersection of said x and 7 axes to a succession of spatial points, said points having x, y and z coordinates defined with respect to said point of intersection of said x and y axes and said reference plane, wherein each of said spatial points corresponds to a point at which a subsequent machining operation is to be performed, B. a position encoding means for generating x, y and z coordinate data signals, each being representative of the corresponding coordinate of the current position of said cutting element with respect to said intersection point and said reference plane, C. an operator controlled two coordinate sequence entry means including a digital computer, interface and operator control/programming station, said two coordinate sequence entry means being for generating and storing in the memory of said digital computer at least one two coordinate sequence of digital data comprising a set of digital signals for an associated one of said succession of spatial points, said set of digital signals being related to:

two coordinate data signals representative two coordinates of the associated one of said succession of spatial points, D. an operator controlled one coordinate sequence entry means including said digital computer, said interface and said operator control/programming station, said one coordinate sequence entry means being for generating and storing in said memory of said digital computer at least one one coordinate sequence of digital data comprising a set of digital signals for an associated one of said succession of spatial points, said set of digital signals being related to:

one coordinate data signal representative of one coordinate of the associated one of said succession of spatial points, E. a sequence transformation means including said digital computer, said interface, and said operator control/programming station, said transformation means being for selectively transforming each of said stored two coordinate and one coordinate sequences of digital data into a corresponding series of encoded machine tool control signals, wherein each of said series is for directing the relative position of said cutting element toward an associated one of said spatial points, and F. a computer controlled positioning means responsive to said control signals and including said axes drive means, said computer controlled positioning means for successively controlling the relative position of said cutting element to be at each of said spatial points, and wherein said two coordinate sequence entry means and said one coordinate sequence entry means further includes:

an operator controlled plane axis selection data entry means for generating and storing in said computer memory a plane tag data signal associated with each two coordinate sequence and an axis tag data signal associated with each one coordinate sequence, said plane tag being representative of a plane parallel to two of said axis, and said axis tag being representative of one of said axes.

5. System according to claim 4 wherein said two coordinate and third coordinate sequence entry means further include:

A. a sequence numbering means for automatically storing in said digital computer memory in association with each two coordinate and one coordinate sequence a unique reference symbol selected from a predetermined ordered succession of symbols, and successively stored two coordinate and one coordinate sequences forming an ordered succession of sequences in said computer memory with said selected reference symbol being related to the order of said stored two coordinate and one coordinate sequences in said memory, and wherein said means for selectively transforming said stored sequences to said series of encoded macchine tool control signals further comprises:

an automatic current sequence selection means for automatically selecting as a current sequence to be transformed, each of a succession of current sequences from said stored sequences in said computer memory, and wherein said means for selectively transforming said stored sequences to said series of encoded machine tool control signals comprises:

a two coordinate sequence identifying means for determining for each current sequence from its associated tag when said current sequence is a two coordinate sequence, wherein said sequence transformation means further includes:

plane switching means operative to transform said current two coordinate sequence into a corresponding series of encoded machine tool control signals for each of said two coordinate axes represented by said identified plane tag.

6. System according to claim 4 wherein said two coordinate and third coordinate sequence entry means further include:

A. a sequence numbering means for automatically storing in said digital computer memory in association with each two coordinate and one coordinate sequence a unique reference symbol selected from a predetermined ordered succession of symbols, said successively stored two coordinate and third coordinate sequences forming an ordered succession of sequences in said computer memory with said selected reference symbol being related to the order of said stored two coordinate and one coordinate sequences in said memory, and wherein said means for selectively transforming said stored sequences to said series of encoded machine tool control signals further comprises:

an automatic current sequence selection means for automatically selecting as a current sequence to be transformed, each of a succession of current sequences from said stored sequences in said computer memory, and wherein said means for selectively transforming said stored sequences to said series of encoded machine tool control signals comprises:

one coordinate sequence identifying means for determining for each current sequence from its associated tag when said current sequence is a one coordinate sequence, wherein said sequence transformation means further includes:

axis switching means operative to transform said current one coordinate sequence into a corresponding series of encoded machine tool control signals for the one coordinate axis represented by said identified axis tag.

7. A numerically controlled machine tool system comprising:

a machine tool, said machine tool having a cutting element and a workpiece positioning table, wherein said cutting element rotates about a first axis and translates along said first axis, and wherein said workpiece positioning table has a planar top surface lying in a reference plane perpendicular to said first (z) axis and said table translates along a second (x) and a third (y) axis, said second and third axes lying at right angles in said plane, and a control system for controlling said translating motions of said cutting element and said workpiece positioning table including:

A. an operator controlled positioning control means including axes drive means for positioning the cutting element of said machine tool relative to the point of intersection of said x and y axes to a succession of spatial points, said points having x, y and z coordinates defined with respect to said point of intersection of said x and y axes and said reference plane, wherein each of said spatial points corresponds to a point at which a subsequent machining operation is to be performed, B. a position encoding means for generating x, y and z coordinate data signals, each being representative of the corresponding coordinate of the current position of said cutting element with respect to said intersection point and said reference plane, C. an operator controlled two coordinate sequence entry means including a digital computer, interface and operator control/programming station, said two coordinate sequence entry means being for generating and storing in the memory of said digital computer at least one two coordinate sequence of digital data comprising a set of digital signals for an associated one of said succession of spatial points, said set of digital signals being related to:

two coordinate data signals representative of two coordinates of the associated one of said succession of spatial points, D. an operator controlled one coordinate sequence entry means including said digital computer, said interface and said operator control/programming station, said one coordinate sequence entry means being for generating and storing in said memory of said digital computer at least one one coordinate sequence of digital data comprising a set of digital signals for an associated one of said succession of spatial points, said set of digital signals being related to:

one coordinate data signal representative of one coordinate of the associated one of said succession of spatial points, E. a sequence transformation means including said digital computer, said interface, and said operator control/programming station, said transformation means being for selectively transforming each of said stored two coordinate and one coordinate sequences of digital data into a corresponding series of encoded machine tool control signals, wherein each of said series is for directing the relative position of said cutting element toward an associated one of said spatial points, and F. a computer controlled positioning means responsive to said control signals and including said axes drive means, said computer controlled positioning means for successively controlling the relative position of said cutting element to be at each of said spatial points, wherein said one sequence entry means further includes:

a selectively operative operator controlled repeat last one coordinate pair data entry means for generating and storing in said computer memory a repeat last one coordinate pair signal associated with selected one coordinate sequences.

8. System according to claim 7 wherein said two coordinate and one coordinate sequence entry means further include:
   A. a sequence numbering means for automatically storing in said digital computer memory in association with each two coordinate and one coordinate sequence a unique reference symbol selected from a predetermined ordered succession of symbols, said successively stored two coordinate and one coordinate sequences forming an ordered succession of sequences in said computer memory with said selected reference symbol being related to the order of said stored two coordinate and one coordinate sequences in said memory, and wherein said means for selectively transforming said stored sequences to said series of encoded machine tool control signals further comprises:
   an automatic current sequence selection means for automatically selecting as a current sequence to be transformed, each of a succession of current sequences from said stored sequences in said computer memory,
   and wherein said means for selectively transforming said stored sequences to said series of encoded machine tool control signals comprises:
      a one coordinate sequence identifying means for determining for each current sequence when said sequence is a one coordinate sequence, and wherein said sequence transformation means further includes:
   a repeat last one coordinate pair sequence identifying means for identifying a current one coordinate sequence as a repeat last one coordinate pair sequence when a repeat last one coordinate pair signal is stored in said memory in association with said current one coordinate sequence, and means for generating a repeat last one coordinate pair identification signal indicative thereof.

9. System according to claim 8 wherein said sequence transformation means further comprises means responsive to said identification signal to identify the two one coordinate sequences just preceding said current one coordinate sequence in said ordered succession of sequences in said memory and to transform said identified two preceding one coordinate sequences into a corresponding series of encoded machine tool control signals for said one coordinate axis.

10. A numerically controlled machine tool system comprising:
   a machine tool, said machine tool having a cutting element and a workpiece positioning table, wherein said cutting element rotates about a first axis and translates along said first axis, and wherein said workpiece positioning table has a planar top surface lying in a reference plane perpendicular to said first (z) axis and said table translates along a second (x) axis and a third (y) axis, said second and third axes lying at right angles in said plane, and
   a control system for controlling said translating motions of said cutting element and said workpiece positioning table including:
      A. an operator controlled positioning control means including axes drive means for positioning the cutting element of said machine tool relative to the point of intersection of said x and y axes to a succession of spatial points, said points having x, y and z coordinates defined with respect to said point of intersection of said x and y axes and said reference plane, wherein each of said spatial points corresponds to a point at which a subsequent machining operation is to be performed,
      B. a position encoding means for generating x, y and z coordinate data signals, each being representative of the corresponding coordinate of the current position of said cutting element with respect to said intersection point and said reference plane,
      C. an operator controlled two coordinate sequence entry means including a digital computer, interface and operator control/programming station, said two coordinate sequence entry means being for generating and storing in the memory of said digital computer at least one two coordinate sequence of digital data comprising a set of digital signals for an associated one of said succession of spatial points, said set of digital signals being related to:
         two coordinate data signals representative of two coordinates of the associated one of said succession of spatial points,
      D. an operator controlled one coordinate sequence entry means including said digital computer, said interface and said operator control/programming station, said one coordinate sequence entry means being for generating and storing in said memory of said digital computer at least one one coordinate sequence of digital data comprising a set of digital signals for an associated one of said succession of spatial points, said set of digital signals being related to:
         one coordinate data signal representative of one coordinate of the associated one of said succession of spatial points,
      E. a sequence transformation means including said digital computer, said interface, and said operator control/programming station, said transformation means being for selectively transforming each of said stored two coordinate and one coordinate sequences of digital data into a corresponding series of encoded machine tool control signals, wherein each of said series is for directing the relative position of said cutting element,
      F. a computer controlled positioning means responsive to said control signals and including said axes drive means, said computer controlled positioning means for successively controlling the relative position of said cutting element to be at each of said spatial points, wherein said two coordinate and one coordinate sequence entry means further include means for generating and storing in the memory of said computer in association with each sequence, a feedrate data signal representative of the velocity at which said cutting element is to approach the spatial point associated with said sequence, wherein said computer controlled positioning means is responsive in a first mode to control motion of said cutting element in accordance with each sequence at said associated feed rate, wherein said computer controlled positioning means further includes operator controlled runthrough means selectively operative to provide a feedrate override signal and wherein said computer controlled positioning means is operative in a second mode in response to said feedrate override signal to control motion of said cutting element in accordance with a predetermined velocity specified by said override feedrate signal, said computer controlled positioning means being operative in said first mode otherwise.

11. A numerically controlled machine tool system comprising:
   a machine tool, said machine tool including a cutting element and a workpiece positioning element, and
   a control system for controlling the relative position of said cutting element and workpiece positioning element including:
   A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed,
   B. a position encoding means for generating a coordinate data signal representative of the coordinates corresponding to the current position of said cutting element with respect to said reference point,
   C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to: the coordinate data signal representative of the associated one of said succession of spatial points,
   D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and
   E. a computer controlled positioning means responsive to said control signals and including said axes drive means, said computer controlled positioning means being for successively controlling the relative position of said cutting element to be at each of said spatial points,
wherein said sequence entry means further includes means for generating and storing in the memory of said computer in association with each sequence, a feed rate data signal representative of the velocity at which said cutting element is to approach the spatial point associated with said sequence,
wherein said computer controlled positioning means is responsive in a first mode to control the motion of said cutting element in accordance with each sequence at the feed rate specified by said associated feed rate data, wherein said computer controlled positioning means further includes an operator controlled run through means selectively operative to provide a feed rate override signal, and wherein said computer controlled positioning means is operative in a second mode in response to said feed rate override signal to control the motion of said cutting element in accordance with,
   a predetermined velocity specified by said feedrate override signal, said computer controlled positioning means being operative in said first mode otherwise.

12. In a numerically controlled machine tool system including a machine tool, said machine tool including a cutting element and a workpiece positioning element, and
   a control system for controlling the relative position of said cutting element and workpiece positioning element including:
   A. an operator controlled positioning control means including axes drive means for controlling the relative position of said cutting element to a succession of spatial points defined with respect to a reference point on said workpiece positioning element, wherein each of said spatial points corresponds to a point at which a subsequent machine operation is to be performed,
   B. a position encoding means for generating a coordinate data signal representative of the coordinates corresponding to the current position of said cutting element with respect to said reference point,
   C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to:
      the coordinate data signal representative of the associated one of said succession of spatial points,
   D. a transformation means including said digital computer, said interface, and said operator control/programming station, said transformation means being for selectively transforming each of said stored sequences of digital data into a corresponding series of encoded machine tool control signals wherein each of said series is for directing the relative positioning of said cutting element toward an associated one of said spatial points, and
   E. a computer controlled positioning means responsive to said control signals and including said axes drive means, said computer controlled positioning means being for successively controlling the relative position of said cutting element to be at each of said spatial points,
and wherein said sequence entry means further includes:
   a sequence numbering means for automatically storing in said digital computer memory in association with each sequence a unique reference symbol selected from a predetermined ordered succession of symbols, said successively stored sequence forming an ordered succession of sequences in said computer memory with said selected reference symbol being related to the order of said stored sequences in said memory, and wherein said means for selectively transforming said stored sequences to said series of encoded machine tool control signals includes:

an automatic current sequence selection means for automatically selecting as a current sequence to be transformed, each of a succession of current sequences from said stored sequences in said computer memory, and wherein said sequence transformation means further includes:

a path determining means for determining for each identified current sequence form said stored data associated with said sequence the relative path to be followed by said cutting element said path to be followed being relative to said reference point and connecting the current coordinates of said cutting element and the coordinates associated with said current sequence, an improvement to said sequence entry means comprising: operator controlled helical data entry means for generating and storing in said computer memory at least one helical sequence of digital data defining a helical path about a reference axis and terminating at an associated one of said succession of spatial points, comprising a further set of digital signals, said further set being representative of:

A. helical select data for identifying said helica sequences,
B. the coordinates of a reference point on said helical path,
C. the direction of approach along said helical path,
D. the length of said helical path along said axis, and
E. the number of revolutions about said references of said helical path per unit length of said axis.

13. System according to claim 12 wherein said path determining means includes a further improvement comprising:

a helical sequence identifying means for identifying an identified current sequence as a helical sequence when said current sequence has helical select data stored in association therewith.

14. A system according to claim 13 wherein said path determining means further comprises:

a means for determining for an identified helical sequence said path to be followed, said path comprising a helical segment extending about said reference axis from said initial point to the spatial point associated with said current sequence, said segment having length in accordance with the corresponding axis length stored data signal and having the number of revolutions per unit axis length in accordance with the corresponding stored data signal, and further being such that cutting element relative movement along said helical segment from the initial point associated with the current sequence is in accordance with said helical direction data signal stored in association with said current sequence.

15. A system according to claim 12 wherein said cutting element is selectively controlled by said computer controlled positioning means to lie within a reference plane passing thru said reference axis and said workpiece positioning element is selectively controlled to rotate about said reference axis.

16. A system according to claim 12 wherein said cutting element is selectively controlled by said computer controlled positioning means to lie within a reference plane, and said workpiece positioning element is selectively controlled by said computer controlled positioning means to translate along and rotate about a reference axis, said reference axis being perpendicular to said reference plane.

17. A system according to claim 12 wherein said workpiece positioning element is selectively controlled by said computer controlled positioning means to lie within a reference plane, and said cutting element is selectively controlled by said computer controlled positioning means to translate along and rotate about a reference axis, said reference axis being perpendicular to said reference plane.

18. The system according to claim 12 wherein said sequence entry means further comprises:

operator controlled helical transition data entry means for generating and storing in said computer memory at least one helical transition sequence of digital data defining a circular joinder path segment which joins the end points of two helical path segments in a continuous manner, said helical path segments being characterized by $\alpha$ and $\beta$ revolutions about said reference axis per unit length of said axis, respectively, wherein for each point on said circular joinder path segment the sum of the square of the radial displacement of that joinder path point about a predetermined reference point with the square of the displacement of that joinder path along said reference axis from said reference point equals the square of R, where $$R = \frac{\frac{1}{2}\sqrt{(\Delta X)^2 + (\Delta A)^2}}{\cos\left(90 - \left(\frac{\alpha - \beta}{2}\right)\right)},$$

where $\Delta X$ and $\Delta A$ equal the distance between the said end points of said helical path segments along said and about said reference axis, respectively, and where $\Delta X$ and $\Delta A$ are related by $\Delta A/\Delta X = \tan((\alpha+\beta)/2)$, said helical transition sequence data comprising a further set of digital signals, said further set being representative of:

A. helical transition select data for identifying said helical transition sequences,
B. the coordinates of the initial and final points on said joinder path.
C. the direction of approach along said joinder path, and
D. the radius R and center location of said circular joinder path.

19. System according to claim 18 wherein said path determining means includes a further improvement comprising a helical transition sequence identifying means for identifying as identified current sequence as a helical transition sequence when said current sequence has helical transition select data stored in association therewith.

20. System according to claim 19 wherein said path determining means further comprises:

means for determining for an identified helical transition sequence, said path to be followed,
said path comprising a circular joinder path extending between said joinder path initial and final end points and in the direction specified with the approach data stored in association with said current sequence, for which each point thereon the sum of the square of the radial displacement about said reference as with the square of the displacement along said reference axis equals R in accordance with the data stored in association with said current sequence.

21. A numerically controlled machine tool system comprising a machine tool, said machine tool including a cutting element and a workpiece positioning element, and a control system for controlling the relative position of said cutting element and workpiece positioning element including:
  A. an operator controlled positioning control means including axes drive means for controlling the relative position of said cutting element to a succession of spatial points defined with respect to a reference point on said workpiece positioning element, wherein each of said spatial points corresponds to a point at which a subsequent machining operation is to be performed,
  B. a position encoding means for generating a coordinate data signal representative of the coordinates corresponding to the current position of said cutting element with respect to said reference point,
  C. an operator controlled sequence entry means including a digital computer, interface means and operator control/programming station, said sequence entry means being for generating and storing in the memory of said digital computer at least one sequence of digital data comprising a set of digital signals for an associated one of said succession of spatial points, said set of digital signals being related to: the coordinate data signal representative of the associated one of said succession of spatial points,
  D. a transformation means including said digital computer, said interface, and said operator control/programming station, said transformation means being for selectively transforming each of said stored sequences of digital data into a corresponding series of encoded machine tool control signals wherein each of said series is for directing the relative position of said cutting element toward an associated one of said spatial points, and
  E. a computer controlled positioning means responsive to said control signals and including said axes drive means, said computer controlled positioning means being for successively controlling the relative position of said cutting element to be at each of said spatial points, wherein said control system further includes:
  operator controlled plane/axis select means selectively operative in conjunction with said sequence entry means to generate and store in said memory in association with each sequence of digital data a plane tag data signal or an axis tag data signal, said plane tag being representative of an operator selected reference plane, and said axis tag being representative of an operator selected reference direction, and wherein said sequence transformation means includes:
  a plane/axis switching means selectively operative to identify the tag associated with each sequence, and transform the associated sequence to a series of machine tool control signals for controlling cutting element motion in the reference plane or reference direction represented by said identified tag.

* * * * *